US011516452B2

(12) United States Patent
Edmonds et al.

(10) Patent No.: US 11,516,452 B2
(45) Date of Patent: Nov. 29, 2022

(54) SYSTEMS AND METHODS FOR TEMPORAL CORRECTIONS FOR PARALLAX REPROJECTION

(71) Applicant: Microsoft Technology Licensing, LLC, Redmond, WA (US)

(72) Inventors: Christopher Douglas Edmonds, Carnation, WA (US); Michael Bleyer, Seattle, WA (US); Christian Markus Maekelae, Redmond, WA (US); Raymond Kirk Price, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 64 days.

(21) Appl. No.: 16/905,268

(22) Filed: Jun. 18, 2020

(65) Prior Publication Data
US 2021/0400249 A1    Dec. 23, 2021

(51) Int. Cl.
*G06T 15/04*    (2011.01)
*G06T 7/40*    (2017.01)
*H04N 13/122*    (2018.01)
*H04N 13/344*    (2018.01)
*H04N 9/31*    (2006.01)

(52) U.S. Cl.
CPC ............ *H04N 13/122* (2018.05); *G06T 7/40* (2013.01); *G06T 15/04* (2013.01); *H04N 9/31* (2013.01); *H04N 13/344* (2018.05)

(58) Field of Classification Search
None
See application file for complete search history.

(56) References Cited

U.S. PATENT DOCUMENTS

| | | | | |
|---|---|---|---|---|
| 2014/0354632 | A1* | 12/2014 | Alj | .................... G06T 7/55 345/419 |
| 2017/0214899 | A1* | 7/2017 | Meier | ................... H04N 13/271 |
| 2019/0325644 | A1 | 10/2019 | Bleyer et al. | |
| 2020/0342673 | A1* | 10/2020 | Lohr | ................... G02B 27/0172 |

OTHER PUBLICATIONS

"International Search Report & Written Opinion issued in PCT Application No. PCT/US2021/023715", dated Jun. 11, 2021, 32 pages.(MS# 408552-WO-PCT).

* cited by examiner

*Primary Examiner* — Patricia I Young
(74) *Attorney, Agent, or Firm* — Workman Nydegger

(57) ABSTRACT

Systems are configured for generating temporally corrected pass-through images. In some instances, the systems obtain depth maps of an environment at a first timepoint, generate a 3D representation of the environment by unprojecting the depth information represented in the depth map, and obtain one or more first images of the environment captured at a second timepoint. The systems may also be configured to perform a first intermediate projection to identify first texture information from the one or more first images, identify a display pose associated with the system, generate a display projection of the 3D representation, and creating a composite image based on the display projection and the first texture information.

20 Claims, 32 Drawing Sheets

SYSTEMS AND METHODS FOR TEMPORAL CORRECTIONS FOR PARALLAX REPROJECTION

BACKGROUND

Mixed-reality (MR) systems, including virtual-reality and augmented-reality systems, have received significant attention because of their ability to create truly unique experiences for their users. For reference, conventional virtual-reality (VR) systems create a completely immersive experience by restricting their users' views to only a virtual environment. This is often achieved through the use of a head-mounted device (HMD) that completely blocks any view of the real world. As a result, a user is entirely immersed within the virtual environment. In contrast, conventional augmented-reality (AR) systems create an augmented-reality experience by visually presenting virtual objects that are placed in or that interact with the real world.

As used herein, VR and AR systems are described and referenced interchangeably. Unless stated otherwise, the descriptions herein apply equally to all types of mixed-reality systems, which (as detailed above) includes AR systems, VR reality systems, and/or any other similar system capable of displaying virtual objects.

Many mixed-reality systems include a depth detection system (e.g., time of flight camera, rangefinder, stereoscopic depth cameras, etc.). A depth detection system provides depth information about the real-world environment surrounding the mixed-reality system to enable the system to accurately present mixed-reality content (e.g., holograms) with respect to real-world objects. As an illustrative example, a depth detection system is able to obtain depth information for a real-world table positioned within a real-world environment. The mixed-reality system is then able to render and display a virtual figurine accurately positioned on the real-world table such that the user perceives the virtual figurine as though it were part of the user's real-world environment.

Some mixed-reality systems employ stereo cameras for depth detection or for other purposes, besides depth detection. For example, a mixed-reality system may utilize images obtained by stereo cameras to provide a pass-through view of the user's environment to the user. A pass-through view can aid users in avoiding disorientation and/or safety hazards when transitioning into and/or navigating within an immersive mixed-reality environment.

Some mixed-reality systems are also configured with cameras of different modalities to enhance users' views in low visibility environments. For example, mixed-reality systems configured with long wavelength thermal imaging cameras facilitate visibility in smoke, haze, fog, and/or dust. Likewise, mixed-reality systems configured with low light imaging cameras facilitate visibility in dark environments where the ambient light level is below the level required for human vision.

Even though existing mixed-reality systems can be configured with different types of cameras, there are many challenges associated with presenting the images captured by these cameras through the mixed-reality devices.

For instance, the physical positioning of the cameras is physically separated from the physical positioning of the user's eyes, such that it is not possible to simply render the captured images to the user without causing the user to perceive the real-world environment incorrectly. Even more particularly, a vertical offset between the positioning of the user's eyes and the positioning of the stereo cameras, for example, will cause the user to perceive real-world objects as vertically offset from their true position relative to the user's actual positioning in the real-world. In another example, a difference in the spacing between the user's eyes and the spacing between the stereo cameras can cause the user to perceive real-world objects with incorrect depth.

The differences in perception between the camera's perspective of an object, for example, based on the positioning of the cameras relative to the object, and how a user perceives the object, based on the positioning of the user's eyes relative to the object, are often referred to as "parallax," the "parallax problem" or "parallax error."

FIG. 1 illustrates a conceptual representation of the parallax problem in which a stereo pair of cameras 105A and 105B is physically separated from a user's eyes 110A and 110B. Sensor region 115A conceptually depicts the image sensing regions of camera 105A (e.g., the pixel grid) and the user's eye 110A (e.g., the retina). Similarly, sensor region 115B conceptually depicts the image sensing regions of camera 105B and the user's eye 110B.

The cameras 105A and 105B and the user's eyes 110A and 110B perceive an object 130, as indicated in FIG. 1 by the lines extending from the object 130 to the cameras 105A and 105B and the user's eyes 110A and 110B, respectively. FIG. 1 illustrates that the cameras 105A and 105B perceive the object 130 at different positions on their respective sensor regions 115A, 115B. Similarly, FIG. 1 shows that the user's eyes 110A and 110B perceive the object 130 at different positions on their respective sensor regions 115A, 115B. Furthermore, the user's eyes 110A perceives the object 130 at a different position on sensor region 115A than camera 105A, and the user's eye 110B perceives the object 130 at a different position on sensor region 115B than camera 105B.

Some approaches for correcting for the parallax problem involve performing a camera reprojection from the perspective of the stereo cameras to the perspective of the user's eyes. For instance, some approaches involve performing a calibration step to determine the differences in physical positioning between the stereo cameras and the user's eyes. Then, after capturing a stereo pair of images with the stereo cameras, a step of calculating depth information (e.g., a depth map) based on the stereo pair of images is performed (e.g., by performing stereo matching). Subsequently, a system can reproject the calculated depth information to correspond to the perspective of the user's left eye and right eye.

Some approaches for correcting the parallax problem also include components that operate/occur in different time domains. For example, stereo image capture may occur at one framerate, while depth map calculation may occur at another framerate (e.g., a lower framerate), resulting in different timestamps for stereo images and depth maps obtained by a system for performing parallax correction (e.g., an HMD). Furthermore, a parallax-corrected image will have a timestamp that is subsequent to the timestamps of the components used to generate the parallax-corrected image. Still furthermore, a display timestamp for displaying a parallax-corrected image will be subsequent to the timestamp for generating the parallax-corrected image.

In some instances, particularly where a user is moving their head, a system (e.g., an HMD) may have different poses at the different timestamps associated with generating and displaying a parallax-corrected image. The different poses at the different timestamps may cause environments represented in different components for generating a parallax-corrected image (e.g., depth maps and stereo images) to be misaligned due to the user's head movement. Furthermore, the different poses at the different timestamps may cause displayed parallax-corrected views to be inaccurate with respect to the user's perspective of the real-world environment at the time of display (e.g., as compared to how a user would view an environment without an HMD).

For at least the foregoing reasons, there is an ongoing need and desire for improved techniques and systems for providing temporal corrections for parallax reprojection.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Disclosed embodiments include systems and methods for temporal corrections for parallax reprojection. At least some of the disclosed embodiments are directed to generating temporally corrected pass-through images.

At least some systems and methods of the present disclosure are associated with various acts performed by a mixed-reality system for generating temporally corrected pass-through images. In some instances, the mixed-reality system obtains a depth map of an environment at a first timepoint, generates a 3D representation of the environment by unprojecting the depth information represented in the depth map, and obtains one or more first images of the environment captured at a second timepoint. In some implementations, the mixed-reality system also performs a first intermediate projection to identify first texture information from the one or more first images, identifies a display pose associated with the system, generates a display projection of the 3D representation of the environment, and creates a composite image based on the display projection and the first texture information.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
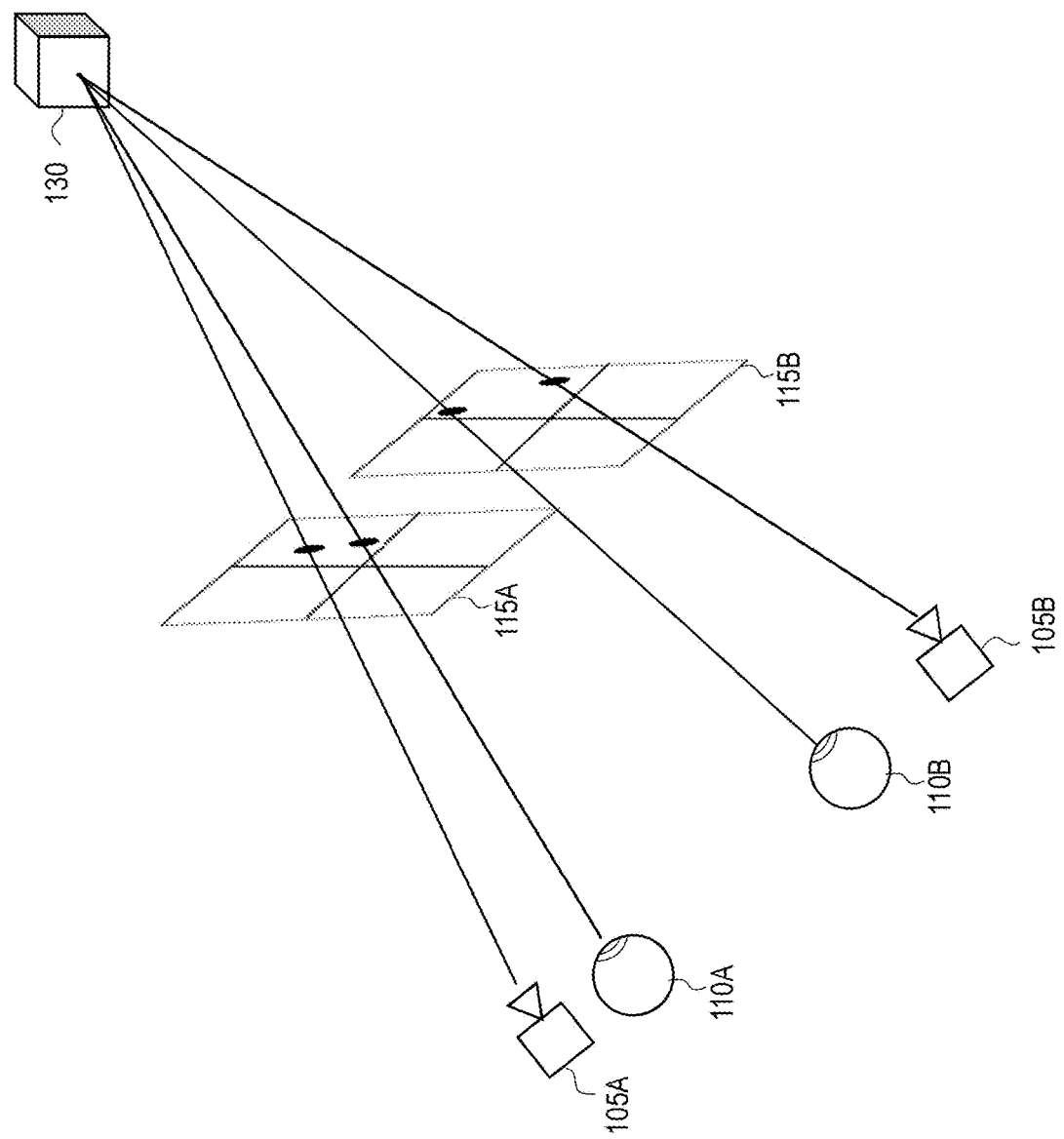
FIG. 1 illustrates an example of the parallax problem that occurs when cameras have a different perspective than a user's eyes.

Disclosed embodiments include systems and methods for temporal corrections for parallax reprojection. At least some of the disclosed embodiments are directed to generating temporally corrected pass-through images.

At least some systems and methods of the present disclosure are associated with various acts for generating temporally corrected pass-through images. In some instances, the acts include obtaining a depth map of an environment at a first timepoint, generating a 3D representation of the environment by unprojecting the depth information represented in the depth map, and obtaining one or more first images of the environment captured at a second timepoint. In some implementations, the acts further include performing a first intermediate projection to identify first texture information from the one or more first images, identifying a display pose associated with the system, generating a display projection of the 3D representation, and creating a composite image based on the display projection and the first texture information.

Examples of Technical Benefits, Improvements, and Practical Applications

Those skilled in the art will recognize, in view of the present disclosure, that at least some of the disclosed embodiments may address various shortcomings associated with providing parallax-corrected video imagery to an AR or VR system by generating a temporally-corrected image that compensates for head movement between when the camera image is taken and when the image is rendered to the user. The following section outlines some example improvements and/or practical applications provided by the disclosed embodiments. It will be appreciated, however, that the following are examples only and that the embodiments described herein are in no way limited to the example improvements discussed herein.

In some implementations, providing a system that performs one or more intermediate projections and a display projection to generate and display parallax-corrected views may correct for temporal offsets between different components for generating and displaying the parallax-corrected image. For example, performing intermediate projections may correct for temporal offset(s) between a depth map of an environment and subsequent texture images of the environment for generating a parallax-corrected image of the environment. Also, in some instances, performing a display projection may correct for temporal offset(s) between generating a parallax-corrected image and displaying the parallax-corrected image.

Furthermore, in some implementations, a system may perform multiple intermediate projections to provide parallax-corrected views that include texture information from multiple different images of an environment, while still correcting for temporal offsets associated with the multiple different images of the environment. For example, a system may perform a first intermediate projection to obtain texture information for a parallax-corrected image from an image captured with a camera of a first modality (e.g., a low light camera), and the system may perform a second intermediate projection to obtain additional texture information for the parallax-corrected image from an additional image captured with a camera of a second modality (e.g., a thermal camera).

One will appreciate, in view of the present disclosure, that the principles described herein may enhance mixed-reality pass-through experiences for users. Although the present description focuses, in some respects, on mixed-reality pass-through experiences, those skilled in the art will recognize, in view of the present disclosure, that the principles disclosed herein are not limited to facilitating mixed-reality pass-through experiences by generating parallax-corrected views. For example, the principles disclosed herein may be applied to any system(s) that perform(s) novel view synthesis.

Having just described some of the various high-level features and benefits of the disclosed embodiments, attention will now be directed to FIGS. 2 through 19. These Figures illustrate various conceptual representations, architectures, methods, and supporting illustrations related to the disclosed embodiments. The disclosure will then turn to FIG. 20, which presents an example computer system that may include and/or be used to facilitate the disclosed principles.

Example Mixed-Reality Systems and HMDs

Figure 2:
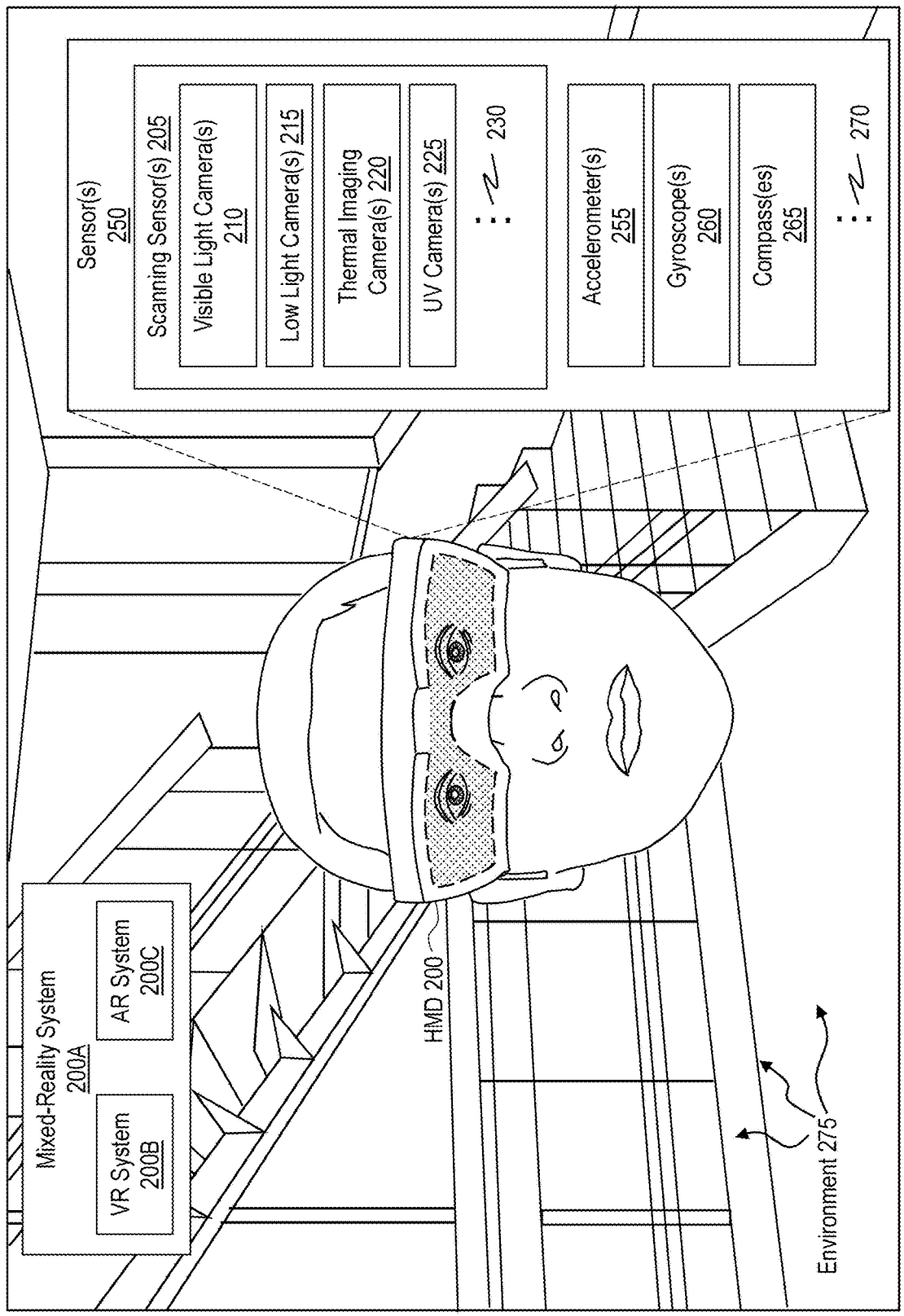
FIG. 2 illustrates an example mixed-reality system that may include or be used to implement disclosed embodiments.

Attention will now be directed to FIG. 2, which illustrates an example of a head-mounted device (HMD) 200. HMD 200 can be any type of mixed-reality system 200A (MR system), including a VR system 200B or an AR system 200C. It should be noted that while a substantial portion of this disclosure is focused, in some respects, on the use of an HMD, the embodiments are not limited to being practiced using only an HMD. That is, any type of system can be used, even systems entirely removed or separate from an HMD. As such, the disclosed principles should be interpreted broadly to encompass any type of scanning scenario or device. Some embodiments may even refrain from actively using a scanning device themselves and may simply use the data generated by the scanning device. For instance, some embodiments may at least be partially practiced in a cloud computing environment.

FIG. 2 illustrates HMD 200 as including sensor(s) 250, including scanning sensor(s) 205 and other sensors, such as accelerometer(s) 255, gyroscope(s) 260, compass(es) 265. The ellipsis 270 conveys that the sensor(s) 250 depicted in FIG. 2 are illustrative only and non-limiting. For instance, in some implementations, an HMD 200 includes other interoceptive and/or exteroceptive sensors not explicitly illustrated in FIG. 2, such as eye tracking systems, radio-based navigation systems, microphones, and/or other sensing apparatuses.

The accelerometer(s) 255, gyroscope(s) 260, and compass(es) 265 are configured to measure inertial tracking data.

Specifically, the accelerometer(s) 255 is/are configured to measure acceleration, the gyroscope(s) 260 is/are configured to measure angular velocity data, and the compass(es) 265 is/are configured to measure heading data. In some instances, an HMD 200 utilizes the inertial tracking components thereof to obtain three degree of freedom (3DOF) pose data associated with the HMD (e.g., where visual tracking data, described below, is unavailable or unreliable). As used herein, 3DOF refers to position (e.g., rotation) information associated with rotational axes about three perpendicular directional axes (e.g., pitch, yaw, and roll).

The inertial tracking components/system of the HMD 200 (i.e., the accelerometer(s) 255, gyroscope(s) 260, and compass(es) 265) may operate in concert with a visual tracking system to form a head tracking system that generates pose data for the HMD 200. In some instances, a visual tracking system includes one or more cameras (e.g., head tracking cameras) that capture image data of an environment (e.g., environment 275). In some instances, the HMD 200 obtains visual tracking data based on the images captured by the visual tracking system, such as feature points within the environment that may provide an anchor for determining movement of the HMD 200 relative to the environment.

For example, visual-inertial Simultaneous Location and Mapping (SLAM) in an HMD 200 fuses (e.g., with a pose filter) visual tracking data obtained by one or more cameras (e.g., head tracking cameras) with inertial tracking data obtained by the accelerometer(s) 255, gyroscope(s) 260, and compass(es) 265 to estimate six degree of freedom (6DOF) positioning (i.e., pose) of the HMD 200 in space and in real time. 6DOF refers to positioning/velocity information associated with three perpendicular directional axes and the three rotational axes (often referred to as pitch, yaw, and roll) about each of the three perpendicular directional axes (often referred to as x, y, and z).

Unless otherwise specified, any reference herein to a "pose" or a related term describing positioning and/or orientation may refer to 3DOF or 6DOF pose.

The visual tracking system of an HMD 200, in some instances, includes a stereo pair of head tracking images that is configured to obtain depth maps of the user's environment (e.g., environment 275) to provide visual mapping of the user's environment (e.g., by maintaining a surface mesh of the environment, or any other 3D representation of the environment). The HMD 200 may utilize the visual mapping data of the environment to accurately display virtual content with respect to the user's environment. Visual mapping data may also enable location sharing between users in a shared mixed-reality environment.

In some instances, the visual tracking system(s) of an HMD 200 (e.g., head tracking cameras) is/are implemented as one or more dedicated cameras. In other instances, the visual tracking system(s) is/are implemented as part of a camera system that performs other functions (e.g., as part of one or more cameras of the scanning sensor(s) 205, described hereinbelow).

The scanning sensor(s) 205 comprise any type of scanning or camera system, and the HMD 200 can employ the scanning sensor(s) 205 to scan environments, map environments, capture environmental data, and/or generate any kind of images of the environment. For example, in some instances, the HMD 200 is configured to generate a 3D representation of the real-world environment or generate a "pass-through" visualization. Scanning sensor(s) 205 may comprise any number or any type of scanning devices, without limit.

In accordance with the disclosed embodiments, the HMD 200 may be used to generate a parallax-corrected passthrough visualization of the user's environment. A "passthrough" visualization refers to a visualization that reflects what the user would see if the user were not wearing the HMD 200, regardless of whether the HMD 200 is included as a part of an AR system or a VR system. To generate this passthrough visualization, the HMD 200 may use its scanning sensor(s) 205 to scan, map, or otherwise record its surrounding environment, including any objects in the environment, and to pass that data on to the user to view. In many cases, the passed-through data is modified to reflect or to correspond to a perspective of the user's pupils. The perspective may be determined by any type of eye tracking technique. In some instances, as the camera modules are not telecentric with the user's eyes, the perspective difference between the user's eyes and the camera modules may be corrected to provide parallax-corrected pass-through visualizations.

To convert a raw image into a passthrough image, the scanning sensor(s) 205 typically rely on its cameras (e.g., visible light camera(s) 210, low light camera(s) 215, thermal imaging camera(s) 220, UV camera(s), or any other type of camera) to obtain one or more raw images of the environment (e.g., environment 275). In some instances, in addition to generating passthrough images, these raw images may also be used to determine depth data detailing the distance from the sensor to any objects captured by the raw images (e.g., a z-axis range or measurement). Once these raw images are obtained, then a depth map can be computed from the depth data embedded or included within the raw images, and passthrough images can be generated (e.g., one for each pupil) using the depth map for any reprojections.

As used herein, a "depth map" details the positional relationship and depths relative to objects in the environment. Consequently, the positional arrangement, location, geometries, contours, and depths of objects relative to one another can be determined. From the depth maps (and possibly the raw images), a 3D representation of the environment can be generated.

Relatedly, from the passthrough visualizations, a user will be able to perceive what is currently in his/her environment without having to remove or reposition the HMD 200. Furthermore, as will be described in more detail later, the disclosed passthrough visualizations may also enhance the user's ability to view objects within his/her environment (e.g., by displaying additional environmental conditions that may not have been detectable by a human eye).

It should be noted that while a portion of this disclosure focuses on generating "a" passthrough image, the implementations described herein may generate a separate passthrough image for each one of the user's eyes. That is, two passthrough images are typically generated concurrently with one another. Therefore, while frequent reference is made to generating what seems to be a single passthrough image, the implementations described herein are actually able to simultaneously generate multiple passthrough images.

In some embodiments, scanning sensor(s) 205 include cameras of various modalities, such as visible light camera(s) 210, low light camera(s) 215, thermal imaging camera(s) 220, Near Infrared (NIR) Cameras (in the 800 nm to 2 um range), and/or potentially (though not necessarily) ultraviolet (UV) cameras 225. The ellipsis 230 demonstrates how any other type of camera or camera system (e.g., depth cameras, time of flight cameras, etc.) may be included among the scanning sensor(s) 205. As an example, a camera structured to detect mid-infrared wavelengths may be included within the scanning sensor(s) 205.

Generally, a human eye is able to perceive light within the so-called "visible spectrum," which includes light (or rather, electromagnetic radiation) having wavelengths ranging from about 380 nanometers (nm) up to about 740 nm. As used herein, the visible light camera(s) 210 include red, green, blue (RGB) cameras structured to capture light photons within the visible spectrum. Often, these RGB cameras are complementary metal-oxide-semiconductor (CMOS) type cameras, though other camera types may be used as well (e.g., charge coupled devices, CCD).

The RGB cameras may be implemented as stereoscopic cameras, meaning that the fields of view of the two or more RGB cameras at least partially overlap with one another. With this overlapping region, images generated by the visible light camera(s) 210 can be used to identify disparities between certain pixels that commonly represent an object captured by both images. Disparities are measured after applying rectification to the stereo pair of images such that corresponding pixels in the images that commonly represent an object in the environment are aligned along scanlines. After rectification, corresponding pixels in the different images that commonly represent an object in the environment only differ in one dimension (e.g., the direction of the scanlines, such as the horizontal direction). The one-dimensional difference between corresponding pixels in their respective images of the stereo pair of images represents the disparity value for the object represented by the corresponding pixels.

Based on these pixel disparities, the embodiments are able to determine depths for objects located within the overlapping region (i.e. "stereoscopic depth matching," "stereo depth matching," or simply "stereo matching"). As such, the visible light camera(s) 210 can be used to not only generate passthrough visualizations, but they can also be used to determine object depth. In some embodiments, the visible light camera(s) 210 can capture both visible light and IR light.

Those skilled in the art will recognize, in view of the present disclosure, that stereo matching may be performed on a stereo pair of images obtained by any type and/or combination of cameras. For example, an HMD 200 or other system may comprise any combination of visible light camera(s) 210, low light camera(s) 215, thermal imaging camera(s) 220, UV camera(s) 225, Near Infrared Red, and/or other cameras to capture a stereo pair of images upon which to perform stereo matching (e.g., for the overlapping region of the stereo pair of images).

In some instances, the low light camera(s) 215 are structured to capture visible light and IR light. IR light is often segmented into three different classifications, including near-IR, mid-IR, and far-IR (e.g., thermal-IR). The classifications are determined based on the energy of the IR light. By way of example, near-IR has relatively higher energy as a result of having relatively shorter wavelengths (e.g., between about 750 nm and about 1,000 nm). In contrast, far-IR has relatively less energy as a result of having relatively longer wavelengths (e.g., up to about 30,000 nm). Mid-IR has energy values in between or in the middle of the near-IR and far-IR ranges. In some instances, the low light camera(s) 215 are structured to detect or be sensitive to IR light in at least the near-IR range.

In some embodiments, the visible light camera(s) 210 and the low light camera(s) 215 operate in approximately the same overlapping wavelength range. In some cases, this overlapping wavelength range is between about 400 nanometers and about 1,000 nanometers. Additionally, in some embodiments these two types of cameras are both silicon detectors.

In some instances, one distinguishing feature between these two types of cameras is related to the illuminance conditions or illuminance range(s) in which they actively operate. In some cases, the visible light camera(s) 210 are low power cameras and operate in environments where the illuminance is between about dusk and bright direct sunlight (e.g., for an example commercial visible light camera), or rather, the illuminance range begins at about 10 lux and increases beyond 10 lux. In contrast, the low light camera(s) 215 consume more power and operate in environments where the illuminance range is between overcast starlight and dusk lighting levels. In some instances, the device operates in environments between about starlight and dusk conditions (e.g., for a typical commercial low light camera).

The thermal imaging camera(s) 220, in some instances, are structured to detect electromagnetic radiation or IR light in the far-IR (i.e. thermal-IR) range, though some implementations also enable the thermal imaging camera(s) 220 to detect radiation in the mid-IR range. To clarify, the thermal imaging camera(s) 220 may be a long wave infrared imaging camera structured to detect electromagnetic radiation by measuring long wave infrared wavelengths. Often, the thermal imaging camera(s) 220 detect IR radiation having wavelengths between about 8 microns and 14 microns. Because the thermal imaging camera(s) 220 detect far-IR radiation, the thermal imaging camera(s) 220 can operate, in some instances, in any illuminance condition.

In some cases (though not necessarily all), the thermal imaging camera(s) 220 include an uncooled thermal imaging sensor. An uncooled thermal imaging sensor uses a specific type of detector design that is based on a bolometer, which is a device that measures the magnitude or power of an incident electromagnetic wave/radiation. To measure the radiation, the bolometer uses a thin layer of absorptive material (e.g., metal) connected to a thermal reservoir through a thermal link. The incident wave strikes and heats the material. In response to the material being heated, the bolometer detects a temperature-dependent electrical resistance. Changes to environmental temperature cause changes to the bolometer's temperature, and these changes can be converted into an electrical signal to thereby produce a thermal image of the environment. In accordance with at least some of the disclosed embodiments, the uncooled thermal imaging sensor is used to generate any number of thermal images. The bolometer of the uncooled thermal imaging sensor can detect electromagnetic radiation across a wide spectrum, spanning the mid-IR spectrum, the far-IR spectrum, and even up to millimeter-sized waves.

The UV camera(s) 225 are structured to capture light in the UV range. The UV range includes electromagnetic radiation having wavelengths between about 250 nm and about 400 nm. The disclosed UV camera(s) 225 should be interpreted broadly and may be operated in a manner that includes both reflected UV photography and UV induced fluorescence photography.

In some instances, visible light cameras are cameras that are used for computer vision to perform head tracking (e.g., as described hereinabove). These cameras can detect visible light, or even a combination of visible and IR light (e.g., a range of IR light). In some cases, these cameras are global shutter devices with pixels being about 3 μm in size.

Low light cameras, in some instances, are cameras that are sensitive to visible light and near-IR. These cameras are larger and may have pixels that are about 5 μm in size or larger. These cameras are also sensitive to wavelengths that silicon sensors are sensitive to, which wavelengths are between about 350 nm to 1100 nm.

In some implementations, thermal/long wavelength IR devices (i.e. thermal imaging cameras) have pixel sizes that are about 10 μm or larger and detect heat radiated from the environment. These cameras may be sensitive to wavelengths in the 8 μm to 14 μm range. Some embodiments also include mid-IR cameras configured to detect at least mid-IR light. These cameras often comprise non-silicon materials (e.g., InP or InGaAs) that detect light in the 800 nm to 2 μm wavelength range.

Generally, the low light camera(s) 215, the thermal imaging camera(s) 220, and the UV camera(s) 225 (if present) consume relatively more power than the visible light camera(s) 210. Therefore, when not in use, the low light camera(s) 215, the thermal imaging camera(s) 220, and/or the UV camera(s) 225 are typically in the powered-down state in which those cameras are either turned off (and thus consuming no power) or in a reduced operability mode (and thus consuming substantially less power than if those cameras were fully operational). In contrast, the visible light camera(s) 210 are typically in the powered-up state in which those cameras are by default fully operational.

It should be noted that any number of cameras may be provided on the HMD 200 for each of the different camera types. That is, the visible light camera(s) 210 may include 1, 2, 3, 4, 5, 6, 7, 8, 9, 10, or more than 10 cameras. Often, however, the number of cameras is at least 2 so the HMD 200 can perform stereoscopic depth matching, as described earlier. Similarly, the low light camera(s) 215, the thermal imaging camera(s) 220, and the UV camera(s) 225 may each respectively include 1, 2, 3, 4, 5, 6, 7, 8, 9, 10, or more than 10 corresponding cameras.

Figure 3:
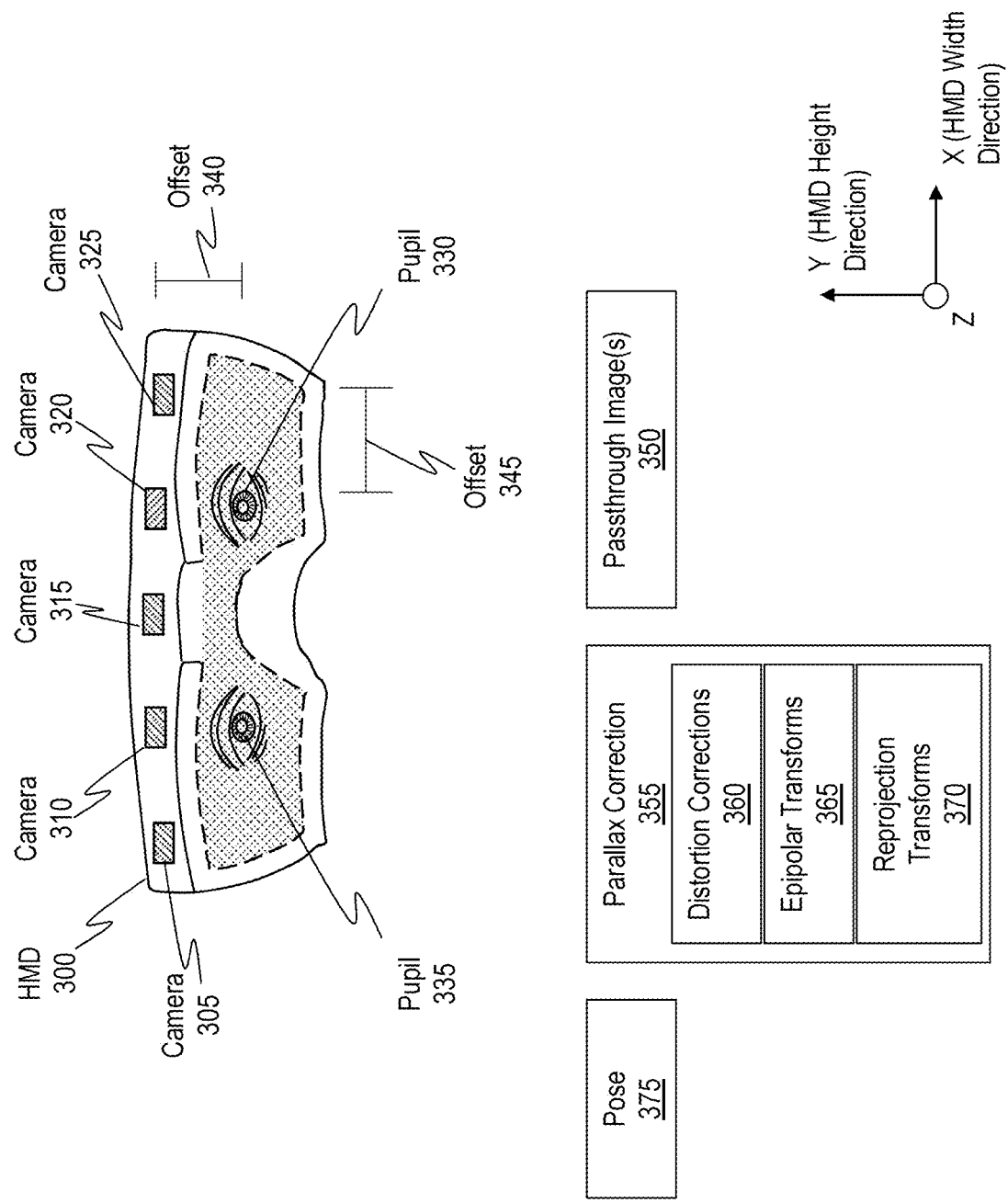
FIG. 3 illustrates example structural configurations of components of an example mixed-reality system, as well as an example of a parallax correction operation.

FIG. 3 illustrates an example HMD 300, which is representative of the HMD 200 from FIG. 2. HMD 300 is shown as including multiple different cameras, including cameras 305, 310, 315, 320, and 325. Cameras 305-325 are representative of any number or combination of the visible light camera(s) 210, the low light camera(s) 215, the thermal imaging camera(s) 220, and the UV camera(s) 225 from FIG. 2. While only 5 cameras are illustrated in FIG. 3, HMD 300 may include more or fewer than 5 cameras.

In some cases, the cameras can be located at specific positions on the HMD 300. For instance, in some cases a first camera (e.g., perhaps camera 320) is disposed on the HMD 300 at a position above a designated left eye position of any users who wear the HMD 300 relative to a height direction of the HMD. For instance, the camera 320 is positioned above the pupil 330. As another example, the first camera (e.g., camera 320) is additionally positioned above the designated left eye position relative to a width direction of the HMD. That is, the camera 320 is positioned not only above the pupil 330 but also in-line relative to the pupil 330. When a VR system is used, a camera may be placed directly in front of the designated left eye position. For example, with reference to FIG. 3, a camera may be physically disposed on the HMD 300 at a position in front of the pupil 330 in the z-axis direction.

When a second camera is provided (e.g., perhaps camera 310), the second camera may be disposed on the HMD at a position above a designated right eye position of any users who wear the HMD relative to the height direction of the HMD. For instance, the camera 310 is above the pupil 335. In some cases, the second camera is additionally positioned above the designated right eye position relative to the width direction of the HMD. When a VR system is used, a camera may be placed directly in front of the designated right eye position. For example, with reference to FIG. 3, a camera may be physically disposed on the HMD 300 at a position in front of the pupil 335 in the z-axis direction.

When a user wears HMD 300, HMD 300 fits over the user's head and the HMD 300's display is positioned in front of the user's pupils, such as pupil 330 and pupil 335. Often, the cameras 305-325 will be physically offset some distance from the user's pupils 330 and 335. For instance, there may be a vertical offset in the HMD height direction (i.e. the "Y" axis), as shown by offset 340 (representing the vertical offset between a user's eye and camera 325). Similarly, there may be a horizontal offset in the HMD width direction (i.e. the "X" axis), as shown by offset 345 (representing the horizontal offset between a user's eye and camera 325). Each camera may be associated with a different offset.

As described earlier, HMD 300 is configured to provide passthrough image(s) 350 for the user of HMD 300 to view. In doing so, HMD 300 is able to provide a visualization of the real world without requiring the user to remove or reposition HMD 300. In some instances, these passthrough image(s) 350 effectively represent the same view the user would see if the user were not wearing HMD 300. In some instances, the HMD 300 employs at least some of cameras 305-325 to provide these passthrough image(s) 350. In some instances, the passthrough images may have various levels of processing performed on the sensors, including denoising, tone mapping, and/or other processing steps to produce high quality imagery. Additionally, camera reprojection steps (e.g., parallax correction) may or may not be performed, as well, to correct for the offset between the user's perspective and the camera position.

FIG. 3 illustrates an implementation in which none of the cameras 305-325 are directly aligned with the pupils 330 and 335. The offsets 340 and 345 introduce differences in perspective as between the cameras 305-325 and the pupils 330 and 335. These perspective differences are referred to as "parallax."

Because of the parallax occurring as a result of the offsets 340 and 345, raw images produced by the cameras 305-325, in some instances, are not available for immediate use as passthrough image(s) 350. Instead, it may be beneficial to perform a parallax correction 355 (aka an image synthesis or reprojection) on the raw images to transform (or reproject) the perspectives embodied within those raw images to correspond to perspectives of the user's pupils 330 and 335. The parallax correction 355 includes any number of distortion corrections 360 (e.g., to correct for concave or convex wide or narrow angled camera lenses), epipolar transforms 365 (e.g., to parallelize the optical axes of the cameras), and/or reprojection transforms 370 (e.g., to reposition the optical axes so as to be essentially in front of or in-line with the user's pupils).

The parallax correction 355 includes performing depth computations to determine the depth of the environment and then reprojecting images to a determined location or as having a determined perspective. As used herein, the phrases "parallax correction" and "image synthesis" may be interchanged with one another and may include performing stereo passthrough parallax correction and/or image reprojection parallax correction.

The reprojections are based on a current pose 375 of the HMD 300 relative to its surrounding environment (e.g., as determined via visual-inertial SLAM). Based on the pose 375 and the depth maps that are generated, the HMD 300 and/or other system is/are able to correct parallax error by reprojecting a perspective embodied by the raw images to coincide with a perspective of the user's pupils 330 and 335.

By performing these different transforms, the HMD 300 is able to perform three-dimensional (3D) geometric transforms on the raw camera images to transform the perspectives of the raw images in a manner so as to correlate with the perspectives of the user's pupils 330 and 335. Additionally, the 3D geometric transforms rely on depth computations in which the objects in the HMD 300's environment are mapped out to determine their depths as well as the pose 375. Based on these depth computations and pose 375, the HMD 300 is able to three-dimensionally reproject or three-dimensionally warp the raw images in such a way so as to preserve the appearance of object depth in the passthrough image(s) 350, where the preserved object depth substantially matches, corresponds, or visualizes the actual depth of objects in the real world. Accordingly, the degree or amount of the parallax correction 355 is at least partially dependent on the degree or amount of the offsets 340 and 345.

By performing the parallax correction 355, the HMD 300 effectively creates "virtual" cameras having positions that are in front of the user's pupils 330 and 335. By way of additional clarification, consider the position of camera 305, which is currently above and to the left of pupil 335. By performing the parallax correction 355, the embodiments programmatically transform images generated by camera 305, or rather the perspectives of those images, so the perspectives appear as though camera 305 were actually positioned immediately in front of pupil 335. That is, even though camera 305 does not actually move, the embodiments are able to transform images generated by camera 305 so those images have the appearance as if camera 305 were coaxially aligned with pupil 335 and, in some instances, at the exact position of pupil 335.

Temporal Corrections for Parallax Reprojection

Figure 4A:
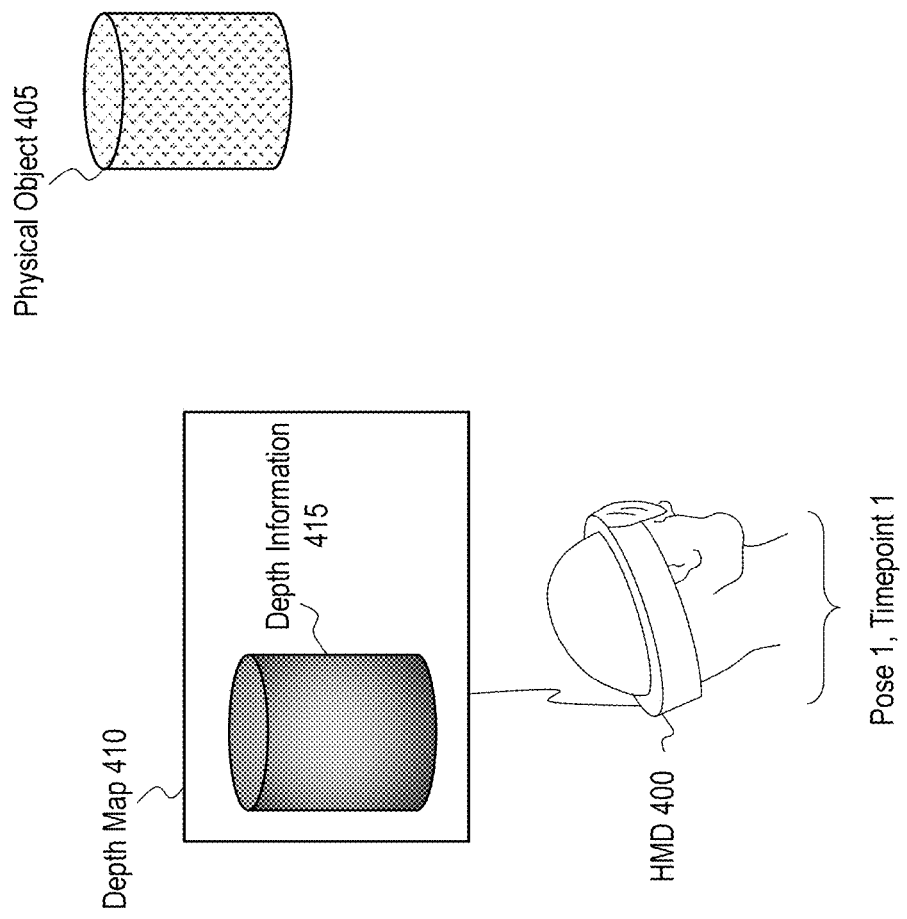
FIG. 4A illustrates an example of generating a depth map of an environment at a first timepoint and with a first pose associated with a mixed-reality system.

Attention is now directed to FIG. 4A, which illustrates an example of an HMD 400 generating a depth map 410 of an environment that includes a physical object 405. The HMD 400 corresponds to any of the HMDs described hereinabove (e.g., HMD 200, HMD 300). For example, in some implementations, the HMD 400 includes a stereo camera pair (e.g., comprising cameras of any modality) configured for capturing stereo pairs of images upon which the HMD 400 is configured to perform depth calculations (e.g., stereo matching) to generate the depth map 410. As noted above, other depth detection systems are within the scope of this disclosure.

The depth map 410 includes depth information 415 for the physical object 405. The depth information 415 represents the distance between the HMD 400 and the various surfaces of the physical object 405 from the perspective of the HMD 400 at the time of capturing the images (e.g., stereo images) used to generate the depth map 410. FIG. 4A represents the time of capturing the images used to generate the depth map 410 as "timepoint 1", and FIG. 4A represents the pose of the HMD 400 during timepoint 1 as "pose 1." An HMD 400 may identify poses, for example, using sensor(s) 250 (e.g., inertial and/or visual tracking systems) as described hereinabove.

Figure 4B:
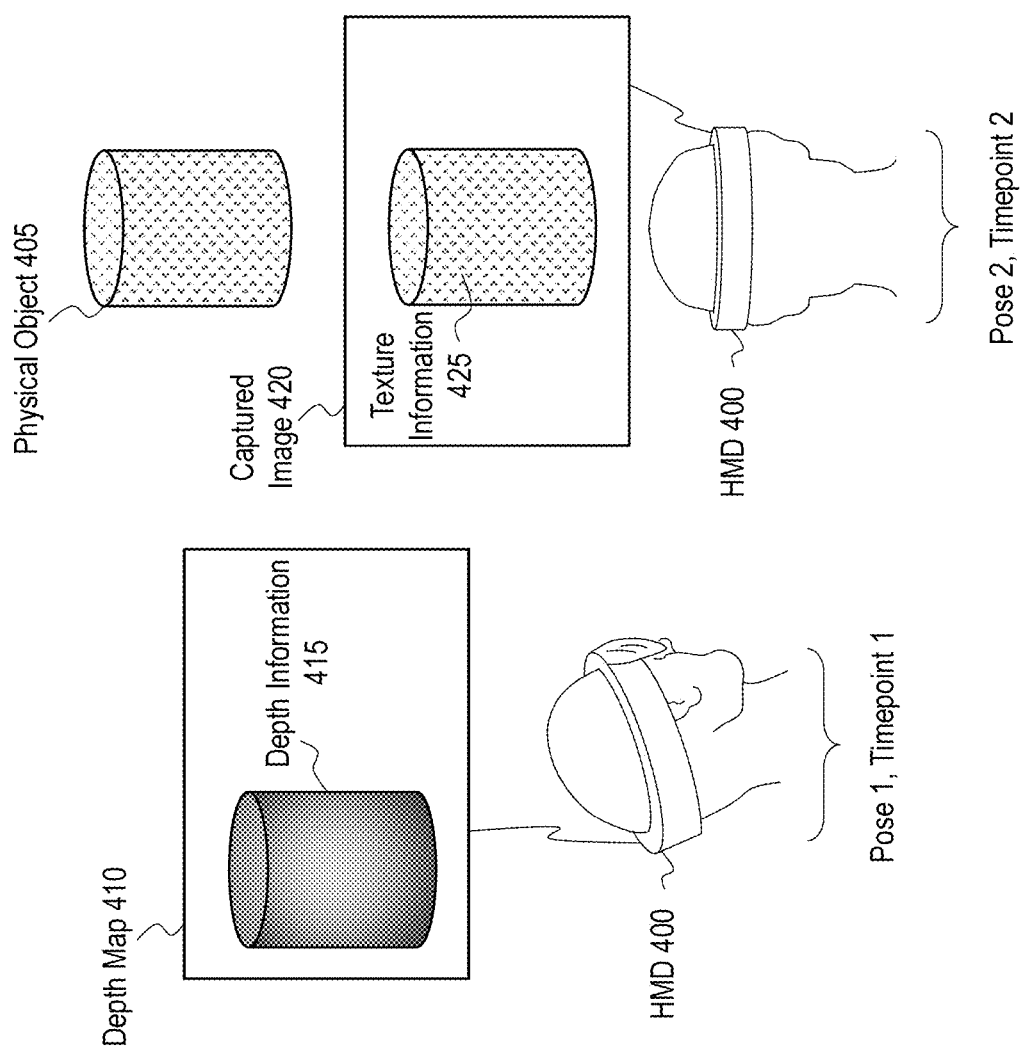
FIG. 4B illustrates an example of capturing an image of the environment at a second timepoint and with a second pose associated with the mixed-reality system.

FIG. 4B illustrates an example of the HMD 400 obtaining a captured image 420 of the environment that includes the physical object 405. In some instances, the captured image 420 is captured using the same stereo camera pair used to capture the stereo pair of images for generating the depth map 410. For example, the captured image 420 of FIG. 4B may represent a subsequent stereo pair of images captured by the stereo camera pair of the HMD 400 used to generate the depth map 410 (however, in some instances, the captured image 420 may be captured by one or more different cameras). Accordingly, the captured image 420 may be captured by one or more cameras of any modality, such as visible light camera(s) 210, low light camera(s) 215, thermal imaging camera(s) 220, Near Infrared (NIR) Cameras (in the 800 nm to 2 um range), ultraviolet (UV) cameras 225, and/or others.

The captured image 420 includes texture information 425 for the physical object 405. The texture information 425 represents the appearance, character, color, consistency, etc. of the various surfaces of the physical object 405 from the perspective of the HMD 400 associated with pose 2 at timepoint 2. As illustrated in FIG. 4B, captured image 420 is captured at a second timepoint, timepoint 2, that is subsequent to timepoint 1. Furthermore, FIG. 4B illustrates that the HMD 400 is associated with pose 2 at timepoint 2, which is a pose that is different than pose 1.

Figure 4C:
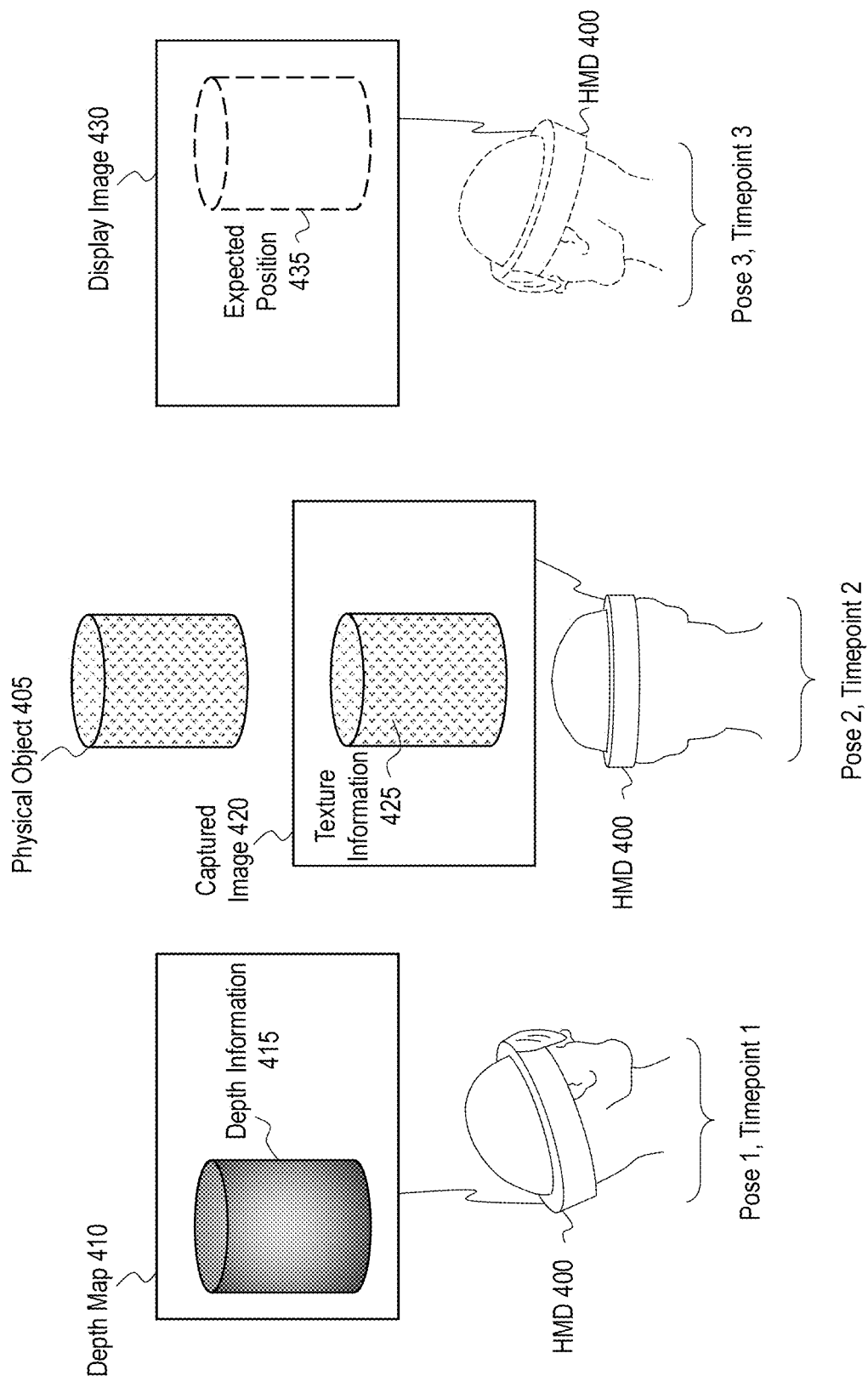
FIG. 4C illustrates an example of displaying a parallax-corrected image of the environment at a display timepoint and with a display pose associated with the mixed-reality system.

FIG. 4C portrays the HMD 400 at a third timepoint, timepoint 3, and with a third pose, pose 3. Timepoint 3 is subsequent to timepoints 1 and 2, and, as illustrated in FIG. 4C, pose 3 is different than poses 1 and 2. One will note that FIG. 4C depicts HMD 400 in dashed lines at timepoint 3 and at pose 3. This suggests that, in some instances, timepoint 3 is a future timepoint (e.g., relative to a time that the HMD 400 identifies timepoint 3 in preparation for displaying the display image 430) and pose 3 is a predicted pose that is predicted to be associated with the HMD 400 at future timepoint 3. An HMD 400 may identify a predicted pose based on analysis of changes in the pose of the HMD 400 prior to timepoint 3.

FIG. 4C illustrates that, at timepoint 3, the HMD 400 is displaying, or will display, a display image 430 that includes a representation of the physical object 405. In this sense, timepoint 3 of FIG. 4C may be regarded as a display timepoint at which the system will display a display image 430, and pose 3 of FIG. 4C may be regarded as a display pose.

In some instances, the display image 430 is a composite pass-through image of the environment, and the HMD 400 generates the display image 430 using the depth information 415 from the depth map 410 and using the texture information 425 from the captured image 420. In some instances, the display image 430 is a parallax-corrected image, while in other instances, no parallax corrections are performed to generate the display image 430.

The display image 430 of FIG. 4C illustrates an expected position 435 for the depiction of the physical object 405 within the display image 430 (e.g., based on a perspective of the HMD 400 associated with pose 3). However, by way of illustration, FIG. 4C shows a situation where temporal offsets exist among the display image 430, the captured image 420, and the depth map 410. For example, FIG. 4C illustrates discrepancies between the expected position 435 of the depiction of the physical object 405 within the display image 430 and the position of the depiction of the physical object 405 within the captured image 420 and within the depth map 410. For instance, the depiction of the physical object 405 within the depth map 410 is in a left region of the depth map 410, the depiction of the physical object 405 within the captured image 420 is in a center region of the captured image 420, and the expected position 435 of the depiction of the physical object 405 within the display image 430 is in a right region of the display image 430. Such discrepancies may occur, for example, because the depth map 410 is associated with pose 1, the captured image 420 is associated with pose 2, and the display image 430 is associated with pose 3, which are illustrated in FIG. 4C as different poses occurring at different timepoints.

Figure 5A:
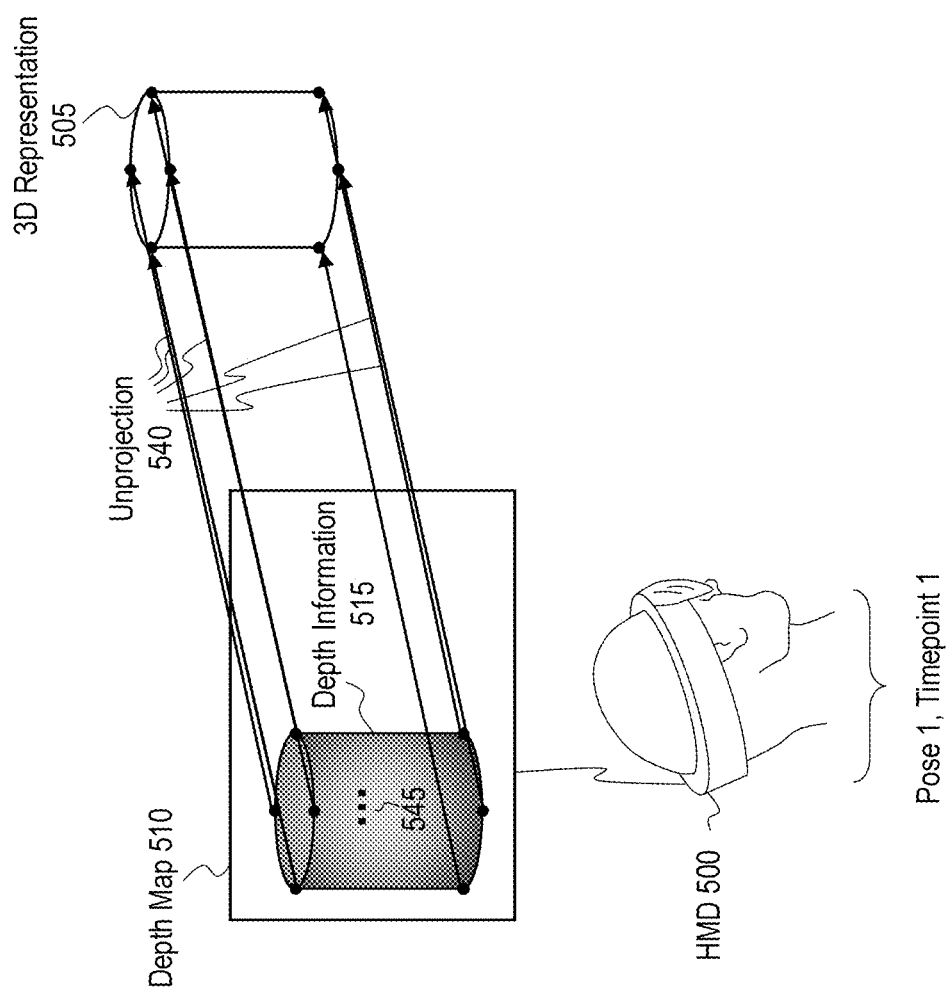
FIG. 5A illustrates an example of generating a 3D representation of the environment using the depth map associated with the first timepoint and the first pose.
Figure 5B:
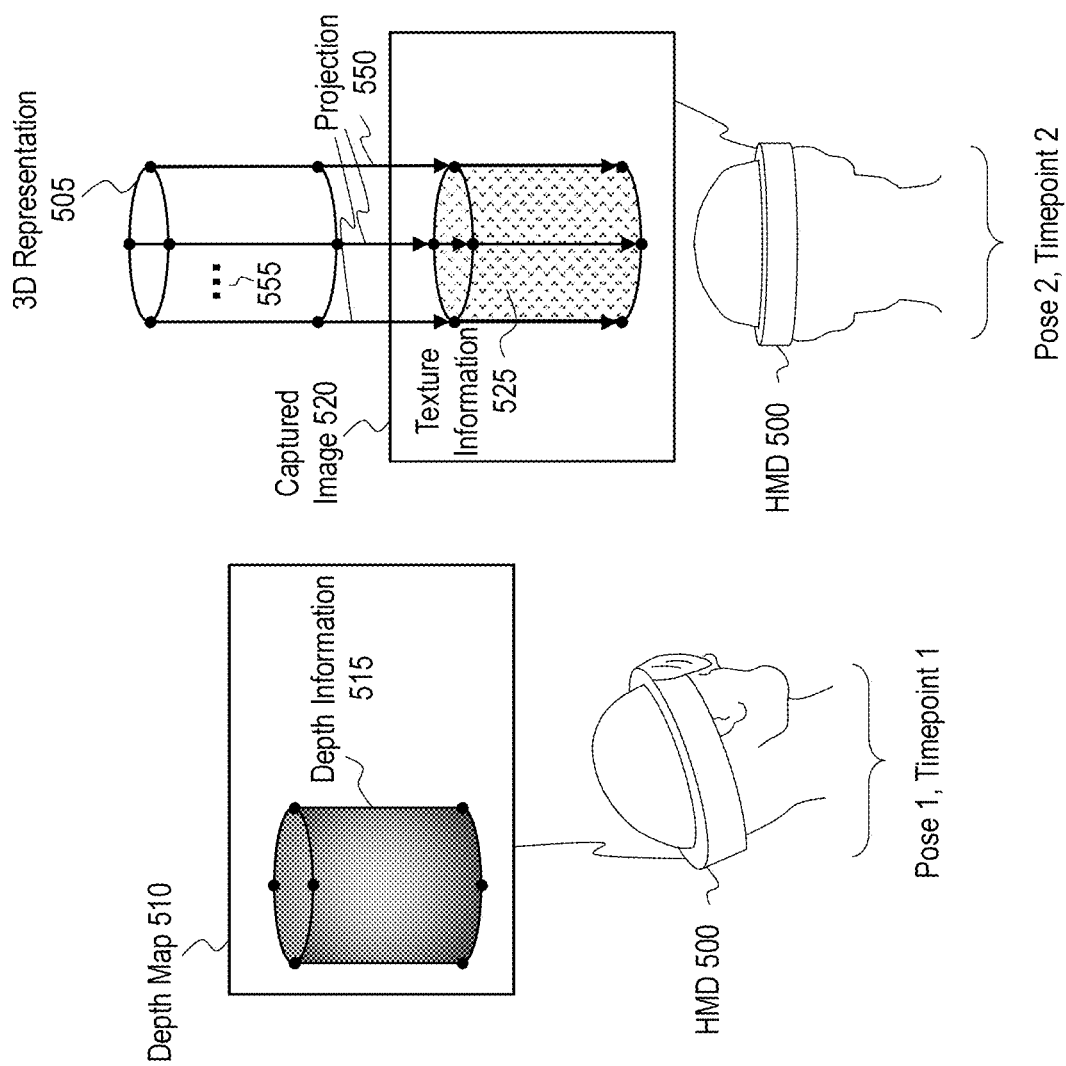
FIG. 5B illustrates an example of identifying texture information from the image of the environment associated with the second timepoint and the second pose.
Figure 5C:
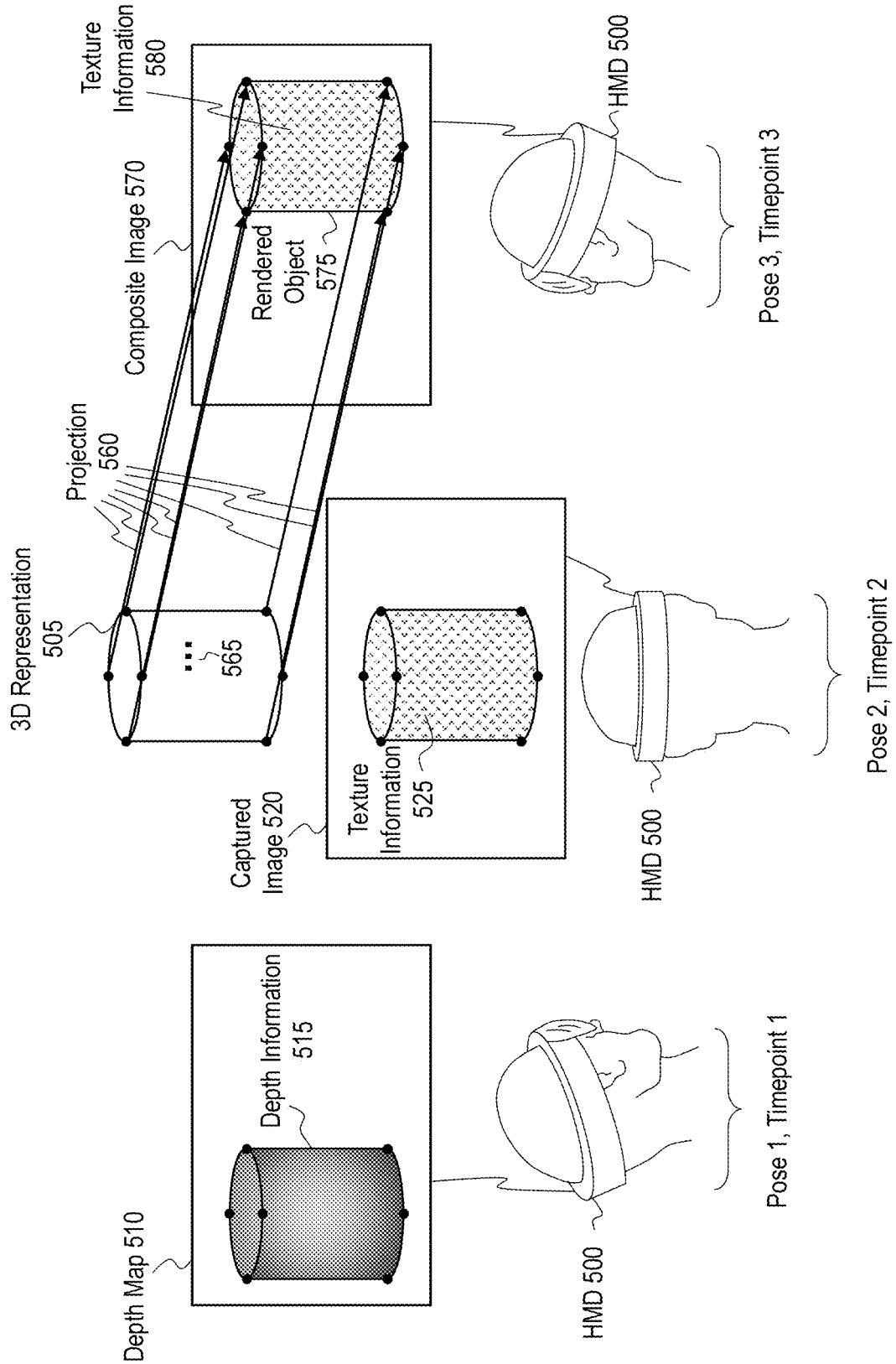
FIG. 5C illustrates an example of creating a composite image of the environment and displaying the composite image at the display timepoint.

Accordingly, FIGS. 5A-5C illustrate example techniques for addressing potential temporal offsets that may give rise to different poses associated with depth maps and captured images used to generate a composite image for display to a user of an HMD at a display timepoint (which may be a future timepoint and may have yet another different pose associated therewith).

FIG. 5A illustrates an example of an HMD 500 (or another system) generating a 3D representation 505 of the physical object 405 using a depth map 510 that is associated with pose 1 and timepoint 1. The HMD 500 corresponds to the HMD 400 described hereinabove with reference to FIGS. 4A-4C, and the depth map 510 with depth information 515 corresponds to the depth map 410 with depth information 415 of FIGS. 4A-4C. The 3D representation 505 of the physical object 405 (or other objects in the scene) may take on any suitable form, such as, by way of non-limiting example, a polygon mesh, a point cloud, a non-uniform rational B-spline surface model, etc.

As depicted in FIG. 5A, an HMD 500 generates a 3D representation 505 of the physical object 405 by unprojecting the depth information 515 represented in the depth map 510 into 3D space. For example, FIG. 5A illustrates unprojection operations 540 performed on various points of depth information 515 of the depth map 510.

In some instances, performing an unprojection operation 540 on a point of depth information 515 may be conceptualized as extending a ray from a pose-dependent origin based on a point of depth information 515 to a distance based on a depth value associated with the point of depth information 515. For example, using pinhole camera terminology for illustrative purposes, an HMD 500 (or another system) may identify a pose-dependent origin as an optical center based on pose 1, which is the pose at which the image(s) used to generate the depth map 510 was(were) captured. For instance, the optical center may be a camera center (or image sensor pixel) of a camera that captured an image used to generate the depth map 510 while the camera was positioned according to pose 1. In some instances, the optical center depends on a set of coordinates (e.g., a set of pixel coordinates) of the point of depth information 515 that the unprojection operation 540 operates on. The HMD 500 may cast a ray from the pose-dependent origin based on a point of depth information 515 (e.g., based on a set of pixel coordinates of a pixel of the depth map 510 as the pixel lies on a front image plane positioned with respect to the camera at pose 1 that captured an image used to generate the depth map 510). The HMD 500 may cast the ray to a distance based on a depth value associated with the point of depth information 515, providing a 3D point of the 3D representation 505 in 3D space. The ellipsis 545 indicates that unprojection operations 540 may be performed for any number of points of depth information 515 of the depth map 510 to form the 3D representation 505.

FIG. 5B illustrates an example of an HMD 500 (or another system) identifying texture information 525 from the 2D captured image 520 of the physical object 405 captured at timepoint 2 while the HMD 500 was associated with pose 2. The captured image 520 corresponds to the captured image 420 described hereinabove with reference to FIGS. 4B-4C.

As depicted in FIG. 5B, the HMD 500 identifies texture information 525 from the captured image 520 by projecting the 3D representation 505 based on pose 2. FIG. 5B illustrates projection operations 550 performed on various points of the 3D representation 505.

In some instances, a projection operation 550 may be an operation that is inverse to an unprojection operation 540, described above. For example, a projection operation 550 may be conceptualized as extending a ray from a 3D point of the 3D representation 505 toward a pose-dependent point. For instance, again using pinhole camera terminology for illustrative purposes, an HMD 500 (or another system) may identify a pose-dependent point as an optical center based on pose 2, which is the pose at which the captured image 520 was captured. The optical center may be a camera center (or image sensor pixel) of a camera that captured the captured image 520 while the camera was positioned according to pose 2. The HMD 500 may cast a ray from a 3D point of the 3D representation 505 toward the identified pose-dependent point, and the ray may identify a point of texture information 525 from the captured image 520 (e.g., a set of pixel coordinates of a pixel of the captured image 520 as the pixel lies on a front image plane positioned with respect to the camera at pose 2 that captured the captured image 520). The HMD 500 may then associate the identified point of texture information 525 with the 3D point of the 3D representation 505 from which the ray was cast. The ellipsis 555 indicates that projection operations 550 may be performed for a set of any number of 3D points of the 3D representation 505 to identify texture information 525 from the captured image 520 for the set of 3D points of the 3D representation 505.

In some instances, because the projection operations 550 are performed based on the pose associated with the captured image 520 (i.e., pose 2), the projection operations 550 may align 3D points of the 3D representation 505 that represent portions of the physical object 405 with corresponding 2D points of texture information 525 that represent the same portions of the physical object 405, even where temporal offsets give rise to differences in the position of the depiction of the physical object 405 within the captured image 520 and within the depth map 510 used to generate the 3D representation (as illustrated in FIG. 5B).

FIG. 5C illustrates an example of an HMD 500 (or another system) creating a composite image 570 of the environment that includes a rendered object 575 that represents the physical object 405. FIG. 5C also illustrates an example of the HMD 500 displaying the composite image 570 at a display timepoint (i.e., timepoint 3). As described hereinabove, in some instances, an HMD 500 identifies a display pose (i.e., pose 3) associated with a display timepoint (i.e., timepoint 3) at which the HMD 500 will display the composite image 570. For example, the display timepoint may be a future timepoint (e.g., a timepoint that will occur after the composite image 570 is finished rendering), and the display pose may be a predicted pose associated with the future timepoint.

FIG. 5C shows that, in some instances, an HMD 500 creates the composite image 570, at least in part, by projecting the 3D representation 505 using pose 3 (i.e., the display pose). For example, in some instances, the HMD 500 performs projection operations 560 on 3D points of the 3D representation 505, such as one or more of the 3D points that are associated with points of texture information 525 according to the projection operations 550 described hereinabove with reference to FIG. 5B.

The projection operations 560 are similar to the projection operations 550 described hereinabove with reference to FIG. 5B for identifying points of texture information 525 for the 3D representation 505. However, the projection operations 560 are performed based on pose 3 rather than pose 2 (e.g., in contrast with the projection operations 550). For example, an HMD 500 (or another system) may identify a pose-dependent viewpoint based on pose 3, which is the pose at which the HMD 500 will display the composite image 570. The pose-dependent viewpoint may be based on the positioning of one or more eyes of a user (e.g., relative to the HMD 500) while the HMD 500 is associated with pose 3. The HMD 500 may cast a ray from a 3D point of the 3D representation 505 toward the identified pose-dependent viewpoint, and the ray may identify a set of pixel coordinates for the composite image 570 (e.g., a set of pixel coordinates of a pixel of the composite image 570 as the pixel lies on a front image plane positioned with respect to the identified pose-dependent viewpoint).

In some instances, the HMD 500 builds a pixel of the composite image 570 using the identified set of pixel coordinates of the composite image 570 and the geometry and/or texture information associated with the projected 3D point of the 3D representation (e.g., a point of texture information 525 from captured image 520, identified according to projection operations 550 as described hereinabove with reference to FIG. 5B). The ellipsis 565 indicates that projection operations 560 may be performed on any number of 3D points of the 3D representation 505 as part of generating the composite image 570.

Because the projection operations 560 are performed based on the display pose (i.e., pose 3), the projection operations 560 will, in some instances, align 3D points of the 3D representation 505 that represent the physical object 405 with the expected position 435 for a depiction of the physical object 405 within the composite image 570 (e.g., based on a perspective of the HMD 500 associated with pose 3, see FIG. 4C and attendant description). This alignment will occur, even where temporal offsets give rise to differences in the position, or expected position, of the depiction of the physical object 405 within composite image 570, the captured image 520, and/or the depth map 510.

FIG. 5C illustrates the composite image 570 of rendered object 575 with texture information 580 applied. As described above, at least some of the 3D points of the 3D representation 505 are associated with texture information 525 from the captured image 520 (e.g., according to the projection operations 550 from FIG. 5B). Thus, FIG. 5C illustrates that the texture information 580 applied to the rendered object 575 of the composite image 570 is, in some instances, based on the texture information 525 associated with the 3D points of the 3D representation 505 that are projected according to the projection operations 550 and 560.

Having generated the composite image 570 using a projection of the 3D representation (e.g., according to projection operations 560) and texture information 580 (e.g., based on the texture information 525 associated with 3D points of the 3D representation 505 according to the projection operations 550), an HMD 500 may display the composite image 570 (e.g., on a display of the HMD 500) at the display timepoint (i.e., timepoint 3).

In some instances, the HMD 500 performs additional operations in creating and/or displaying the composite image 570. For example, in some implementations, the HMD 500 modifies the projection of the 3D representation (and/or performs additional reprojections) to generate one or more parallax-corrected composite image 570 based on a perspective of one or more eyes of a user (e.g., a user of the HMD 500).

Those skilled in the art will recognize, in view of the present disclosure, that an HMD 500 (or other system) may generate the composite image 570 for display at a display timepoint based on the projection of the 3D representation 505 (according to projection operations 560) and the texture information 580 (which is based on texture information 525) in various ways. For example, in some instances, an HMD 500 directly modifies the captured image 520 (e.g., by applying per-pixel transforms) based on the projection of the 3D representation 505 (according to projection operations 560) to generate the composite image 570.

In other instances, the HMD 500 renders the 3D representation 505 to provide a 2D view of the 3D representation 505 and generates/updates/modifies a UV map with texture information 525 from the captured image 520. The HMD may then apply the UV map to the rendered 3D representation 505. In some instances, rendering the 3D representation and generating/updating/modifying a UV map to provide the composite image 570 (rather than modifying the captured image 520) may at least partially allocate the computational burden of generating the composite image 570 to a GPU, which may advantageously distribute computational expense for systems with limited resources.

Although FIGS. 5A-5C focus, in some respects, on implementations in which the 3D representation 505 is generated based on a depth map 510 captured by the HMD 500, it will be appreciated that, in some additional and/or alternative embodiments, the 3D representation 505 is obtained from one or more other sources. For example, in some instances, an HMD 500 obtains a 3D representation 505 by accessing a previously stored surface reconstruction mesh (or other 3D depiction) of an environment in which the HMD 500 is operating. A surface reconstruction mesh may be generated in various ways, such as by manual user input, stitching depth information describing an environment captured by any number of HMDs (or other systems), etc.

Although FIGS. 5A-5C (and other Figures herein) depict a single depth map 510, a single captured image 520, and a single composite image 570, those skilled in the art will also appreciate, in view of the present disclosure, that the HMD is able to generate multiple depth maps, obtain multiple captured images, and/or generate multiple composite images to accommodate different needs and preferences. For example, in some instances, the HMD will project a 3D representation of an environment onto a left image and a right image of a stereo pair of captured images to generate a different pair of composite images for display to each of a user's eyes. Along these lines, it will also be appreciated that references made to a single element (e.g., image for a right eye, or a first camera, or a first image) may also inclusively refer to one or more of the same or related elements, and, conversely, any reference to a plurality of elements may refer to a single element.

In some implementations, an HMD obtains texture information for a composite image from multiple sources. For example, an HMD may include one or more low light cameras 215 as well as one or more thermal imaging cameras 220 for generating composite images that include low light image data and thermal image data that are combined to form the collective texture information used for the composite image.

Figure 6A:
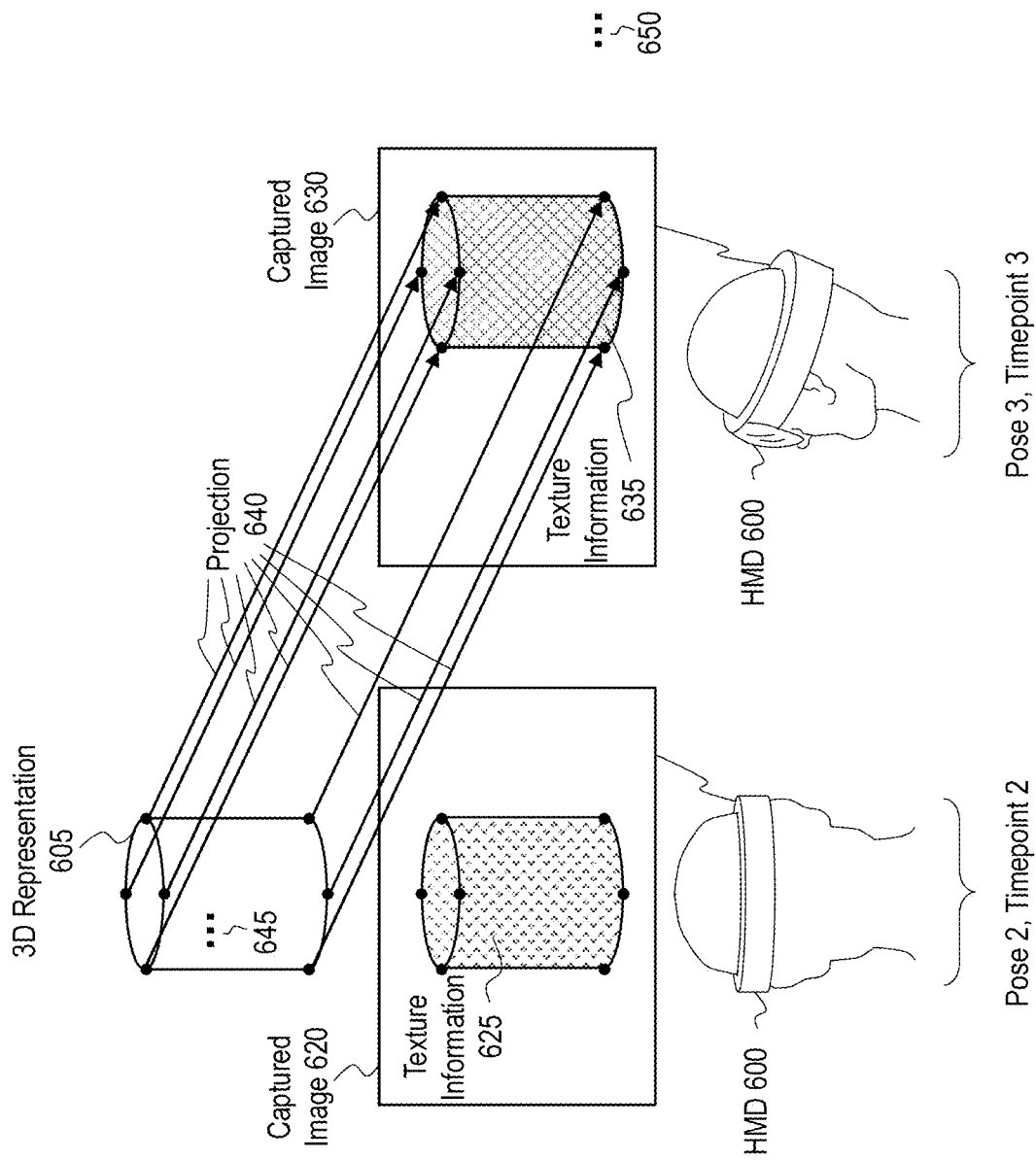
FIG. 6A illustrates an example of identifying additional texture information from an additional image of the environment.

FIG. 6A illustrates an example of an HMD 600 (or another system) identifying additional texture information 635 from an additional captured image 630 of the physical object 405 captured at timepoint 3 while the HMD 600 was associated with pose 3. In FIG. 5C, timepoint 3 and pose 3 referred to a display timepoint and a display pose, respectively, at which an HMD would display a composite image. In contrast, timepoint 3 and pose 3 in FIG. 6A refer to a timepoint and pose, respectively, at which the additional captured image 630 of the environment was captured. Furthermore, it should be noted that the HMD 600, the 3D representation 605, the captured image 620, and the texture information 625, depicted in FIG. 6A are representative of the HMD 500, the 3D representation 505, the captured image 520, and the texture information 525, respectively, from FIGS. 5B and 5C.

FIG. 6A illustrates that the texture information 635 of the physical object 405 depicted in the additional captured image 630 differs from the texture information 625 of the captured image 620. For example, the captured image 620 and the additional captured image 630 may have been captured using cameras of different modalities (e.g., one or more low light cameras and one or more thermal imaging cameras).

As depicted in FIG. 6A, in some instances, an HMD 600 associates 3D points of the 3D representation 605 with additional texture information 635 from additional captured image 630 by performing projection operations 640 based on pose 3. The projection operations 640 of FIG. 6A are similar to the projection operations 550 described hereinabove with reference to FIG. 5B. However, the projection operations 640 are performed based on pose 3 rather than pose 2 (e.g., in contrast with the projection operations 550). The ellipsis 645 indicates that an HMD may perform any number of projection operations 640 to identify texture information for the 3D points.

In some instances, the HMD 600 performs a set of projection operations (e.g., such as projection operations 550) to identify texture information 625 from captured image 620 for points of the 3D representation 605 and subsequently performs a set of projection operations 640 to identify additional texture information 635 from additional captured image 630 for at least some of the same 3D points of the 3D representation 605. Accordingly, in some instances, a 3D representation 605 may be associated with texture information (e.g., texture information 625 and additional texture information 635) from multiple sources (e.g., captured image 620 and additional captured image 630). The ellipsis 650 indicates that a 3D representation 605 may be associated with texture information from any number of sources (e.g., other captured images) by performing any number of sets of projection operations.

Although FIG. 6A illustrates an implementation in which captured image 620 and additional captured image 630 are captured by different cameras at different timepoints, those skilled in the art will recognize, in view of the present disclosure, that the cameras for capturing the captured image 620 and the additional captured image 630 may be synchronized such that images captured by the two cameras have common timestamps. However, since different cameras will have different positions on an HMD, an HMD may still perform separate projection operations to obtain texture information from images captured by different cameras.

Figure 6B:
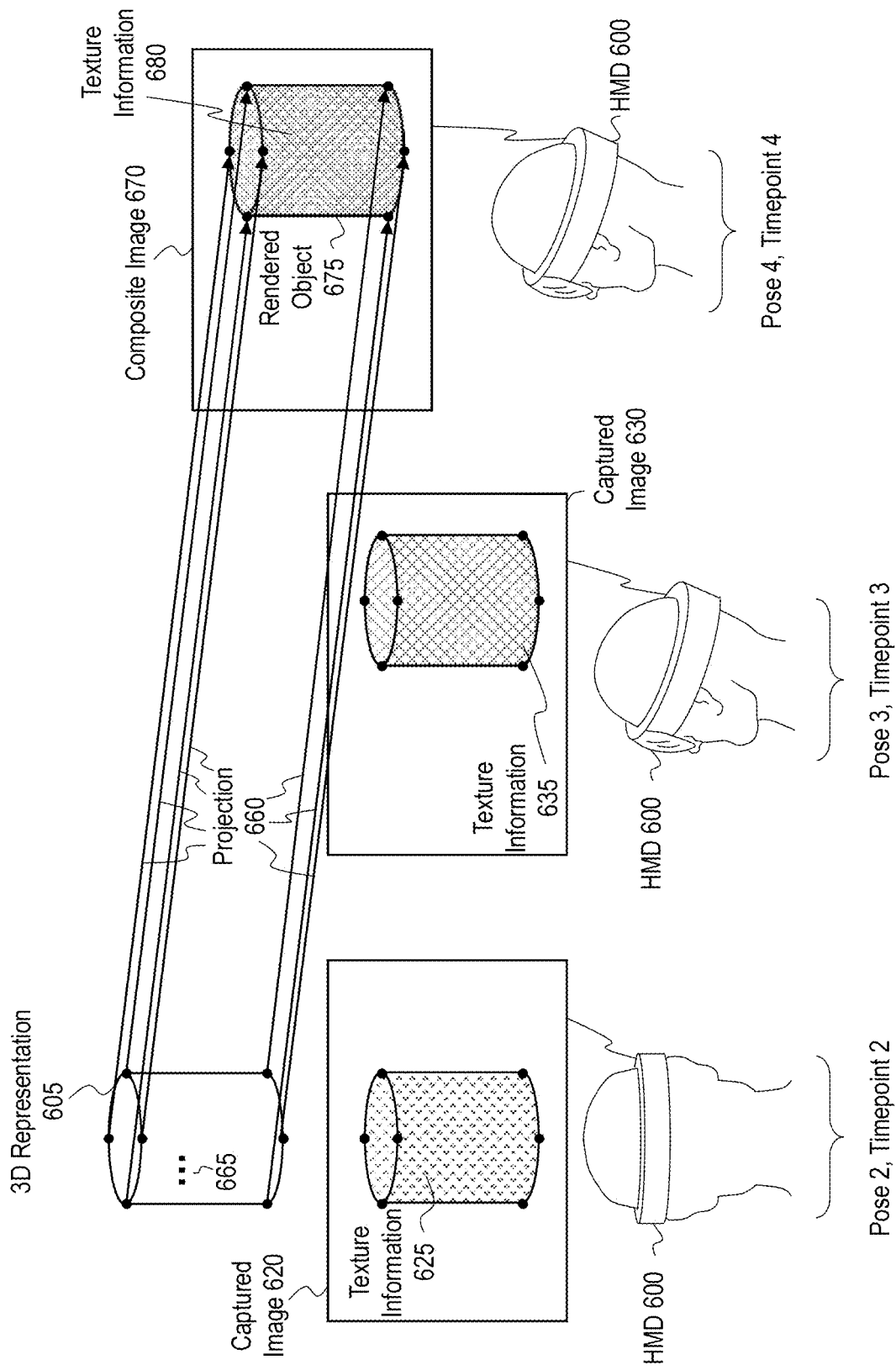
FIG. 6B illustrates an example of creating and displaying a composite image of the environment using the texture information and the additional texture information at a display timepoint.

FIG. 6B illustrates an example of an HMD 600 creating and displaying a composite image 670 that includes a rendered object 675 that represents the physical object 405. In some instances, the composite image 670, including the rendered object 675, is generated by performing projection operations 660 on points of the 3D representation 605 based on the display pose at the display timepoint, which FIG. 6B illustrates as pose 4 at timepoint 4. The projection operations 660 are similar to the projection operations 640 described hereinabove, but the projection operations 660 are performed based on pose 4 rather than pose 3 (e.g., in contrast with the projection operations 640). The ellipsis 665 indicates that projection operations 660 may be performed on any number of 3D points of the 3D representation 605 to generate the composite image 670.

As noted above, pose 4 and timepoint 4 of FIG. 6B may be considered the display pose and the display timepoint, respectively, for displaying the composite image 670. Furthermore, projections (e.g., projection operations 660) performed on 3D points to generate a composite image (e.g., composite image 670) for display at a display timepoint and a display pose may be regarded as display projections.

FIG. 6B illustrates that, in some implementations, the rendered object 675 of the composite image 670 includes texture that is based on multiple sources of texture information. For example, FIG. 6B illustrates the texture information 680 of the rendered object 675 as including texture components from the texture information 625 of the captured image 620 (e.g., identified according to projection operations 550 from FIG. 5B) and from the additional texture information 635 of the additional captured image 630 (e.g., identified according to projection operations 640 from FIG. 6A). Accordingly, in some instances, a composite image 670 can combine multiple textures from different captured images (or other sources) in a manner that compensates for any temporal offsets between the different captured images.

As shown in FIG. 6B, the poses and timepoints associated with captured image 620 and additional captured image 630 (poses 2 and 3 at timepoints 2 and 3, respectively) precede the display pose and the display timepoint. However, the poses and timepoints associated with captured image 620 and additional captured image 630 may be subsequent to the first pose and the first timepoint associated with a depth map used to generate the 3D representation 605 (e.g., depth map 510 of FIGS. 5A-5C associated with pose 1 and timepoint 1). Accordingly, the poses and timepoints associated with captured images that provide texture information for generating a composite image may be regarded as intermediate poses and intermediate timepoints, respectively. Similarly, projections performed on 3D points to identify texture information from captured images for the 3D points may be regarded as intermediate projections.

Example Method(s) for Temporal Corrections for Parallax Reprojection

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 7:
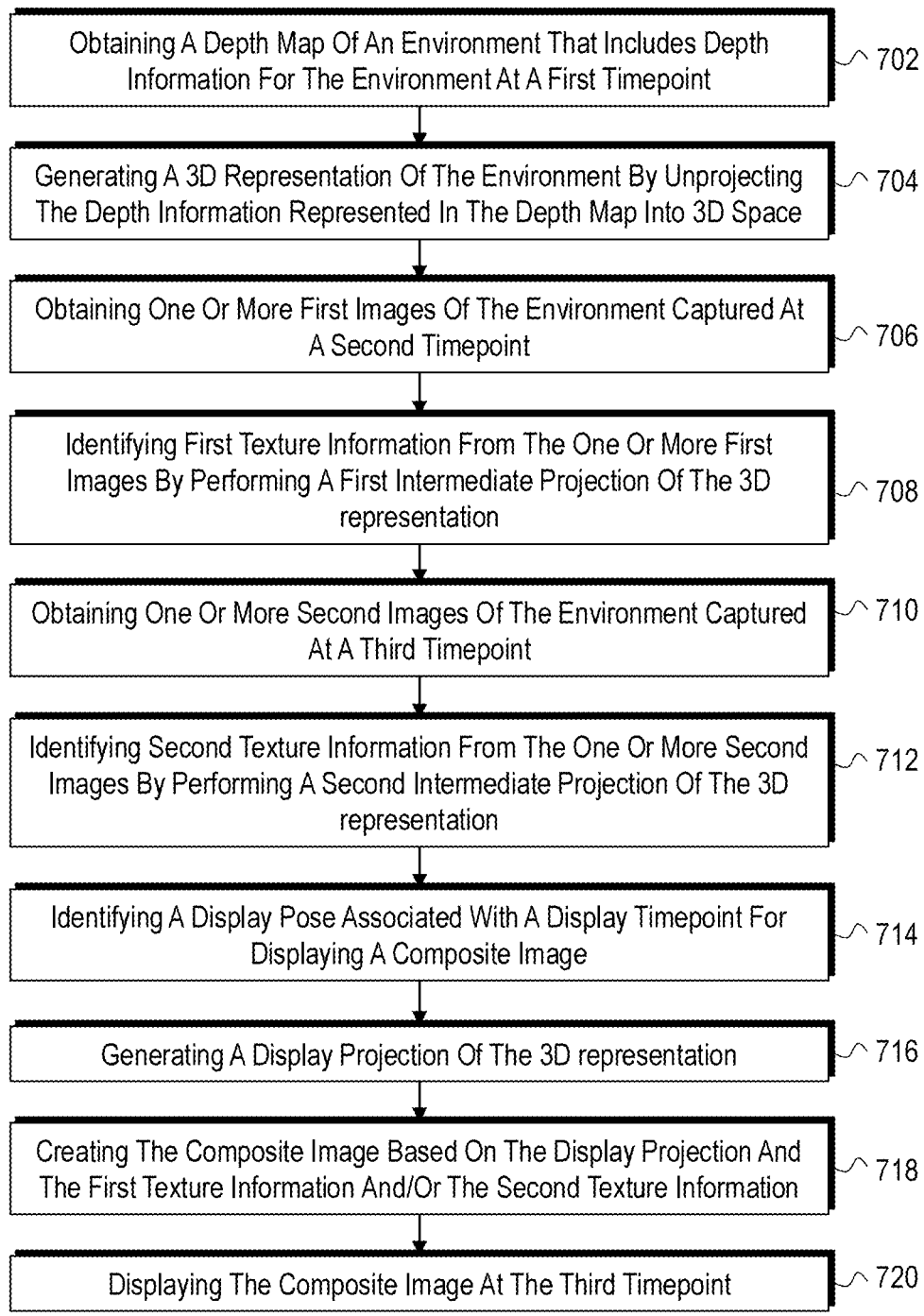
FIG. 7 illustrates an example flow diagram depicting acts associated with generating temporally corrected pass-through images.

FIG. 7 illustrates an example flow diagram 700 depicting acts associated with generating temporally corrected passthrough images. The discussion of the various acts represented in flow diagram 700 includes references to various hardware components described in more detail with reference to FIGS. 2 and 20.

Act 702 of flow diagram 700 includes obtaining a depth map of an environment that includes depth information for the environment at a first timepoint. Act 702 is performed, in some instances, using one or more scanning sensor(s) 205 of an MR system (e.g., any HMD described herein), such as visible light camera(s) 210, low light camera(s) 215, thermal imaging camera(s) 220, NIR camera(s), UV camera(s) 225, time of flight camera(s), etc. For example, in some instances, an MR system includes a stereo camera pair (e.g., a low light stereo camera pair) that captures a stereo pair of images for generating the depth map of the environment.

Act 704 of flow diagram 700 includes generating a 3D representation of the environment by unprojecting the depth information represented in the depth map into 3D space. Act 704 is performed, in some instances, using processor(s) 2005 of a computer system 2000 (e.g., any HMD described herein). For example, in some instances, a system may cast rays from a pose-dependent origin (e.g., determined from a pose of the system at the first timepoint associated with the depth map) based on points of depth information to distances that correspond to depth values associated with the points of depth information, providing 3D points in 3D space that form the 3D representation of the environment.

Act 706 of flow diagram 700 includes obtaining one or more first images of the environment captured at a second timepoint. Act 706 is performed, in some instances, using one or more scanning sensor(s) 205 of an MR system (e.g., any HMD described herein), such as visible light camera(s) 210, low light camera(s) 215, thermal imaging camera(s) 220, NIR camera(s), UV camera(s) 225, etc. For example, in some instances an MR system includes a stereo camera pair (e.g., a low light stereo camera pair) that captures the one or more first images of the environment. In some implementations, a same low light stereo camera pair captures images used to generate the depth map (e.g., according to Act 702) and subsequently captures the one or more first images of the environment.

In some instances, the one or more first images are captured in association with a first intermediate pose, which may differ from a pose associated with the depth maps obtained according to act 702. The first intermediate pose (or any pose discussed herein) may be a 3DOF pose or a 6DOF pose, as recorded using sensor(s) 250 of a system (e.g., visual tracking system(s), inertial tracking system(s), as described hereinabove).

Act 708 of flow diagram 700 includes identifying first texture information from the one or more first images by performing a first intermediate projection of the 3D representation. Act 708 is performed, in some instances, using processor(s) 2005 of a computer system 2000 (e.g., any HMD described herein). For example, a system may cast rays from the 3D points of the 3D representation toward a pose-dependent point (e.g., determined from the first intermediate pose of the system referred to in Act 706), and the rays may identify points of texture information for the 3D points from the one or more first images (e.g., based on pixel coordinates of the pixels of the one or more first images that lie on a front image plane positioned with respect to a camera at the first intermediate pose that captured the one or more first images).

Act 710 of flow diagram 700 includes obtaining one or more second images of the environment captured at a third timepoint. Act 710 is performed, in some instances, using one or more scanning sensor(s) 205 of an MR system (e.g., any HMD described herein), such as visible light camera(s) 210, low light camera(s) 215, thermal imaging camera(s) 220, NIR camera(s), UV camera(s) 225, etc. In some instances, the third timepoint occurs with a second intermediate pose associated with the system. In some instances, the third timepoint is subsequent to the second timepoint, whereas, in other instances, the third timepoint is the same as the second timepoint (e.g., where the cameras that capture the one or more first images and the one or more second images are temporally synchronized). In some implementations, an MR includes one or more cameras of a different modality than the modality of the camera(s) that captured the one or more first images according to Act 706. In one example, an HMD includes a stereo pair of low light cameras for capturing the one or more first images and a stereo pair of thermal imaging cameras for capturing the one or more second images.

Act 712 of flow diagram 700 includes identifying second texture information from the one or more second images by performing a second intermediary projection of the 3D representation. Act 712 is performed, in some instances, using processor(s) 2005 of a computer system 2000 (e.g., any HMD described herein). For example, a system may cast rays from the 3D points of the 3D representation toward a pose-dependent point (e.g., determined from the second intermediate pose of the system referred to in Act 710), and the rays may identify points of texture information for the 3D points from the one or more second images (e.g., based on pixel coordinates of the pixels of the one or more second images that lie on a front image plane positioned with respect to a camera at the second intermediate pose that captured the one or more second images).

Act 714 of flow diagram 700 includes identifying a display pose associated with a display timepoint for displaying a composite image. Act 714 is performed, in some instances, using processor(s) 2005 and/or sensor(s) 250 (e.g., visual tracking system(s), inertial tracking system(s), as described hereinabove) of a computer system 2000 (e.g., any HMD described herein). In some instances, the display timepoint is a future timepoint (e.g., relative to the time that the system identifies the display timepoint/display pose) and the display pose is a predicted pose that is predicted to be associated with an HMD at the future display timepoint. In some instances, an HMD identifies a predicted pose based on analysis of changes in the pose of the HMD prior to the display timepoint.

Act 716 of flow diagram 700 includes generating a display projection of the 3D representation. Act 716 is performed, in some instances, using processor(s) 2005 of a computer system 2000 (e.g., any HMD described herein). For example, a system may cast rays from 3D points of the 3D representation that were associated with the first texture information and the second texture information obtained from the first intermediate projection and/or the second intermediate projection of the 3D representation (e.g., according to Acts 708 and 712). The system may cast the rays of the 3D points toward an identified pose-dependent viewpoint (e.g., associated with a one or more eyes of a user), and the rays may identify pixel coordinates for the composite image 570 (e.g., pixel coordinates of pixels of the composite image 570 as the pixels lie on a front image plane positioned with respect to the identified pose-dependent viewpoint).

Act 718 of flow diagram 700 includes creating the composite 2D image based on the display projection and the first texture information and/or the second texture information. Act 718 is performed, in some instances, using processor(s) 2005 and/or graphics rendering engine(s) 2025 of a computer system 2000 (e.g., any HMD described herein). For example, in some implementations, a system builds the pixels of the composite image using the identified pixel coordinates (e.g., identified according to the display projection of Act 716) with the geometry and/or texture information associated with the projected 3D points of the 3D representation (e.g., the first and/or second texture information identified according to Acts 708 and/or 712).

In some instances, a system creates the composite image by modifying and/or overlaying the one or more first and/or second captured images based on the display projection. In other instances, a system generates/updates/modifies a UV map with the first and/or second texture information to apply the UV map to a rendering of the 3D representation according to the display pose. In some instances, the composite image includes one or more parallax-corrected images, whereas, in other instances, the composite image is/are not parallax-corrected.

Act 720 of flow diagram 700 includes display the composite image at the display timepoint. Act 720 is performed, in some instances, using processor(s) 2005, graphics rendering engine(s) 2025, display system(s) 2030, and/or I/O interface(s) 2035 of a computer system 2000 (e.g., any HMD described herein). In some instances, a system displays composite images to each of a user's eyes at the display timepoint, thereby providing pass-through imaging to the user that corrects for temporal offsets that may exist among the various components used to generate and display the composite images.

Compensating for Rolling Shutter Artifacts

Figure 8A:
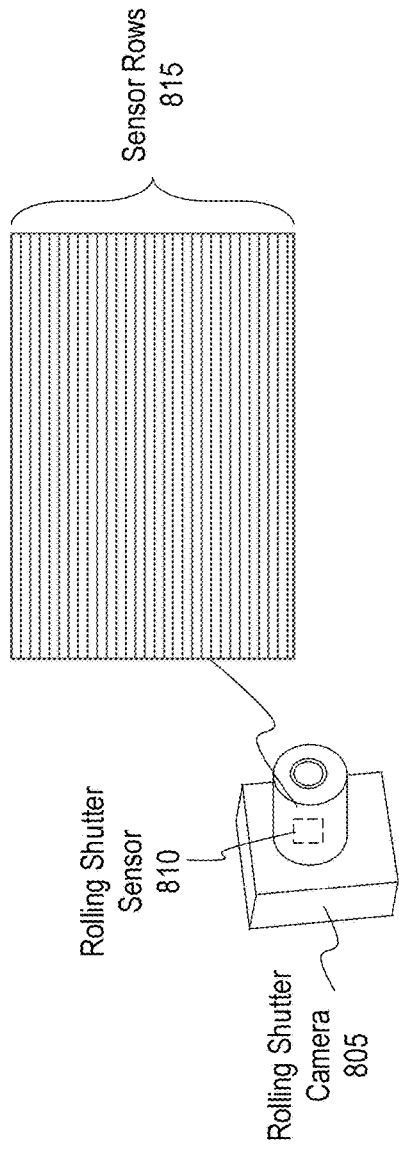
FIG. 8A illustrates an example of a rolling shutter camera.

Attention is now directed to FIG. 8A, which illustrates an example of a rolling shutter camera 805. The rolling shutter camera 805 includes a rolling shutter sensor 810, which includes a set of sensor rows 815. In some instances, the different sensor rows 815 of the rolling shutter sensor 810 are configured to integrate and/or readout sensor data captured by the various sensor rows 815 in sequence, rather than simultaneously. For example, a rolling shutter sensor 810 may begin integration at an initial row (e.g., a top or bottom row of the sensor rows 815), read out the initial row, and then proceed to integrate and read out a subsequent row of the sensor rows 815. Thus, when capturing an image with a rolling shutter sensor 810, each sensor row 815 has a different integration and/or readout timestamp, and temporal offsets will exist among sensor data that is output from the different sensor rows 815.

Although the present disclosure focuses, in some respects, on rolling shutter sensors 810 that include horizontal sensor rows 815 with the top row as the initial row for readout/integration, those skilled in the art will recognize, in view of the present disclosure, that the principles disclosed herein may be applied to any rolling shutter sensor configuration, such as rolling shutter sensors that use a bottom row as the initial row for readout/integration or rolling shutter sensors with vertical sensor columns.

Figure 8B:
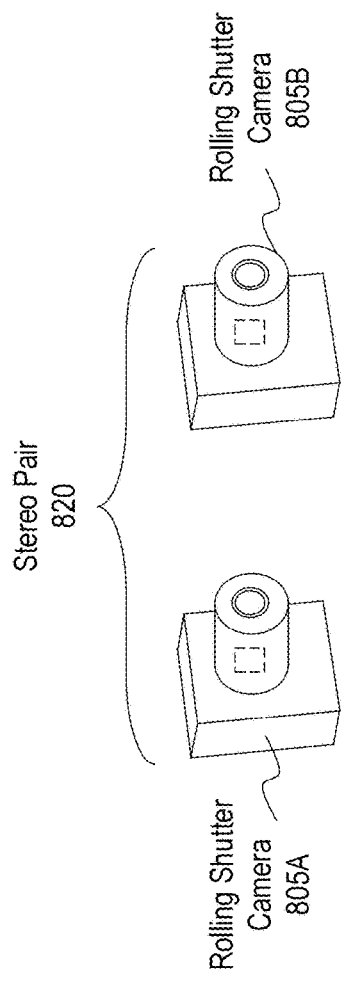
FIG. 8B illustrates an example of a stereo pair of rolling shutter cameras.

FIG. 8B illustrates an example of a stereo pair of rolling shutter cameras 820 that includes a first rolling shutter camera 805A and a second rolling shutter camera 805B. In some instances, the first and second rolling shutter cameras 805A and 805B are synchronized in exposure times, such that the corresponding sensor rows of the first and second rolling shutter cameras 805A and 805B have common readout/integration timestamps.

Figure 9A:
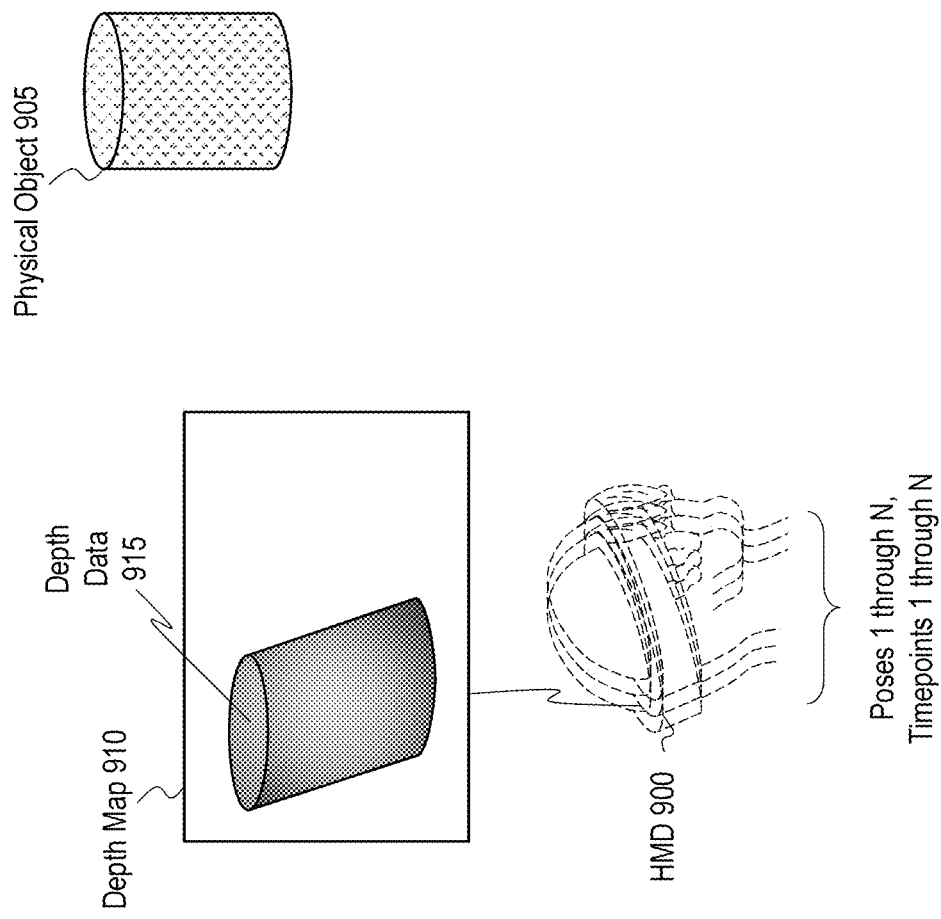
FIG. 9A illustrates an example of generating a depth map of an environment based on images that include rolling shutter artifacts.

In some implementations, a system (e.g., an HMD) utilizes a stereo pair of rolling shutter cameras 820 to capture images of an environment. For example, FIG. 9A illustrates an HMD 900 that captures a stereo pair of an environment including the physical object 905 using a stereo pair of rolling shutter cameras 820. The HMD 900 may correspond to any HMD described herein (e.g., HMD 200, HMD 300, etc.). The HMD 900 performs depth calculations on the stereo pair of images captured using the stereo pair of rolling shutter cameras 820 to generate a depth map 910 that includes depth data 915 that is representative of the physical object 905 within the environment (e.g., similar to FIG. 4A described hereinabove).

However, FIG. 9A illustrates that the depth map 910 includes rolling shutter artifacts (e.g., the depth data 915 of the depth map 910 depicting the physical object 905 is warped as compared with the real-world shape of the physical object 905). For example, as depicted in FIG. 9A, because the HMD 900 captures the stereo pair of 2D images used to generate the depth map 910 with a stereo pair of rolling shutter cameras 820, the stereo pair of images are captured over a time interval including timepoints 1 through N (e.g., because of the integration/readout time offset that exists between different sensor rows of the stereo pair of rolling shutter cameras 820). For example, each sensor rows of a rolling shutter camera (805A or 805B) of the stereo pair of rolling shutter cameras 820 may integrate/readout sensor data at a different timepoint (e.g., row 1 at timepoint 1, row 2 at timepoint 2, etc.).

In some instances, throughout the time interval that includes timepoints 1 through N, a user operating the HMD 900 changes their head position, resulting in separate poses (i.e., poses 1 through N) of the HMD 900 for each of the different timepoints 1 through N (which may result in more prevalent artifacts for real-world objects that are close to the user, whereas objects that are far from the user may experience minimal artifacts). Accordingly, the sensor rows of the stereo pair of rolling shutter cameras 820 may capture the environment, including the physical object 905, at separate poses 1 through N for the different timepoints 1 through N, and the separate poses 1 through N may be different from one another. The different capture poses 1 through N may give rise to rolling shutter artifacts in images captured by the stereo pair of rolling shutter cameras 820, as each row begins and ends the exposure time at a slightly different time. Thus, the depth map 910 generated based on the captured images may also include the rolling shutter artifacts (as shown in FIG. 9A).

Figure 9B:
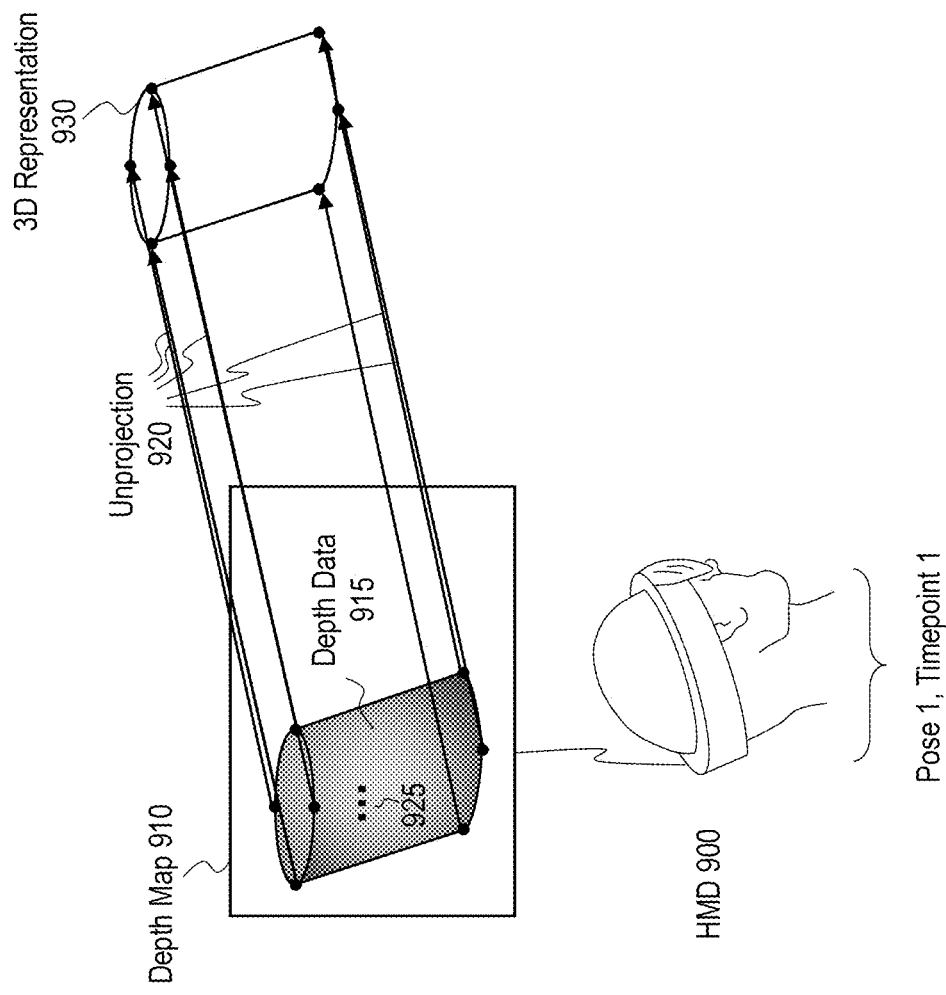
FIG. 9B illustrates an example of generating a 3D representation of the environment using the depth map that was based on images that include rolling shutter artifacts.

Rolling shutter artifacts present in a captured image may affect images used to identify texture information for a composite image and may affect depth maps generated based on the captured image. For example, rolling shutter artifacts in a depth map may give rise to inaccuracies when generating a 3D representation of an environment based on the depth map. For example, FIG. 9B illustrates an example of the HMD 900 (or another system) generating a 3D representation 930 of the environment that includes the physical object 905 using the depth map 910 that was generated based on images that include rolling shutter artifacts. The HMD 900 of FIG. 9B performs unprojection operations 920 on the points of depth data 915 of the depth map 910 to generate the 3D representation. The unprojection operations 920 of FIG. 9B are based on pose 1 and may correspond to the unprojection operations 540 described hereinabove with reference to FIG. 5A. In some instances, pose 1 is a pose at which some but not all of the sensor rows of a rolling shutter camera captured sensor data to generate an image for forming the depth map 910. The ellipsis 925 indicates that an HMD 900 may perform any number of unprojection operations 920 on any number of points of depth data 915 to generate the 3D representation 930.

Because the depth map 910 includes rolling shutter artifacts that result in a warped measurement of the physical object 905, FIG. 9B illustrates that performing unprojection operations 920 based on a single pose (e.g., pose 1) to generate the 3D representation 930 of the physical object 905 may result in a 3D representation 930 that also appears warped as compared with the real-world shape of the physical object 905. A warped 3D representation 930 of the physical object may cause inaccuracies in operations that are based on the 3D representation 930 (e.g., identifying texture information from other images as shown in FIGS. 5B and 6A, generating composite images as shown in FIGS. 5C and 6B, etc.).

Accordingly, FIGS. 10A-12C illustrate example techniques for compensating for rolling shutter artifacts that may exist in depth maps used to generate a 3D representation of an environment.

Figure 10B:
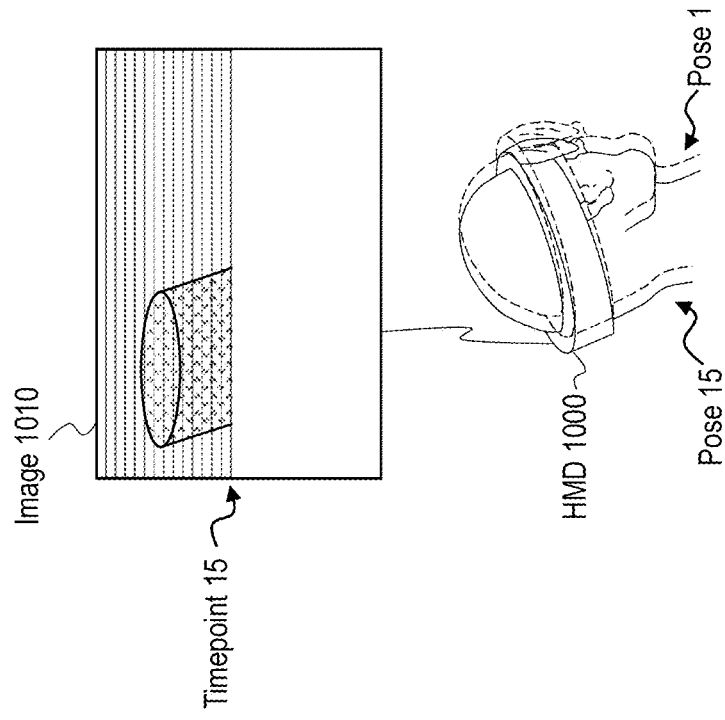
FIGS. 10A-10C illustrate an example of identifying poses associated with a mixed-reality system at different timepoints while capturing an image with a rolling shutter sensor.
Figure 10A:
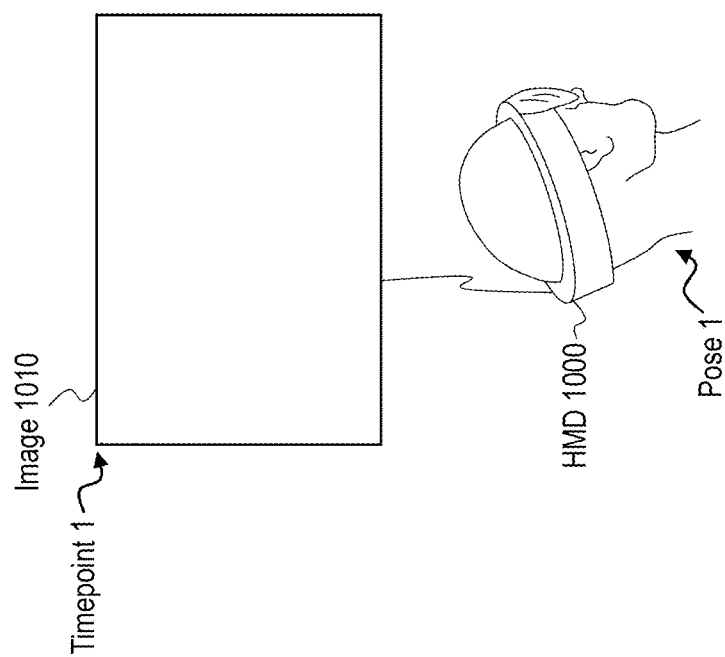
Figure 10C:
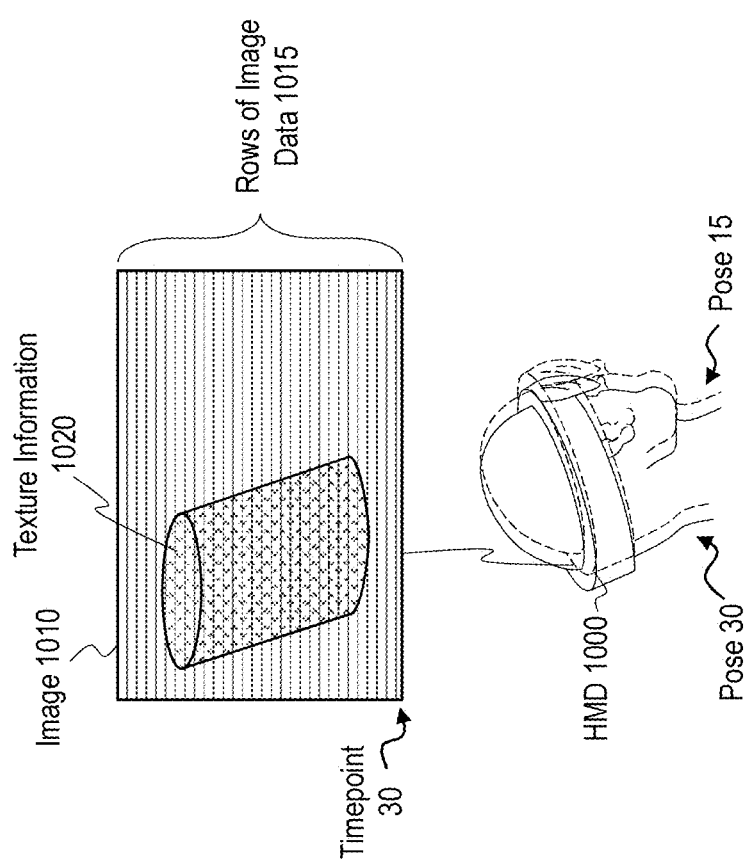

As noted hereinabove, the sensor rows 815 of a rolling shutter sensor 810 have different integration and readout timepoints (e.g., timepoints 1 through N), and an HMD associated with the rolling shutter sensor 810 may have separate poses at the different timepoints (e.g., poses 1 through N). FIGS. 10A-10C illustrate an example of identifying poses associated with an HMD 1000 at different integration/readout timepoints while capturing an image 1010 with a rolling shutter sensor that includes 30 sensor rows (for illustrative purposes).

For instance, FIG. 10A illustrates the HMD 1000 at pose 1 during timepoint 1 at which row 1 of a rolling shutter sensor integrates/reads out to generate the image 1010. The HMD 1000 may identify pose 1 using inertial tracking and/or visual tracking systems of the HMD 1000, as described hereinabove with reference to FIG. 2. In some implementations, the HMD 1000 associates the identified pose 1 with timepoint 1, which is the readout/integration timepoint of row 1 while capturing the image 1010.

Similarly, FIG. 10B illustrates the HMD 1000 at pose 15 during timepoint 15 at which row 15 of the rolling shutter sensor integrates/reads out to generate the image 1010. FIG. 10B illustrates that pose 15 is separate from pose 1, and that pose 15 is different than pose 1. In some implementations, the HMD 1000 associates the identified pose 15 with timepoint 15, which is the readout/integration timepoint of row 15 while capturing the image 1010.

Furthermore, FIG. 10C illustrates the HMD 1000 at pose 30 during timepoint 30 at which row 30 of the rolling shutter sensor integrates/reads out to generate the image 1010. FIG. 10C illustrates that pose 30 is separate from poses 1 and 15, and that pose 30 is different than poses 1 and 15. In some implementations, the HMD 1000 associates the identified pose 30 with timepoint 30, which is the readout/integration timepoint of row 30 while capturing the image 1010.

Although FIGS. 10A-10C only explicitly illustrate a few timepoints and poses that may occur while capturing the image 1010, those skilled in the art will recognize, in view of the present disclosure, that an HMD 1000 may associate a pose with any number of rows and/or readout/integration timepoints of a rolling shutter sensor as the rolling shutter sensor captures an image of an environment. For example, in some instances, an HMD 1000 associates a separate pose with each row and/or readout/integration timepoint of a rolling shutter sensor as the rolling shutter sensor captures an image of an environment (e.g., pose 1 for row 1 and/or timepoint 1, pose 2 for row 2 and/or timepoint 2, pose 3 for row 3 and/or timepoint 3, . . . , pose 30 for row 30 and/or timepoint 30). FIG. 10C furthermore shows that, in some instances, an image 1010 captured using a rolling shutter sensor includes texture information 1020 for objects represented in the image 1010 (e.g., physical object 905). In addition, FIG. 10C illustrates that an image 1010 captured by a rolling shutter sensor may be described as having rows of image data 1015, with each row of image data 1015 corresponding to a sensor row of the rolling shutter sensor.

Figure 11:
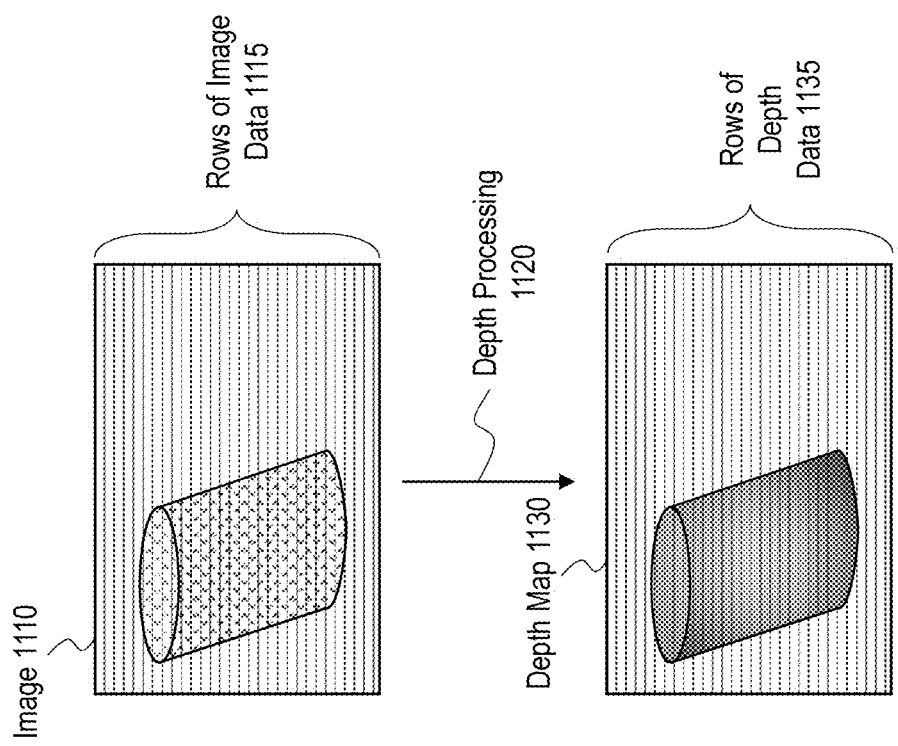
FIG. 11 illustrates an example of generating a depth map using one or more images captured with a rolling shutter sensor.

FIG. 11 illustrates an example of generating a depth map 1130 using at least an image 1110 captured with a rolling shutter sensor. The image 1110 and the rows of image data 1115 of FIG. 11 correspond to the image 1010 and rows of image data 1015 of FIG. 10C. In some instances, an HMD performs depth processing 1120 (e.g., stereo matching) on the image 1110 (e.g., where the image 1110 is one of a stereo pair of images) to generate the depth map 1130. Furthermore, FIG. 11 illustrates that the depth map 1130 may be described as having rows of depth data 1135 that correspond to the rows of image data 1115. Therefore, each row of depth data 1135 may correspond to a sensor row of the rolling shutter sensor.

Figure 12A:
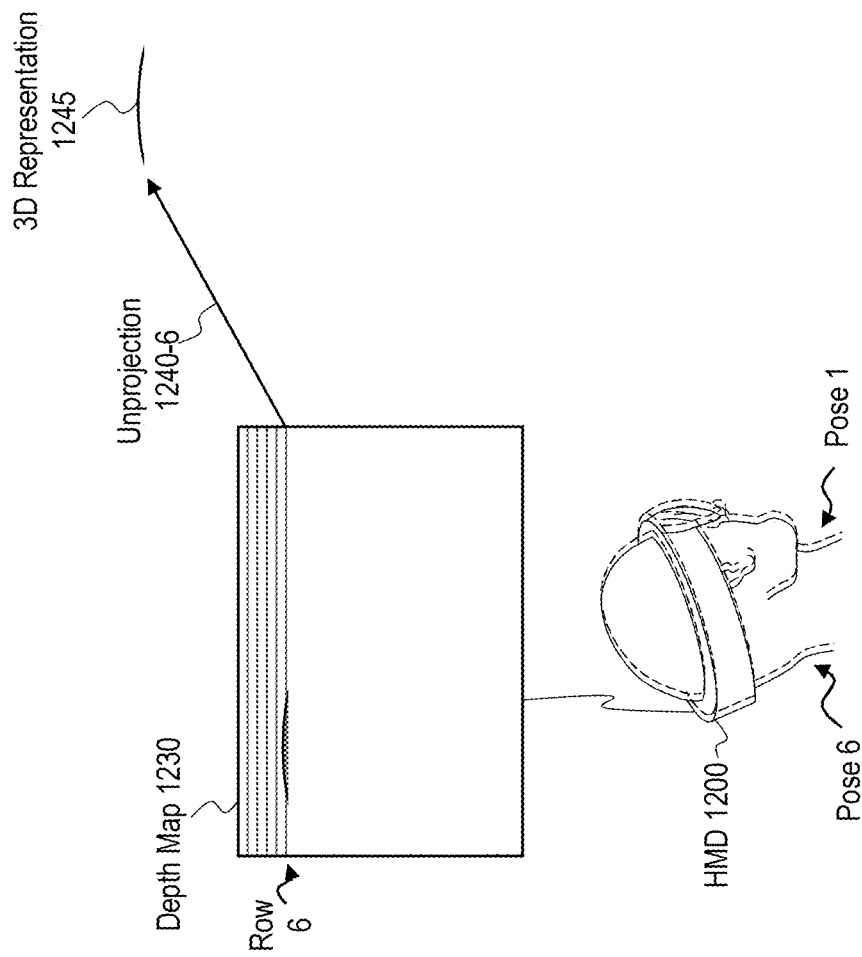
FIGS. 12A-12C illustrate an example of generating a 3D representation of an environment using a depth map based on images captured with a rolling shutter sensor.
Figure 12B:
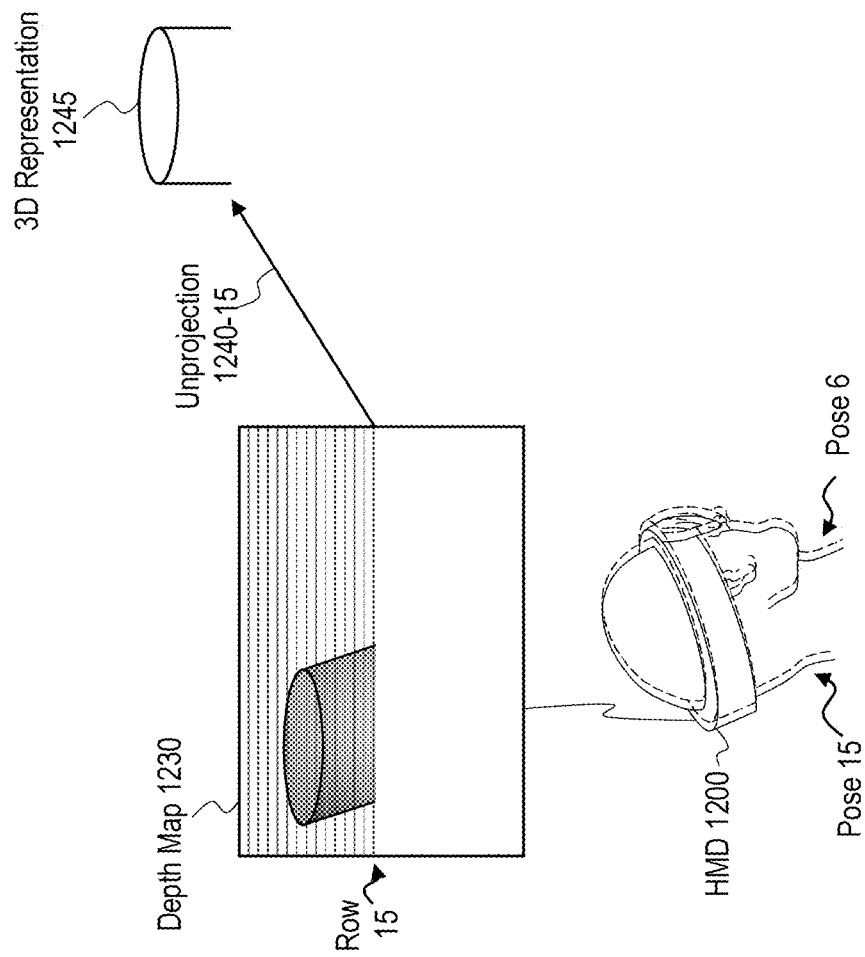
Figure 12C:
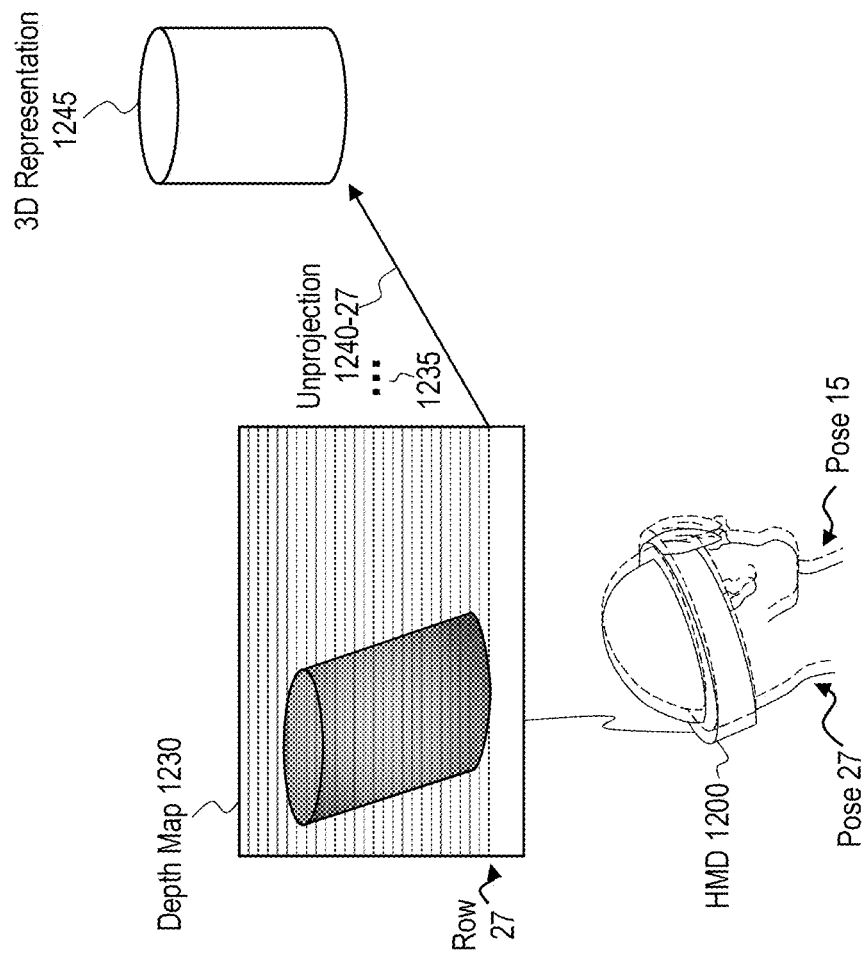

FIGS. 12A-12C illustrate an example of an HMD 1200 generating a 3D representation 1245 of an environment that includes the 3D object 905 by performing unprojection operations 1240 using the depth map 1230 that was generated based on images that include rolling shutter artifacts. However, in contrast with FIG. 9B described hereinabove, the HMD 1200 generates the 3D representation 1245 by performing unprojection operations 1240 that use different poses for unprojecting the different rows of depth data of the depth map 1230.

The HMD 1200 of FIGS. 12A-12C correspond to any HMD described herein, and depth map 1230 of FIGS. 12A-12C corresponds to the depth map 1130 from FIG. 11.

In some instances, an HMD 1200 performs unprojection operations 1240 for each row of depth data of the depth map 1230 sequentially (e.g., rather than in parallel). For example, FIG. 12A depicts the HMD 1200 performing unprojection operations 1240-6 on points that lie on row 6 of the depth data of the depth map 1230. In some instances, the HMD performs the unprojection operations 1240-6 on row 6 of depth data after performing unprojection operations on the rows of depth data that precede row 6 (e.g., after performing unprojection operations 1240-1, 1240-2, 1240-3, 1240-4, 1240-5, etc.). Accordingly, the 3D representation 1245 of FIG. 12A is only partially formed.

In some implementations, the HMD 1200 performs the unprojection operations 1240-6 using the pose that was associated with the HMD 1200 while sensor row 6 of a rolling shutter sensor of the HMD 1200 integrated/read out sensor data for forming an image (e.g., image 1110 from FIG. 11) that was used to generate the depth map 1230. For example, in some instances, an HMD 1200 performs unprojection operations 1240-6 using pose 6 that existed for row 6 at timepoint 6, as described hereinabove with reference to FIGS. 10A-10C. FIG. 12A depicts HMD 1200 at pose 6 for illustrative purposes.

FIG. 12B depicts the HMD 1200 performing unprojection operations 1240-15 on points that lie on row 15 of the depth data of the depth map 1230. As with FIG. 12A, the 3D representation 1245 of FIG. 12B is only partially formed. In some implementations, the HMD 1200 performs the unprojection operations 1240-15 using the pose that was associated with the HMD 1200 while sensor row 15 of a rolling shutter sensor of the HMD 1200 integrated/read out sensor data for forming an image (e.g., image 1110 from FIG. 11) that was used to generate the depth map 1230. For example, in some instances, an HMD 1200 performs unprojection operations 1240-15 using pose 15 that existed for row 15 at timepoint 15, as described hereinabove with reference to FIGS. 10A-10C. FIG. 12B depicts HMD 1200 at pose 15 for illustrative purposes.

FIG. 12C depicts the HMD 1200 performing unprojection operations 1240-27 on points that lie on row 27 of the depth data of the depth map 1230. In some implementations, the HMD 1200 performs the unprojection operations 1240-27 using the pose that was associated with the HMD 1200 while sensor row 27 of a rolling shutter sensor of the HMD 1200 integrated/read out sensor data for forming an image (e.g., image 1110 from FIG. 11) that was used to generate the depth map 1230. For example, in some instances, an HMD 1200 performs unprojection operations 1240-27 using pose 27 that existed for row 27 at timepoint 27, as described hereinabove with reference to FIGS. 10A-10C. FIG. 12C depicts HMD 1200 at pose 27 for illustrative purposes.

Although FIGS. 12A-12C only explicitly illustrate unprojection operations 1240 for a few rows of depth data of the depth map 1230, those skilled in the art will recognize, in view of the present disclosure, that an HMD 1200 may perform any number of unprojection operations 1240 on any number of rows of depth data of the depth map 1230 to generate the 3D representation (as indicated in FIG. 12C by the ellipsis 1235).

FIG. 12C illustrates that, by performing unprojection operations 1240 on a per-row basis, with each row of depth data being unprojected using a pose that existed at a timepoint at which a corresponding row of image data was captured by a rolling shutter sensor, the HMD 1200 generates the 3D representation 1245 in a manner that compensates for rolling shutter artifacts that may have existed in the depth map 1230 and/or images used to generate the depth map 1230 (e.g., image 1110 from FIG. 11). For example, the 3D representation 1245 comprises a representation of the physical object 905 that emulates the real-world shape of the physical object 905.

Figure 13:
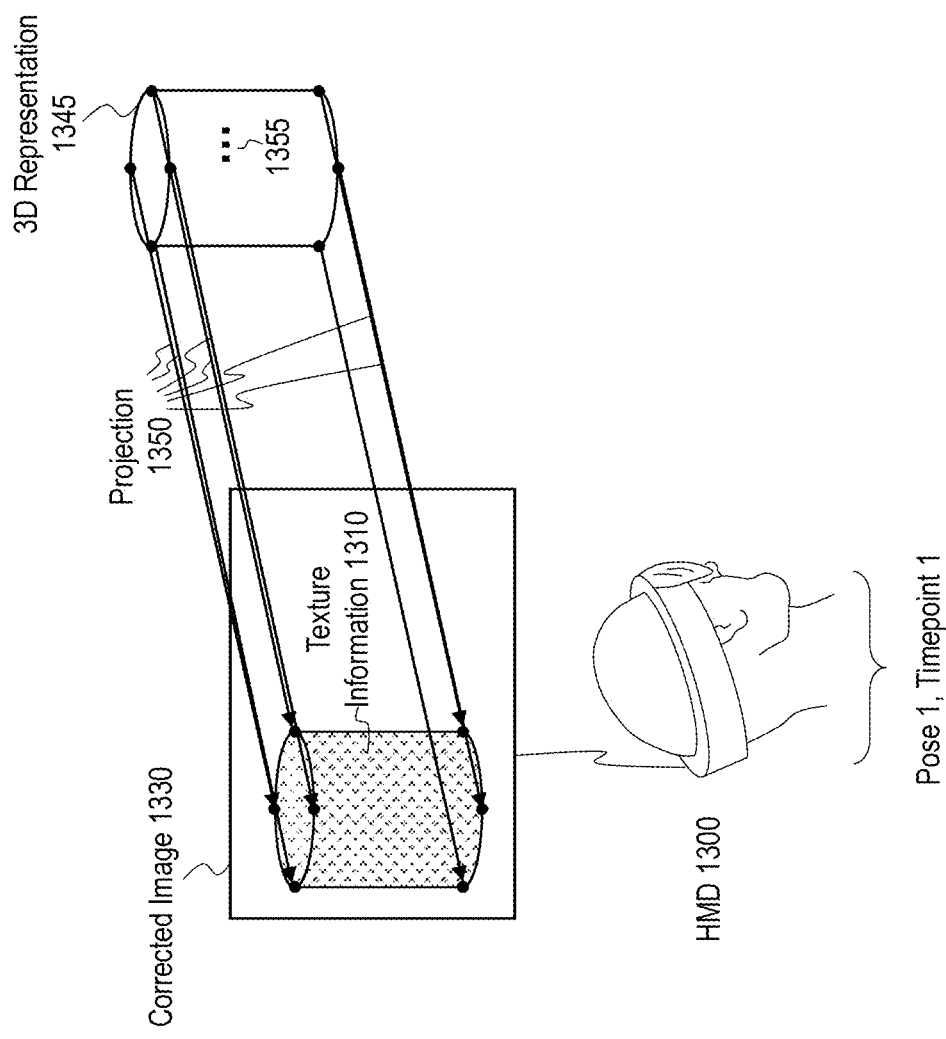
FIG. 13 illustrates an example of generating a corrected image of an environment that compensates for rolling shutter artifacts.

A system may utilize a 3D representation of an environment for various purposes (e.g., 3D representation 1245). For example, FIG. 13 illustrates an example of an HMD 1300 (or another system) generating a corrected image 1330 of an environment that includes the physical object 905. In some instances, an HMD 1300 generates the corrected image 1330 by performing projection operations 1350 on various 3D points of the 3D representation 1345 using a single pose, such as pose 1 depicted in FIG. 13. The projection operations 1350 correspond to the projection operations 560 and 660 described hereinabove with reference to FIGS. 5C and 6B, respectively (although projection operations 1350 may be performed using a different pose), and the ellipsis 1355 indicates that an HMD 1300 may perform any number of projection operations 1350 to generate a corrected image 1330. Furthermore, the HMD 1300 corresponds to any HMD described herein, and the 3D representation 1345 corresponds to the 3D representation 1245 described hereinabove with reference to FIGS. 12A-12C.

Because the 3D representation 1345 compensates for rolling shutter artifacts that may have existed in the depth map used to generate the 3D representation 1345 (e.g., depth map 1230 from FIGS. 12A-12C), a corrected image 1330 generated based on the 3D representation 1345 will also compensate for such rolling shutter artifacts.

FIG. 13 also illustrates that, in some instances, the corrected image 1330 includes texture information 1310 which may be based on one or more images of the environment that includes the physical object 905. For example, in some instances, the texture information 1310 is based on texture information from one or more images of the environment used to generate the depth map for forming the 3D representation 1345 (e.g., texture information 1020 from image 1010 from FIG. 10C). For example, one or more images of the environment used to generate the depth map for forming the 3D representation 1345 may also be used to texturize the 3D representation. For example, for each pixel of depth data of a depth map used to generate the 3D representation 1345, an HMD 1300 may identify texture information from a corresponding pixel in one or more images used to generate the depth map. After unprojecting the pixels of depth data to obtain 3D points of the 3D representation 1345, the HMD 1300 may apply the identified texture information to pixels of a corrected image 1330 based on the projection operations 1350 on the 3D points of the 3D representation 1345. Notably, the texture information 1310 of the corrected image 1330 may compensate for any rolling shutter artifacts that may have been present in the images used to generate the depth map.

In some instances, the texture information 1310 is based on texture information from one or more other images of the environment that includes the physical object 905. For example, in some instances, an HMD 1300 identifies texture information from an image captured at a timepoint that is subsequent to a timepoint associated with the images used to generate the depth map for forming the 3D representation 1345. For example, referring briefly to FIG. 5B, the captured image 520 may be captured using a global shutter sensor (e.g., where all sensor rows/columns integrate/readout simultaneously) such that the captured image 520 avoids rolling shutter artifacts. An HMD 1300 may perform projection operations similar to the projection operations 550 of FIG. 5B (e.g., using pose 2, a single pose associated with the capture of captured image 520) to associate the 3D points of the 3D representation 1345 with texture information 525 from the captured image 520.

In other instances, the texture information 1310 is based on texture information from one or more images captured using a rolling shutter sensor at timepoints subsequent to a timepoint associated with the images used to generate the depth map for forming the 3D representation 1345. Such implementations will be described in more detail hereinbelow with reference to FIGS. 15A-16C.

Although the descriptions of FIGS. 10A-12C focus, in some respects, on generating a 3D representation 1245 by performing unprojection operations that are based on depth values of a depth map, the disclosed systems are alternatively or additionally configured, in some instances, to perform unprojection operations using any depth value, such as a fixed depth value (e.g., 10 meters, infinity, etc.), in order to generate a 3D representation for at least partially compensating for rolling shutter artifacts. Accordingly, in some instances, an HMD may perform reprojection operations to compensate for rolling shutter artifacts without using a depth map.

Furthermore although FIGS. 12A-12C focus, on some respects, on implementations in which a system obtains/uses separate poses for unprojecting each different row of depth data of a depth map, some disclosed systems are also configured to alternatively and/or additionally perform unprojection operations to generate a 3D representation using different degrees of granularity. For example, FIG. 14 illustrates that, in some instances, an HMD may perform unprojection operations (e.g., unprojection operations 1240 from FIGS. 12A-12C) on multiple rows of depth data 1435 of a depth map 1430 using a single pose.

Figure 14:
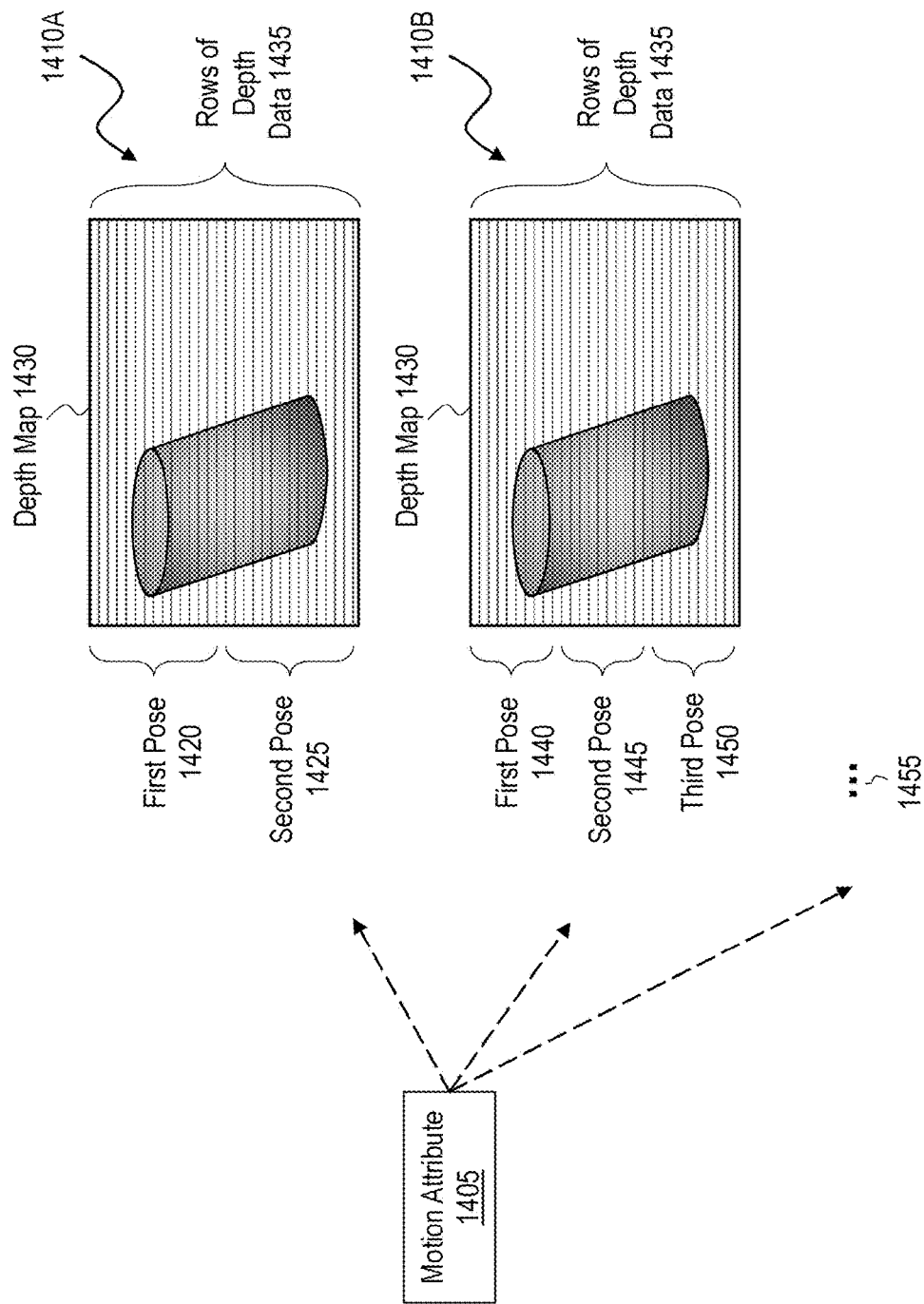
FIG. 14 illustrates an example of associating poses of a mixed-reality system with data from multiple sensor rows of a rolling shutter sensor.

FIG. 14 illustrates configuration 1410A in which a first section of the rows of depth data 1435 become unprojected using a first pose 1420, and in which a second section of the rows of depth data 1435 become unprojected using a second pose 1425. In some instances, the first pose 1420 is a pose associated with one row of the first section of rows of depth data 1435, and the second pose 1425 is a pose associated with one row of the second section of rows of depth data 1435.

FIG. 14 also illustrates configuration 1410B in which a first section of the rows of depth data 1435 become unprojected using a first pose 1440, and in which a second section of the rows of depth data 1435 become unprojected using a second pose 1445, and a third section of the rows of depth data 1435 become unprojected using a third pose 1450. In some instances, the first pose 1440 is a pose associated with one row of the first section of rows of depth data 1435, the second pose 1445 is a pose associated with one row of the second section of rows of depth data 1435, and the third pose 1450 is a pose associated with one row of the third section of rows of depth data 1435. The ellipsis 1455 indicates that any number of other configurations may exist (e.g., a configuration in which each row of depth data 1435 becomes unprojected using a separate pose, according to FIGS. 12A-12C).

Relatedly, in situations where a system will unproject the rows of depth data using fewer poses than there are rows of depth data (or sensor rows of a rolling shutter sensor), a system may identify/store fewer poses while a rolling shutter sensor captures an image of an environment. For example, referring to FIGS. 10A-10C, a system need not identify/store a pose for each timepoint of sensor readout/integration of a rolling shutter sensor. In some instances, a system identifies a pose for every other timepoint, or every third timepoint, etc., or for fixed timepoints (e.g., the first timepoint, a middle timepoint, and a final timepoint).

FIG. 14 illustrates that the configuration for the number of poses to identify/store and/or use for unprojection operations may be dynamically selected for different circumstances. For example, FIG. 14 illustrates a motion attribute 1405 with dashed arrows extending to different configurations for the number of poses to use for unprojection operations (e.g., configurations 1410A and 1410B). In some instances, an HMD analyzes motion attributes of the system to determine a configuration for the number of poses to use for unprojection operations. For instance, in situations where an HMD detects high degree of motion (e.g., high velocity movements, frequent movements, a particular type of movement (e.g., translational, rotational)) the HMD may determine a configuration that uses an increased number of poses for unprojection operations. In contrast, in situations where an HMD detects a low degree of motion, or no motion at all, the HMD may determine a configuration that uses a decreased number of poses for unprojection operations. An HMD (or other system) may determine motion attributes based on data obtained from sensor(s) 250 (e.g., inertial tracking systems, visual tracking systems, etc.)

Figure 15A:
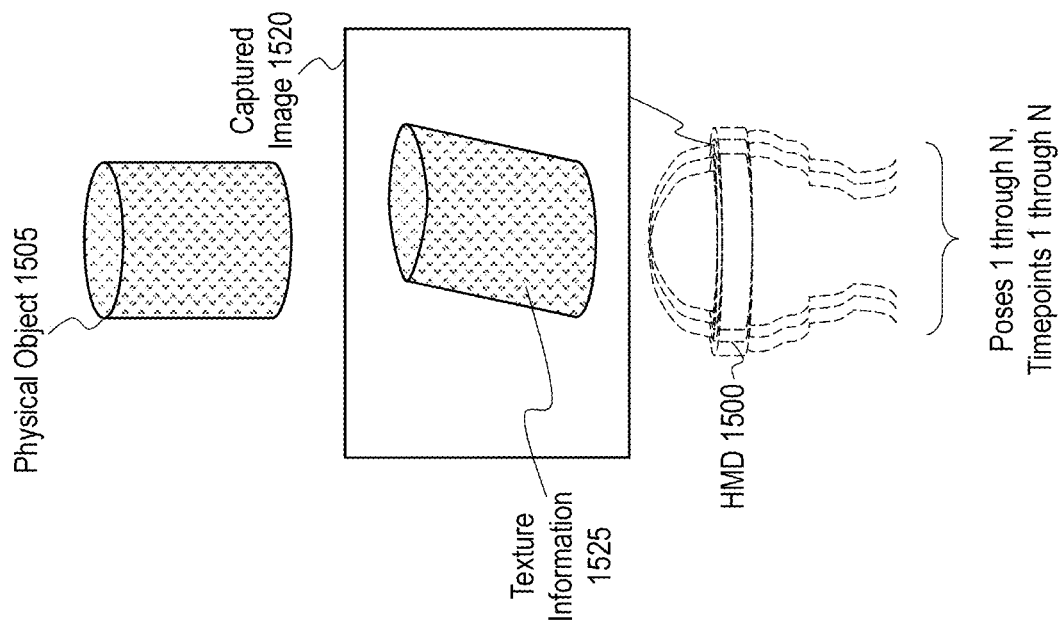
FIG. 15A illustrates an example of capturing an image of an environment using a rolling shutter sensor.

FIG. 15A illustrates an example of an HMD 1500 obtaining a captured image 1520 of an environment that includes a physical object 1505 using a rolling shutter sensor (e.g., rolling shutter sensor 810). The HMD 1500 may correspond to any HMD described herein, and the physical object 1505 corresponds to the physical object 905 from FIGS. 9A and 9B. In some instances, the captured image 1520 is representative of a stereo pair of images captured using a stereo pair of rolling shutter cameras of any modality (e.g., a stereo pair of rolling shutter low light cameras).

Similar to FIG. 9A, FIG. 15A illustrates that the captured image 1520 includes rolling shutter artifacts (e.g., the texture information 1525 of the captured image 1520 depicting the physical object 1505 is warped as compared with the real-world shape of the physical object 1505). For example, as depicted in FIG. 15A, because the HMD 1500 captures the captured image 1520 with a rolling shutter camera, the captured image 1520 is captured over a time interval including timepoints 1 through N (e.g., because of the integration/readout time offset that exists between different sensor rows of the rolling shutter cameras). For example, each sensor rows of a rolling shutter camera may integrate/readout sensor data at a different timepoint (e.g., row 1 at timepoint 1, row 2 at timepoint 2, etc.).

In some instances, throughout the time interval that includes timepoints 1 through N, a user operating the HMD 1500 changes their head position, resulting in separate poses (i.e., poses 1 through N) of the HMD 1500 for each of the different timepoints 1 through N. Accordingly, the sensor rows of the rolling shutter camera may capture the environment, including the physical object 1505, at separate poses 1 through N for the different timepoints 1 through N, and the separate poses 1 through N may be different from one another. The different capture poses 1 through N may give rise to rolling shutter artifacts in the captured image 1520 (as shown in FIG. 15A).

Figure 15B:
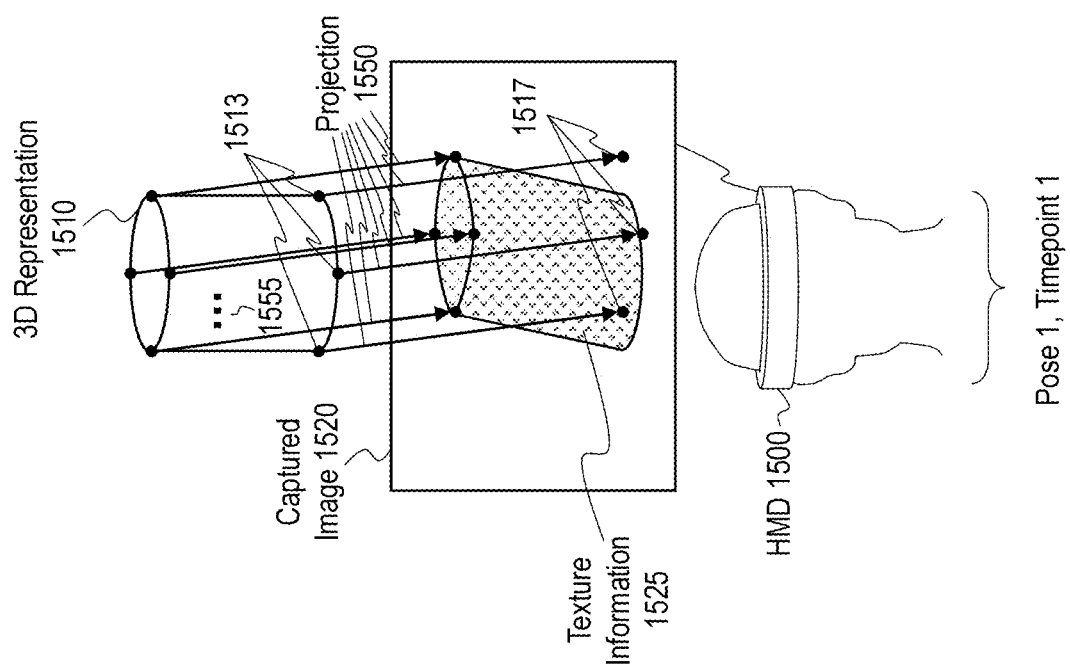
FIG. 15B illustrates an example of identifying texture information for a 3D representation of an environment using the image of the environment captured using the rolling shutter sensor and a single projection pose.

Rolling shutter artifacts present in a captured image 1520 may give rise to inaccuracies when identifying texture information for an environment/object represented in the captured image 1520 (e.g., for generating a composite image as described hereinabove with reference to FIGS. 5B and 6A, and/or for generating a corrected image as described hereinabove with reference to FIG. 13). For example, FIG. 15B illustrates an example of the HMD 1500 (or another system) identifying texture information 1525 from the captured image 1520 for a 3D representation 1510 of the physical object 1505. The HMD 1500 performs projection operations 1550 on the 3D points of the 3D representation 1510 to points of texture information 1525 for the 3D points of the 3D representation 1510. The projection operations 1550 of FIG. 15B are based on pose 1 and may correspond to the projection operations 550 and 640 described hereinabove with reference to FIGS. 5B and 6A. In some instances, pose 1 is a pose in which some, but not all, of the sensor rows of a rolling shutter camera captured sensor data to generate the captured image 1520. The ellipsis 1555 indicates that an HMD 1500 may perform any number of projection operations 1550 on any number of 3D points of the 3D representation 1510 to identify texture information 1525 for the 3D points.

Because the captured image 1520 includes rolling shutter artifacts that result in a warped depiction of the physical object 1505, FIG. 15B illustrates that performing projection operations 1550 based on a single pose (e.g., pose 1) to identify texture information for the 3D points of the 3D representation 1510 may cause at least some of the 3D points to become associated with inaccurate points of texture information 525. For example, FIG. 15B shows a set of 3D points 1513 of the 3D representation 1510 that become associated with inaccurate texture information 1517 by performing the projection operations 1550 using pose 1.

Figure 16A:
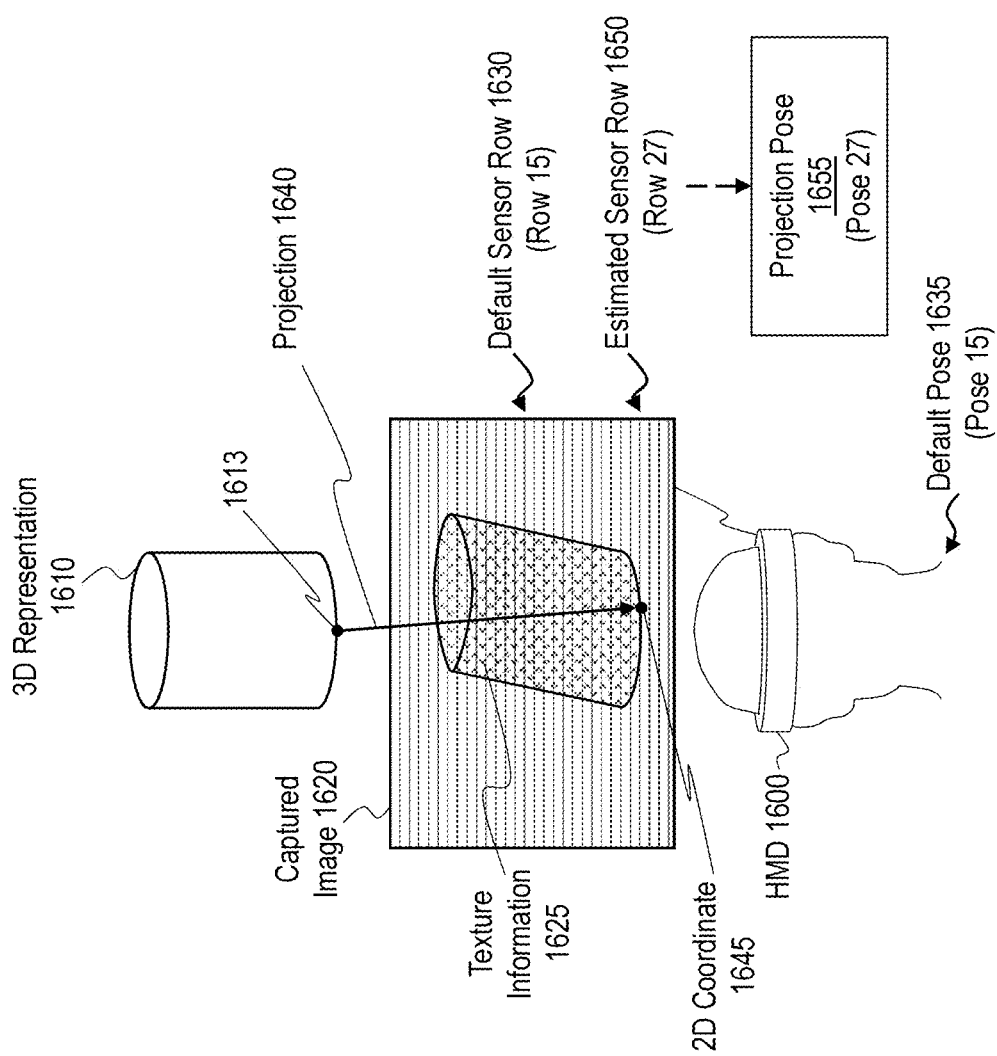
FIG. 16A illustrates an example of obtaining an estimated sensor row and projection pose for a point of the 3D representation of the environment.
Figure 16B:
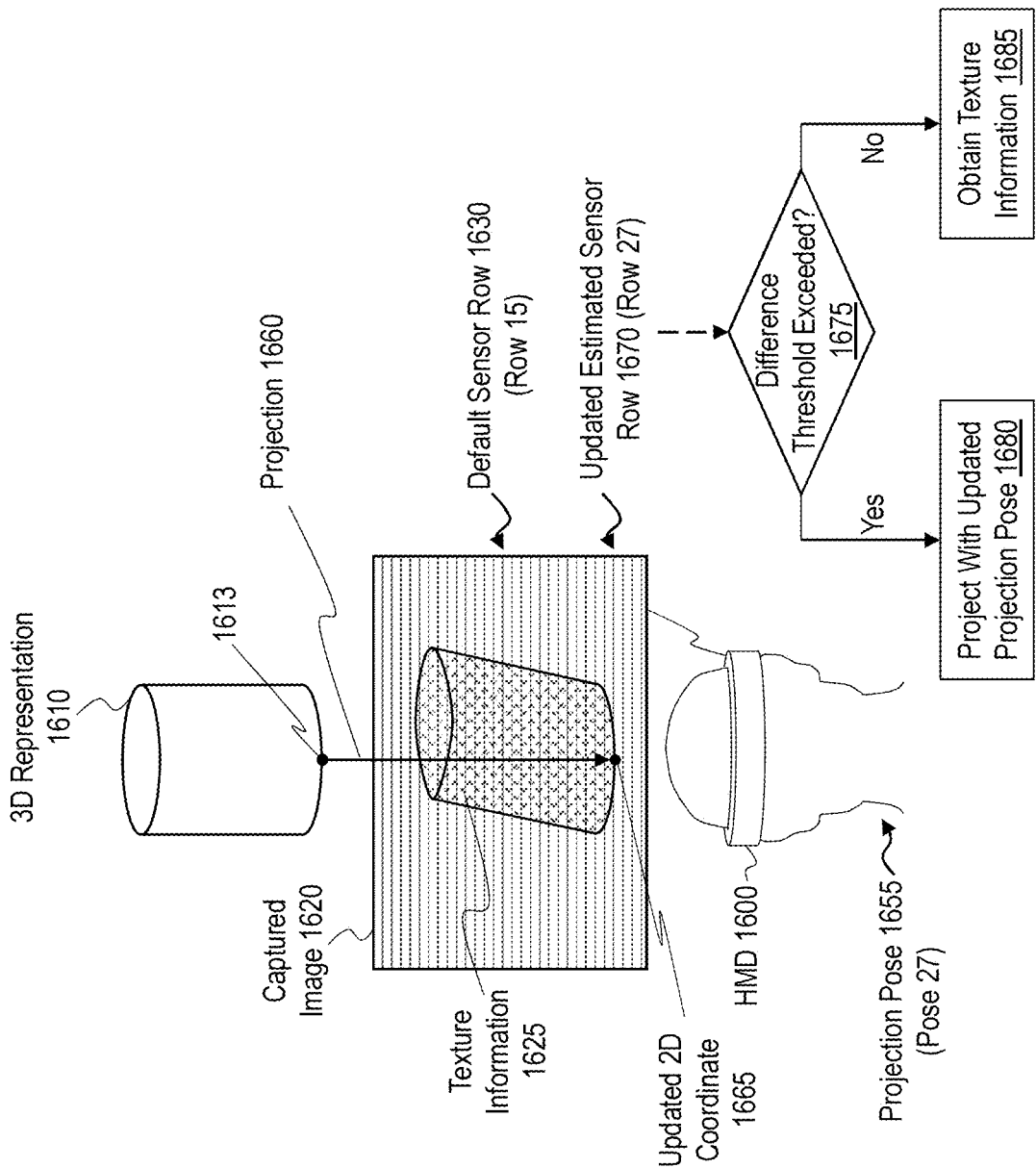
FIG. 16B illustrates an example of projecting the point of the 3D representation of the environment using the projection pose.
Figure 16C:
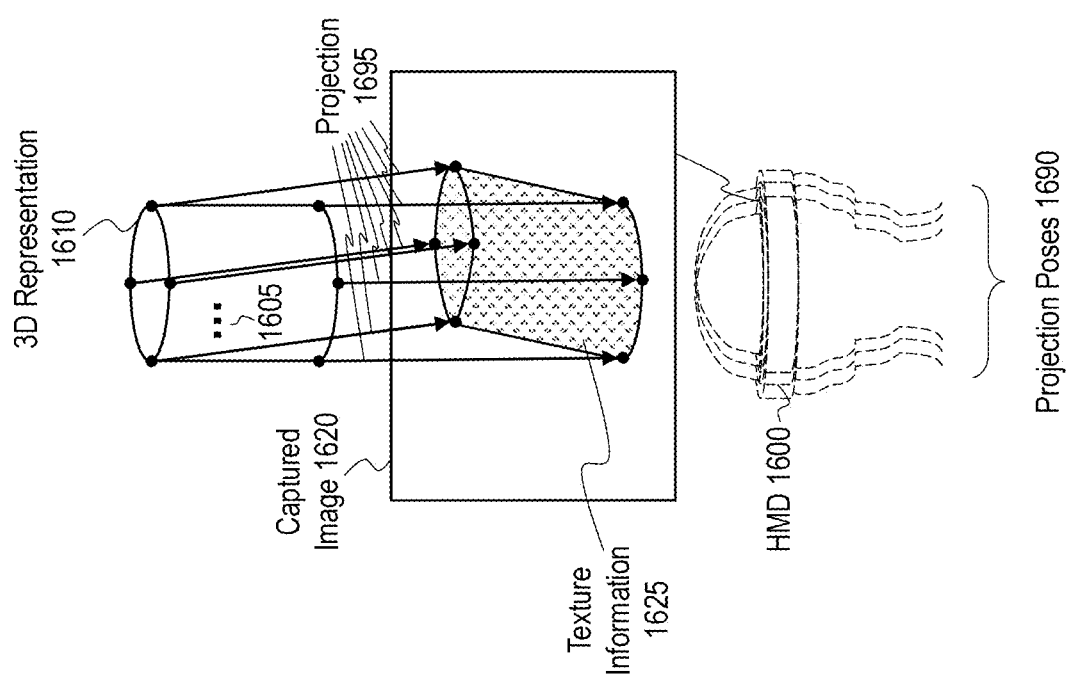
FIG. 16C illustrates an example of projecting multiple points of the 3D representation of the environment using corresponding projection poses.

Accordingly, FIGS. 16A-16C illustrate example techniques for compensating for rolling shutter artifacts that may exist in captured images used to identify texture information for a 3D representation of an environment. The HMD 1600 may correspond to any HMD described herein, and the 3D representation 1610, the captured image 1620, and the texture information 1625 correspond to the 3D representation 1510, the captured image 1520, and the texture information 1525 of FIG. 15B, respectively.

As described hereinabove with reference to FIGS. 10A-10C, an HMD may associate a separate pose with each row and/or readout/integration timepoint of a rolling shutter sensor as the rolling shutter sensor captures an image of an environment (e.g., pose 1 for row 1 and/or timepoint 1, pose 2 for row 2 and/or timepoint 2, pose 3 for row 3 and/or timepoint 3, . . . , pose 30 for row 30 and/or timepoint 30). Accordingly, rows of image data of the captured image 1620 may be associated with separate poses and/or sensor rows of the rolling shutter sensor that captured the captured image 1620.

Although the various rows of image data of the captured image 1620 may be associated with separate poses and/or sensor rows of the rolling shutter sensor while capturing the captured image 1620, an HMD 1600, in some instances, may lack a mechanism to correlate the various 3D points of the 3D representation 1610 to the separate poses and/or sensor rows of the rolling shutter sensor while capturing the captured image 1620 (e.g., to identify a separate pose to use for projecting separate 3D points of the 3D representation 1610).

Accordingly, FIGS. 16A-16C illustrate an iterative approach for identifying poses to use for projecting the 3D points of the 3D representation 1610 to identify texture information from the captured image 1620 for the 3D representation 1610.

FIG. 16A illustrates an HMD 1600 performing a projection operation 1640 on a 3D point 1613 of the 3D representation 1610. The projection operation 1640 may correspond to the projection operations 1550 of FIG. 15B, and the HMD 1600 performs the projection operation 1640 based on a default pose 1635 associated with a default sensor row 1630 of the sensor rows of the rolling shutter sensor. For example, in some implementations, the default pose 1635 is the pose associated with a rolling shutter sensor while the default sensor row 1630 captured sensor data for capturing the captured image 1620. FIG. 16A depicts the HMD 1600 at the default pose 1635 (pose 15) for illustrative purposes.

In some instances, the default sensor row 1630 is a predefined sensor row for selecting the default pose 1635 for performing an initial projection operation (e.g., projection operation 1640) on the 3D points of the 3D representation (e.g., 3D point 1613). FIG. 16A illustrates an implementation in which the default sensor row 1630 is a center row of the sensor rows of a rolling shutter sensor (e.g., row 15), which becomes associated with default pose 1635 (e.g., pose 15) while the rolling shutter sensor captures the captured image 1620. In other implementations, the default sensor row 1630 is a first sensor row, a last sensor row, or any other sensor row of a rolling shutter sensor.

In some instances, performing the projection operation 1640 on the 3D point 1613 of the 3D representation 1610 identifies a 2D coordinate 1645. For example, casting a ray from the 3D point 1613 toward a pose-dependent point (similar to projection operations 550 from FIG. 5B) may identify a pixel of the captured image 1620 (e.g., as the pixel lies on a front image plane positioned with respect to the default pose 1635). The 2D coordinate 1645 may be based on the pixel coordinates of the identified pixel of the captured image 1620. In some instances, the 2D coordinate 1645 is a coordinate in a direction that is perpendicular to the sensor rows of the rolling shutter sensor that captured the captured image. As depicted in FIG. 16A, the 2D coordinate 1645 is a vertical coordinate (e.g., a y-coordinate).

In some instances, the 2D coordinate 1645 aligns with a sensor row of the plurality of sensor rows of the rolling shutter sensor (or aligns with a row of image data that is associated with a sensor row), which is referred to in FIG. 16A as an estimated sensor row 1650 (row 27). The estimated sensor row 1650 (row 27), in some instances, provides an approximation of a pose for projecting the 3D point 1613 to identify a point of texture information 1625 from the captured image 1620 for the 3D point 1613. For example, as described hereinabove, sensor row 27 (the estimated sensor row 1650) is associated with pose 27, which is the pose associated with the readout/integration timepoint 27 at which sensor row 27 captured sensor data for generating the captured image 1620. In some instances, the HMD 1600 utilizes pose 27 as a projection pose 1655 for performing a subsequent projection operation on 3D point 1613 of the 3D representation 1610.

FIG. 16B illustrates an example of an HMD 1600 performing a projection operation 1660 on the point 1613 of the 3D representation 1610 using the projection pose 1655 (pose 27). The projection operation 1660 corresponds to the projection operation 1640 described hereinabove with reference to FIG. 16A, and the HMD 1600 performs the projection operation 1660 based on the projection pose 1655 (pose 27) identified as described hereinabove with reference to FIG. 16A. In some instances, performing the projection operation 1660 identifies a pixel of the captured image 1620. In some implementations, an HMD 1600 identifies a point of texture information 1625 from the captured image 1620 for the 3D point 1613 based on the pixel identified by performing the projection operation 1660 on the 3D point 1613 (e.g., using the projection pose 1655 identified as described hereinabove with reference to FIG. 16A).

In some instances, the pixel coordinates of the pixel identified by performing the projection operation 1660 on 3D point 1613 provide an updated 2D coordinate 1665. In some instances, as with the 2D coordinate 1645 described hereinabove with reference to FIG. 16A, the updated 2D coordinate aligns with a sensor row of the plurality of sensor rows of the rolling shutter sensor (or aligns with a row of image data that is associated with a sensor row), which is referred to in FIG. 16B as an updated estimated sensor row 1670 (row 27).

FIG. 16B illustrates an instance in which the updated estimated sensor row 1670 (row 27) is the same as the previously identified estimated sensor row 1650 (row 27) (e.g., from FIG. 16A), which may indicate that the estimated sensor row 1650 and the updated estimated sensor row 1670 are associated with a pose (e.g., pose 27) that, if used to project the 3D point 1613, may identify a suitable point of texture information 1625 from the captured image 1620 for the 3D point 1613. In other instances, the updated estimated sensor row 1670 differs from the previously identified estimated sensor row 1650, which may indicate that the updated estimated sensor row 1670 is associated with a pose that, if used to project the 3D point 1613, may improve the accuracy of identified texture information 1625 from the captured image 1620 for the 3D point 1613 (e.g., as compared with the pose associated with the estimated sensor row).

Accordingly, FIG. 16B illustrates decision block 1675, whereby an HMD 1600, in some instances, determines whether a difference between an updated estimated sensor row 1670 and a previously identified estimated sensor row 1650 meets or exceeds a predetermined difference threshold. For example, an HMD 1600 may determine whether an updated estimated sensor row 1670 and a previously identified estimated sensor row 1650 are within a threshold proximity of rows to one another (e.g., within 3 rows or any number of rows to one another).

In some implementations, in response to determining that a difference between the updated estimated sensor row 1670 and the previously identified estimated sensor row 1650 fails to meet or exceed the predetermined difference threshold, the HMD 1600 identifies a point of texture information for the 3D point 1613 based on the pixel of the captured image 1620 identified by the projection operation 1660 based on the projection pose 1655 (illustrated in FIG. 16B as act 1685).

In other instances, in response to determining that a difference threshold between the updated estimated sensor row 1670 and the previously identified estimated sensor row 1650 meets or exceeds the predetermined difference threshold, the HMD 1600 identifies an updated projection pose associated with the updated estimated sensor row 1670 and projects the 3D point using the updated projection pose to identify a newly updated 2D coordinate and a newly updated estimated sensor row (illustrated in FIG. 16B as act 1680).

In some instances, an HMD 1600 compares the newly updated estimated sensor row to the updated estimated sensor row 1670 (e.g., according to decision block 1675) to determine whether to obtain texture information (act 16850 or project the 3D point 1613 with a newly updated projection pose associated with the newly updated estimated sensor row.

In some configurations, the HMD 1600 will iteratively obtain newly updated projection poses until a difference between a most recently identified updated estimated sensor row and a preceding estimated sensor row is below a predetermined difference threshold.

FIG. 16C illustrates an example of the HMD 1600 performing projection operations 1695 on multiple 3D points of the 3D representation 1610 to identify texture information 1625 from the captured image 1620 for the 3D points of the 3D representation 1610. The ellipsis 1605 indicates that the HMD 1600 may perform any number projection operations 1695 to identify texture information 1625 for the 3D representation 1610. The projection operations 1695 corresponds to the projection operation 1660 described hereinabove with reference to FIG. 16B, although the projection operations 1695 may be performed using separate projection poses 1690 for each of the 3D points of the 3D representation 1610. FIG. 16C illustrates the HMD 1600 with various projection poses 1690 for illustrative purposes.

For example, in some instances, the HMD 1600 performs initial projection operations on the 3D points of the 3D representation 1610 that are based on a default pose to identify a separate projection pose 1690 for each of the 3D points (e.g., similar to projection operation 1640 using default pose 1635, as described with reference to FIG. 16A). The HMD 1600 then performs the projection operations 1695 using a separate projection pose 1690 for each of the 3D points. It should be noted that separate projection poses are not necessarily different poses. For example, different 3D points may be associated with separate projection poses, but the separate projection poses may correspond to the same pose.

The principles described herein with reference to FIGS. 16A-16C may be applied to obtain texture information from a captured image for a 3D representation of an environment, particularly to compensate for rolling shutter artifacts that may be present in the captured image. Those skilled in the art will recognize, in view of the present disclosure, that the principles described herein with reference to FIGS. 16A-16C may be applied in combination with other principles described herein. For example, referring to FIG. 6A, an HMD may obtain texture information for a 3D representation 605 from a captured image 620 and an additional captured image 630, even where at least one of the captured image 620 or the additional captured image 630 is captured using one or more rolling shutter camera (e.g., a rolling shutter low light camera or a rolling shutter thermal camera). AN HMD may then project the 3D representation 605 using a display pose and render an image at a display timepoint based on the texture information from captured image 620 and the additional captured image 630 and the projection using the display pose.

Example Method(s) for Compensating for Rolling Shutter Artifacts

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 17:
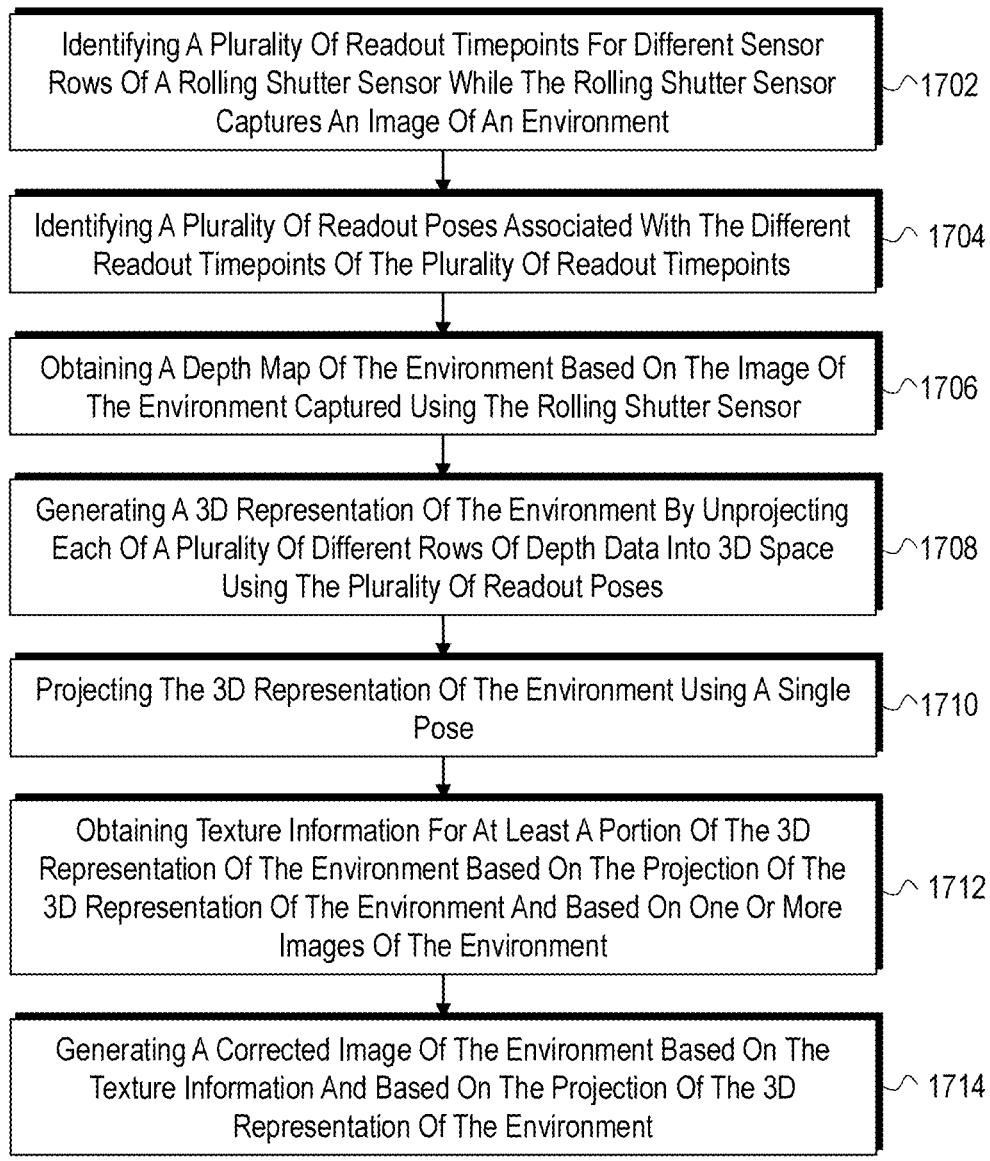
FIGS. 17-19 illustrate example flow diagrams depicting acts associated with compensating for rolling shutter artifacts.
Figure 18:
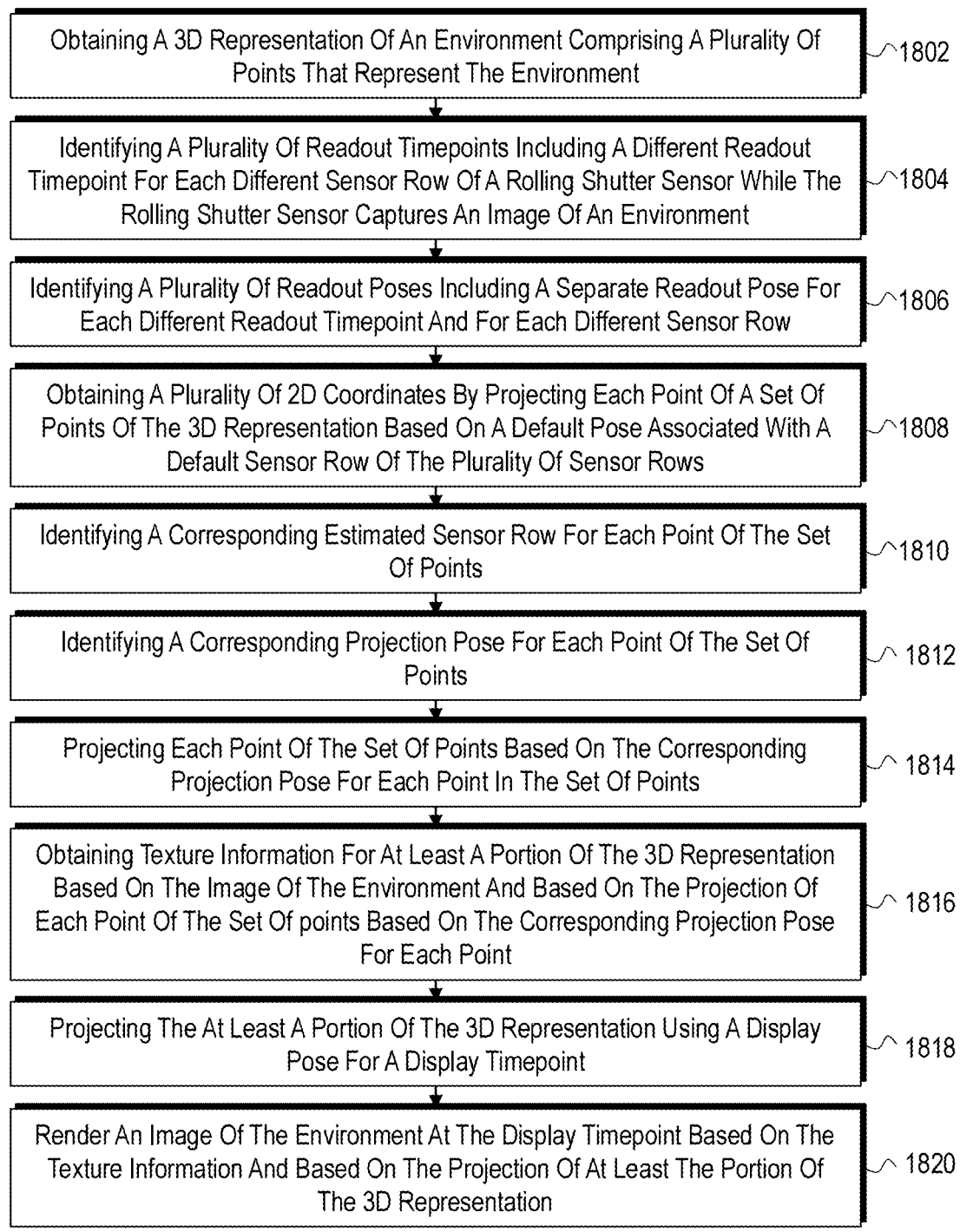
Figure 19:
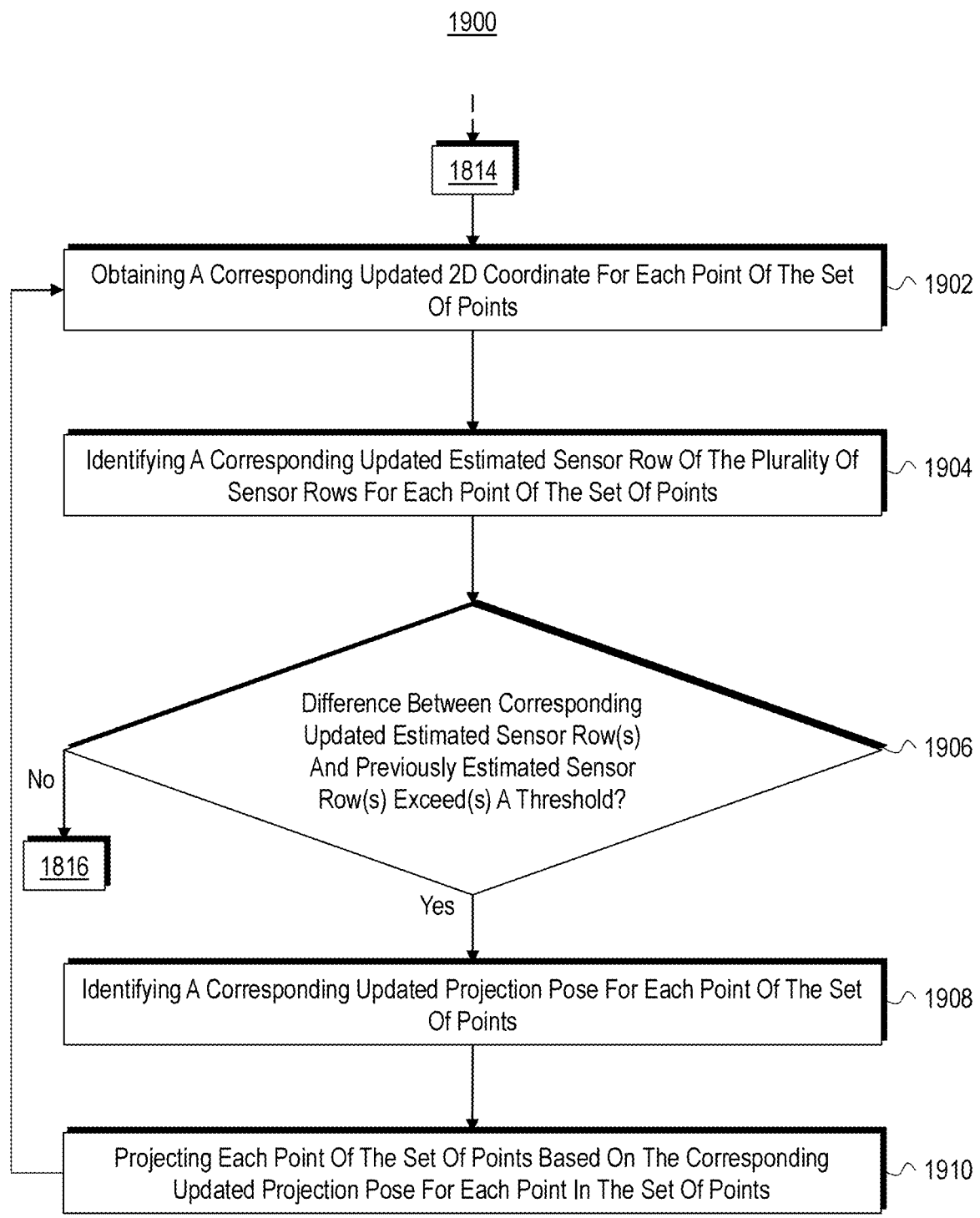

FIGS. 17-19 illustrate example flow diagrams 1700, 1800, and 1900, which depict acts associated with compensating for rolling shutter artifacts. The discussion of the various acts represented in the flow diagrams 1700, 1800, and 1900 includes references to various hardware components described in more detail with reference to FIGS. 2, 8A, 8B, and 20.

Referring now to FIG. 17, act 1702 of flow diagram 1700 includes identifying a plurality of readout timepoints for different sensor rows of a rolling shutter sensor while the rolling shutter sensor captures an image of an environment. Act 1702 is performed, in some instances, using processor(s) 2005 of a computer system 2000 (e.g., any HMD described herein) and a rolling shutter sensor 810 of a rolling shutter camera 805 (e.g., a stereo pair of rolling shutter sensors). The different sensor rows of the rolling shutter sensor are configured to output sensor data at different times, such that the sensor data output from the different sensor rows of the rolling shutter sensor are temporally offset. In some instances, a different readout timepoint is identified for at least two different sensor rows of the plurality of sensor rows. Furthermore, in some instances, the number of different readout timepoints of the plurality of readout timepoints is equal to a number of different sensor rows of the plurality of sensor rows of the rolling shutter sensor.

Act 1704 of flow diagram 1700 includes identifying a plurality of readout poses associated with the different readout timepoints of the plurality of readout timepoints. Act 1704 is performed, in some instances, using sensor(s) 250 of an HMD (e.g., visual tracking system(s), inertial tracking system(s), as described hereinabove). In some instances, the readout poses are poses that are associated with a rolling shutter camera while the various sensor rows of the rolling shutter camera obtain sensor data at the different readout timepoints. In this regard, the readout poses may also be associated with the different sensor rows of the rolling shutter sensor.

Act 1706 of flow diagram 1700 includes obtaining a depth map of the environment based on the image of the environment captured using the rolling shutter sensor. Act 1706 is performed, in some instances, using processor(s) 2005 of a computer system 2000 (e.g., any HMD described herein). In some instances, the depth map of the environment is based on a stereo pair of images captured by a stereo pair of rolling shutter sensors. Furthermore, in some implementations, the depth map includes a plurality of different rows of depth data. The different rows of depth data may correspond to different sensor rows of the plurality of sensor rows of the rolling shutter sensor.

Act 1708 of flow diagram 1700 includes generating a 3D representation of the environment by unprojecting each of a plurality of different rows of depth data into 3D space using the plurality of readout poses. Act 1708 is performed, in some instances, using processor(s) 2005 of a computer system 2000 (e.g., any HMD described herein). In some instances, the plurality of readout poses used to unproject each of the plurality of different rows of depth data correspond to the different timepoints of the plurality of readout timepoints described hereinabove with reference to Act 1702.

In some implementations, two or more different rows of depth data of the plurality of different rows of depth data are unprojected using a same readout pose of the plurality of readout poses. In other implementations, each of the plurality of different rows of depth data is unprojected using a separate readout pose of the plurality of readout poses.

Act 1710 of flow diagram 1700 includes projecting the 3D representation of the environment using a single pose. Act 1710 is performed, in some instances, using processor(s) 2005 of a computer system 2000 (e.g., any HMD described herein). In some instances, the single pose is a pose associated with a global shutter camera or a pose associated with a sensor row of a rolling shutter camera.

Act 1712 of flow diagram 1700 includes obtaining texture information for at least a portion of the 3D representation of the environment based on the projection of the 3D representation of the environment and based on one or more images of the environment. Act 1712 is performed, in some instances, using processor(s) 2005 of a computer system 2000 (e.g., any HMD described herein). In some instances, the one or more images of the environment include an image of the environment used to generate the depth map of the environment (e.g., the depth map of Act 1706 used to generate the 3D representation according to Act 1708). For example, the one or more images of the environment may be one or more images of a stereo pair of images captured by a stereo pair of rolling shutter sensors.

In other instances, the one or more images of the environment are captured by a global shutter sensor subsequent to capturing the image of the environment with the rolling shutter sensor. The global shutter sensor may be associated with the first pose from Act 1710 while capturing the one or more images of the environment.

Act 1714 of flow diagram 1700 includes generating a corrected image of the environment based on the texture information and based on the projection of the 3D representation of the environment. Act 1714 is performed, in some instances, using processor(s) 2005 of a computer system 2000 (e.g., any HMD described herein). In some instances, the corrected image corrects for rolling shutter artifacts that may have been present in one or more images used to generate the depth map from Act 1706 and 1708. In some instances, the corrected image is usable for generating a composite image for display to a user.

Referring now to FIG. 18, act 1802 of flow diagram 1800 includes obtaining a 3D representation of an environment comprising a plurality of points that represent the environment. Act 1802 is performed, in some instances, using processor(s) 2005 of a computer system 2000 (e.g., any HMD described herein). In some instances, the 3D representation is a surface mesh or point cloud generated by performing unprojection operations on a depth map (e.g., whether or not the depth map included rolling shutter artifacts). In other instances, the 3D representation is obtained from a surface reconstruction mesh of an environment. A 3D representation may take on any suitable form for representing a 3D object.

Act 1804 of flow diagram 1800 includes identifying a plurality of readout timepoints including a different readout timepoint for each different sensor row of a rolling shutter sensor while the rolling shutter sensor captures an image of an environment. Act 1804 is performed, in some instances, using processor(s) 2005 of a computer system 2000 (e.g., any HMD described herein) and a rolling shutter sensor 810 of a rolling shutter camera 805 (e.g., a stereo pair of rolling shutter sensors). The different sensor rows of the rolling shutter sensor are configured to output sensor data at different times, such that the sensor data output from the different sensor rows of the rolling shutter sensor are temporally offset. In some instances, the number of different readout timepoints of the plurality of readout timepoints is equal to a number of different sensor rows of the plurality of sensor rows of the rolling shutter sensor.

Act 1806 of flow diagram 1800 includes identifying a plurality of readout poses including a separate readout pose for each different readout timepoint and for each different sensor row. Act 1806 is performed, in some instances, using sensor(s) 250 of an HMD (e.g., visual tracking system(s), inertial tracking system(s), as described hereinabove). In some instances, the readout poses are poses that are associated with a rolling shutter camera while the various sensor rows of the rolling shutter camera obtain sensor data at the different readout timepoints. In this regard, the readout poses may also be associated with the different sensor rows of the rolling shutter sensor.

Act 1808 of flow diagram 1800 includes obtaining a plurality of 2D coordinates by projecting each point of a set of points of the 3D representation based on a default pose associated with a default sensor row of the plurality of sensor rows. Act 1808 is performed, in some instances, using processor(s) 2005 of a computer system 2000 (e.g., any HMD described herein). The default pose for the default sensor row may be identified while the default sensor row obtains sensor data. In some instances, the default pose is associated with a center sensor row of the plurality of sensor rows, whereas, in other instances, the default pose is associated with a first sensor row, a last sensor row, or any other sensor row of the plurality of sensor rows.

Act 1810 of flow diagram 1800 includes identifying a corresponding estimated sensor row for each point of the set of points. Act 1810 is performed, in some instances, using processor(s) 2005 of a computer system 2000 (e.g., any HMD described herein). In some implementations, the corresponding estimated sensor row for any particular point of the set of points is based on the corresponding 2D coordinate for the particular point.

Act 1812 of flow diagram 1800 includes identifying a corresponding projection pose for each point of the set of points. Act 1812 is performed, in some instances, using processor(s) 2005 of a computer system 2000 (e.g., any HMD described herein). In some implementations, the corresponding projection pose for any particular point of the set of points corresponds to the separate readout pose that is associated with the corresponding estimated sensor row for the particular point.

Act 1814 of flow diagram 1800 includes projecting each point of the set of points based on the corresponding projection pose for each point in the set of points. Act 1814 is performed, in some instances, using processor(s) 2005 of a computer system 2000 (e.g., any HMD described herein). In some instances, projecting each point of the set of points based on the corresponding projection pose for each point in the set of points identifies a pixel of the image of the environment for each point of the set of points.

Act 1816 of flow diagram 1800 includes obtaining texture information for at least a portion of the 3D representation based on the image of the environment and based on the projection of each point of the set of points based on the corresponding projection pose for each point. Act 1816 is performed, in some instances, using processor(s) 2005 of a computer system 2000 (e.g., any HMD described herein). In some implementations, the texture information is obtained based on the identified pixels of the image of the environment from Act 1814.

Act 1818 of flow diagram 1800 includes projecting the at least a portion of the 3D representation using a display pose for a display timepoint. Act 1818 is performed, in some instances, using processor(s) 2005 and/or sensor(s) 250 (e.g., visual tracking system(s), inertial tracking system(s), as described hereinabove) of a computer system 2000 (e.g., any HMD described herein). In some instances, the display timepoint is a future timepoint (e.g., relative to the time that the system identifies the display timepoint/display pose) and the display pose is a predicted pose that is predicted to be associated with an HMD at the future display timepoint. In some instances, an HMD identifies a predicted pose based on analysis of changes in the pose of the HMD prior to the display timepoint.

Act 1820 of flow diagram 1800 includes render an image of the environment at the display timepoint based on the texture information and based on the projection of at least the portion of the 3D representation. Act 1820 is performed, in some instances, using processor(s) 2005, graphics rendering engine(s) 2025, display system(s) 2030, and/or I/O interface(s) 2035 of a computer system 2000 (e.g., any HMD described herein). For example, in some implementations, a system builds the pixels of the rendered image based on the identified pixels (e.g., identified according to Act 814) with the geometry information associated with the projection of the portion of the 3D representation.

Referring now to FIG. 19, flow diagram 1900 illustrates that, in some instances, techniques for compensating for rolling shutter artifacts may include additional acts performed after Act 1814 but before Act 1816 from flow diagram 1800 of Figure. For example, Act 1902 of flow diagram 1900 may be performed after act 1814 of flow diagram 1800. Act 1902 includes obtaining a corresponding updated 2D coordinate for each point of the set of points (e.g., in a manner similar to Act 1808 from flow diagram 1800).

Act 1904 of flow diagram 1900 may also be performed after act 1814 of flow diagram 1800. Act 1904 includes identifying a corresponding updated estimated sensor row of the plurality of sensor rows for each point of the set of points (e.g., in a manner similar to act 1810 from flow diagram 1800).

Decision block 1906 of flow diagram 1900 illustrates determining whether a difference between the corresponding updated estimated sensor row(s) and a previously estimated sensor row(s) exceed(s) a difference threshold. Where the difference fails to meet or exceed the difference threshold, Act 1816 may be performed as described hereinabove with reference to flow diagram 1800 of FIG. 18. Where the difference meets or exceeds the difference threshold, Act 1908 may be performed, which includes identifying a corresponding updated projection pose for each point of the set of points (e.g., in a manner similar to act 1812 of flow diagram 1800).

Act 1910 of flow diagram 1900 includes projecting each point of the set of points based on the corresponding updated projection pose for each point in the set of points (e.g., in a manner similar to act 1814 of flow diagram 1800). Flow diagram 1900 illustrates that, in some instances, Act 1902 may then be performed again to identify corresponding updated 2D coordinates in view of the projections of each point of the set of points based on the corresponding updated projection pose for each point of the set of points. In this regard, flow diagram 1900 depicts iteratively obtaining newly updated corresponding projection poses for at least some points of a set of points of a 3D representation until a difference between a most recently identified updated corresponding estimated sensor row and a preceding corresponding estimated sensor row for one or more points of the set of points is below a predetermined difference threshold.

Example Computer System(s)

Figure 20:
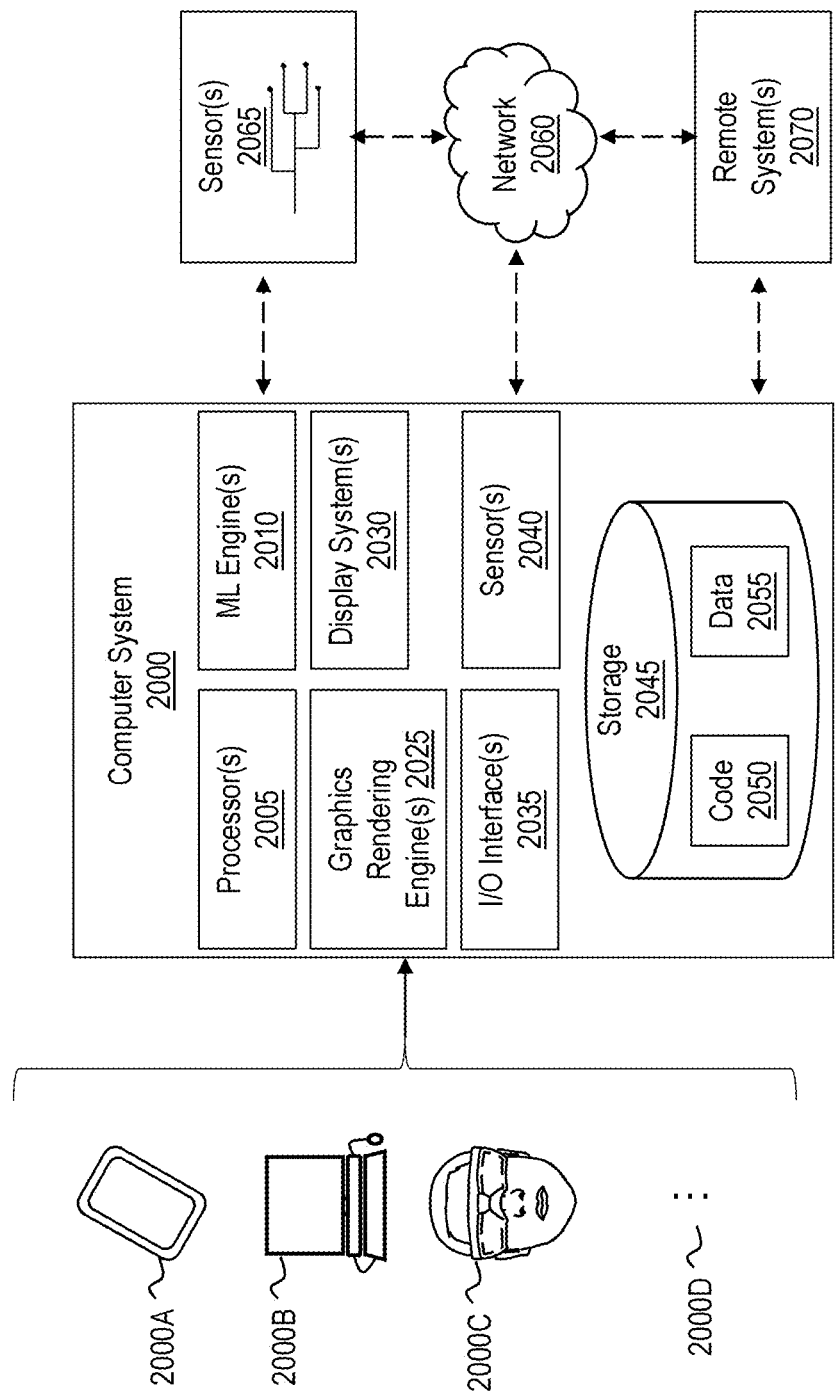
FIG. 20 illustrates an example computer system that may include and/or be used to perform disclosed embodiments.

Having just described the various features and functionalities of some of the disclosed embodiments, the focus will now be directed to FIG. 20 which illustrates an example computer system 2000 that may include and/or be used to facilitate the embodiments described herein, including the acts described in reference to FIG. 20. In particular, this computer system 2000 may be implemented as part of a mixed-reality HMD, such as any HMD referenced herein.

Computer system 2000 may take various different forms. For example, computer system 2000 may be embodied as a tablet, a desktop, a laptop, a mobile device, a cloud device, an HMD of a mixed-reality system, or a standalone device, such as those described throughout this disclosure. Computer system 2000 may also be a distributed system that includes one or more connected computing components/devices that are in communication with computer system 2000. FIG. 20 specifically calls out how computer system 2000 may be embodied as a tablet 2000A, a laptop 2000B, or an HMD 2000C, but the ellipsis 2000D indicates that computer system 2000 may be embodied in other forms as well.

The computer system 2000 includes various different components. FIG. 20 shows that computer system 2000 includes one or more processors 2005 (aka a "hardware processing unit"), a machine learning (ML) engine 2010, graphics rendering engine(s) 2025, a display system 2030, input/output (I/O) interfaces 2035, one or more sensors 2040, and storage 2045.

Regarding the processor(s) 2005, it will be appreciated that the functionality described herein can be performed, at least in part, by one or more hardware logic components (e.g., the processor(s) 2005). For example, and without limitation, illustrative types of hardware logic components/processors that can be used include Field-Programmable Gate Arrays ("FPGA"), Program-Specific or Application-Specific Integrated Circuits ("ASIC"), Application-Specific Standard Products ("ASSP"), System-On-A-Chip Systems ("SOC"), Complex Programmable Logic Devices ("CPLD"), Central Processing Units ("CPU"), Graphical Processing Units ("GPU"), or any other type of programmable hardware.

As used herein, the terms "executable module," "executable component," "component," "module," or "engine" can refer to hardware processing units or to software objects, routines, or methods that may be executed on computer system 2000. The different components, modules, engines, and services described herein may be implemented as objects or processors that execute on computer system 2000 (e.g. as separate threads).

The ML engine 2010 may be implemented as a specific processing unit (e.g., a dedicated processing unit as described earlier) configured to perform one or more specialized operations for the computer system 2000. The ML engine 2010 (or perhaps even just the processor(s) 2005) can be configured to perform any of the disclosed method acts or other functionalities.

In some instances, the graphics rendering engine 2025 is configured, with the hardware processing unit 2005, to render one or more virtual objects within the scene. As a result, the virtual objects accurately move in response to a movement of the user and/or in response to user input as the user interacts within the virtual scene. The computer system 2000 may include a display system 2030 (e.g., laser diodes, light emitting diodes (LEDs), microelectromechanical systems (MEMS), mirrors, lens systems, diffractive optical elements (DOES), display screens, and/or combinations thereof) for presenting virtual objects within the scene.

I/O interface(s) 2035 includes any type of input or output device. Such devices include, but are not limited to, touch screens, displays, a mouse, a keyboard, a controller, and so forth. Any type of input or output device should be included among I/O interface(s) 2035, without limitation.

During use, a user of the computer system 2000 is able to perceive information (e.g., a mixed-reality environment) through a display screen that is included among the I/O interface(s) 2035 and that is visible to the user. The I/O interface(s) 2035 and sensors 2040/2065 may also include gesture detection devices, eye tracking systems, and/or other movement detecting components (e.g., head tracking cameras, depth detection systems, gyroscopes, accelerometers, magnetometers, acoustic sensors, global positioning systems ("GPS"), etc.) that are able to detect positioning and movement of one or more real-world objects, such as a user's hand, a stylus, and/or any other object(s) that the user may interact with while being immersed in the scene.

The computer system 2000 may also be connected (via a wired or wireless connection) to external sensors 2065 (e.g., one or more remote cameras, accelerometers, gyroscopes, acoustic sensors, magnetometers, etc.). It will be appreciated that the external sensors include sensor systems (e.g., a sensor system including a light emitter and camera), rather than solely individual sensor apparatuses.

Storage 2045 may be physical system memory, which may be volatile, non-volatile, or some combination of the two. The term "memory" may also be used herein to refer to non-volatile mass storage such as physical storage media. If computer system 2000 is distributed, the processing, memory, and/or storage capability may be distributed as well.

Storage 2045 is shown as including executable instructions (i.e. code 2050). The executable instructions (i.e. code 2050) represent instructions that are executable by the processor(s) 2005 of computer system 2000 to perform the disclosed operations, such as those described in the various methods. Storage 2045 is also shown as including data 2055. Data 2055 may include any type of data, including image data, depth maps and other depth data, pose data, tracking data, and so forth, without limitation.

The disclosed embodiments may comprise or utilize a special-purpose or general-purpose computer including computer hardware, such as, for example, one or more processors (such as processor(s) 2005) and system memory (such as storage 2045), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are "physical computer storage media" or one or more "hardware storage device(s)." Computer-readable media that carry computer-executable instructions are "transmission media." Thus, by way of example and not limitation, the current embodiments can comprise at least two distinctly different kinds of computer-readable media: computer storage media/devices and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 2000 may also be connected (via a wired or wireless connection) to external sensors (e.g., one or more remote cameras) or devices via a network 2060. For example, computer system 2000 can communicate with any number devices or cloud services to obtain or process data. In some cases, network 2060 may itself be a cloud network. Furthermore, computer system 2000 may also be connected through one or more wired or wireless networks 2060 to remote/separate computer systems(s) 2070 that are configured to perform any of the processing described with regard to computer system 2000.

A "network," like network 2060, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 2000 will include one or more communication channels that are used to communicate with the network 2060. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

One will also appreciate how any feature or operation disclosed herein may be combined with any one or combination of the other features and operations disclosed herein. Additionally, the content or feature in any one of the figures may be combined or used in connection with any content or feature used in any of the other figures. In this regard, the content disclosed in any one figure is not mutually exclusive and instead may be combinable with the content from any of the other figures.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A system, comprising:
one or more processors; and
one or more hardware storage devices that store computer-executable instructions that are operable, when executed by the one or more processors, to cause the system to:
obtain a depth map of an environment that includes depth information for the environment at a first timepoint, the depth map being captured at a first pose associated with the system;
perform an unprojection operation using the first pose and the depth information represented in the depth map to generate a 3D representation of the environment in 3D space;
obtain one or more first images of the environment captured at a second timepoint that is subsequent to the first timepoint, the one or more first images of the environment being captured at a first intermediate pose associated with the system, the first intermediate pose occurring at the second timepoint, the first intermediate pose being different than the first pose;
identify first texture information for one or more 3D points of the 3D representation of the environment, the first texture information being identified from the one or more first images that are captured at the first intermediate pose that occurred at the second timepoint, the first texture information being identified by at least performing a first intermediate projection operation, which is a projection operation using the 3D representation and that is based on the first intermediate pose that occurred at the second timepoint to associate the first texture information from the one or more first images with the one or more 3D points of the 3D representation;
identify a display pose at which the system will display a composite image, the display pose being associated with the system and with a display timepoint that is subsequent to the second timepoint;
generate a display projection of the 3D representation by performing a display projection operation using the display pose and at least the one or more 3D points of the 3D representation that are associated with the first texture information obtained from the first intermediate projection operation; and
create the composite image based on the display projection of the 3D representation and the first texture information associated with the one or more 3D points of the 3D representation obtained from the first intermediate projection operation.

2. The system of claim 1, wherein:
the system further comprises a stereo camera pair; and
the depth map of the environment is based on a stereo pair of images captured by the stereo camera pair at the first timepoint and with the first pose associated with the system.

3. The system of claim 2, wherein the one or more first images comprise a subsequent stereo pair of images captured by the stereo camera pair.

4. The system of claim 1, wherein the first intermediate pose is a three degrees of freedom (3DOF) pose.

5. The system of claim 1, wherein the display pose is a predicted pose associated with the system.

6. The system of claim 1, wherein the composite image comprises a modified u-v map representing at least a portion of the first texture information.

7. The system of claim 1, wherein the computer-executable instructions are further operable, when executed by the one or more processors, to cause the system to:
display the composite image on a display of the system at the display timepoint.

8. The system of claim 1, wherein the computer-executable instructions are further operable, when executed by the one or more processors, to cause the system to:
obtain one or more second images of the environment captured at a third timepoint that is subsequent to the first timepoint and with a second intermediate pose associated with the system; and
identify second texture information from the one or more second images associated with the second intermediate pose for at least some of the one or more 3D points of the 3D representation by at least performing a second intermediate projection operation, which is a projection operation using the 3D representation and that is based on the second intermediate pose to associate the second texture information with the at least some of the one or more 3D points of the 3D representation.

9. The system of claim 8, wherein the composite image is further based on the second texture information for the at least some of the one or more 3D points of the 3D representation.

10. The system of claim 9, wherein:
the system further comprises one or more first cameras and one or more second cameras;
the one or more first images are captured by the one or more first cameras; and the one or more second images are captured by the one or more second cameras.

11. The system of claim 10, wherein the one or more first cameras are low light cameras, and wherein the one or more second cameras are thermal cameras.

12. The system of claim 9, wherein the second intermediate pose is associated with a same timepoint as the first intermediate pose, or the third timepoint is a same timepoint as the second timepoint.

13. The system of claim 1, wherein the computer-executable instructions are further operable, when executed by the one or more processors, to cause the system to perform parallax correction for the composite image by further reprojecting the 3D representation based on a perspective of one or more eyes of a user.

14. A method, comprising:
    obtaining a depth map of an environment that includes depth information for the environment at a first timepoint, the depth map being captured at a first pose associated with a system;
    perform an unprojection operation using the first pose and the depth information represented in the depth map to generate a 3D representation of the environment in 3D space;
    obtaining one or more first images of the environment captured at a second timepoint that is subsequent to the first timepoint, the one or more first images of the environment being captured at a first intermediate pose associated with the system, the first intermediate pose occurring at the second timepoint, the first intermediate pose being different than the first pose;
    identifying first texture information for one or more 3D points of the 3D representation of the environment, the first texture information being identified from the one or more first images that are captured at the first intermediate pose that occurred at the second timepoint, the first texture information being identified by at least performing a first intermediate projection operation, which is a projection operation using the 3D representation and that is based on the first intermediate pose that occurred at the second timepoint to associate the first texture information from the one or more first images with the one or more 3D points of the 3D representation;
    identifying a display pose at which the system will display a composite image, the display pose being associated with the system and with a display timepoint that is subsequent to the second timepoint;
    generating a display projection of the 3D representation by performing a display projection operation using the display pose and at least the one or more 3D points of the 3D representation that are associated with the first texture information obtained from the first intermediate projection operation; and
    creating the composite image based on the display projection of the 3D representation and the first texture information associated with the one or more 3D points of the 3D representation obtained from the first intermediate projection operation.

15. The method of claim 14, further comprising:
    obtaining one or more second images of the environment captured at a third timepoint that is subsequent to the first timepoint and with a second intermediate pose associated with the system; and
    identifying second texture information from the one or more second images associated with the second intermediate pose for at least some of the one or more 3D points of the 3D representation by at least performing a second intermediate projection operation, which is a projection operation using the 3D representation and that is based on the second intermediate pose to associate the second texture information with the at least some of the one or more 3D points of the 3D representation.

16. The method of claim 15, wherein the composite image is further based on the second texture information for the at least some of the one or more 3D points of the 3D representation.

17. The method of claim 15, wherein the one or more first images are low light images, and wherein the one or more second images are thermal images.

18. The method of claim 15, wherein the second intermediate pose is associated with a same timepoint as the first intermediate pose, or the third timepoint is a same timepoint as the second timepoint.

19. The method of claim 14, further comprising:
    performing parallax correction for the composite image by further reprojecting the 3D representation based on a perspective of one or more eyes of a user.

20. One or more hardware storage devices that store computer-executable instructions, the computer-executable instructions being executable by one or more processors of a computer system to cause the computer system to:
    obtain a depth map of an environment that includes depth information for the environment at a first timepoint, the depth map being captured at a first pose associated with the system;
    perform an unprojection operation using the first pose and the depth information represented in the depth map to generate a 3D representation of the environment in 3D space;
    obtain one or more first images of the environment captured at a second timepoint that is subsequent to the first timepoint, the one or more first images of the environment being captured at a first intermediate pose associated with the system, the first intermediate pose occurring at the second timepoint, the first intermediate pose being different than the first pose;
    identify first texture information for one or more 3D points of the 3D representation of the environment, the first texture information being identified from the one or more first images that are captured at the first intermediate pose that occurred at the second timepoint, the first texture information being identified by at least performing a first intermediate projection operation, which is a projection operation using the 3D representation and that is based on the first intermediate pose that occurred at the second timepoint to associate the first texture information from the one or more first images with the one or more 3D points of the 3D representation;
    identify a display pose at which the system will display a composite image, the display pose being associated with the system and with a display timepoint that is subsequent to the second timepoint;
    generate a display projection of the 3D representation by performing a display projection operation using the display pose and at least the one or more 3D points of the 3D representation that are associated with the first texture information obtained from the first intermediate projection operation; and
    create the composite image based on the display projection of the 3D representation and the first texture information associated with the one or more 3D points of the 3D representation obtained from the first intermediate projection operation.

* * * * *